(12) United States Patent
Chang

(10) Patent No.: US 7,812,784 B2
(45) Date of Patent: Oct. 12, 2010

(54) HEADREST MOUNTED ENTERTAINMENT SYSTEM

(76) Inventor: Chung Lung Chang, 22384 Lazy Trail Rd., Diamond Bar, CA (US) 91765

( * ) Notice: Subject to any disclaimer, the term of this patent is extended or adjusted under 35 U.S.C. 154(b) by 834 days.

(21) Appl. No.: 11/475,734

(22) Filed: Jun. 26, 2006

(65) Prior Publication Data

US 2007/0097210 A1    May 3, 2007

Related U.S. Application Data

(60) Provisional application No. 60/732,788, filed on Nov. 2, 2005, provisional application No. 60/740,540, filed on Nov. 29, 2005, provisional application No. 60/811,879, filed on Jun. 7, 2006.

(51) Int. Cl.
*G09G 5/00* (2006.01)
(52) U.S. Cl. ............................ 345/1.1; 725/74; 725/75; 348/837
(58) Field of Classification Search .................. 725/74, 725/75, 77; 345/1.1; 348/837
See application file for complete search history.

(56) References Cited

U.S. PATENT DOCUMENTS

| | | | |
|---|---|---|---|
| 3,019,050 A | 1/1962 | Spielman |
| 3,284,041 A | 11/1966 | Tjaden |
| 3,737,184 A | 6/1973 | Swartz |
| 3,773,378 A | 11/1973 | Lewis |
| 3,944,020 A | 3/1976 | Brown |
| D246,037 S | 10/1977 | Kelly |
| D247,234 S | 2/1978 | Stewart |
| 4,079,987 A | 3/1978 | Bumgardener |
| 4,100,372 A | 7/1978 | Hypolite |
| 4,101,159 A | 7/1978 | Stewart |
| 4,241,870 A | 12/1980 | Marcus |
| 4,281,577 A | 8/1981 | Middleton |
| D260,507 S | 9/1981 | Kosugi et al. |

(Continued)

FOREIGN PATENT DOCUMENTS

CN    2506484    8/2002

(Continued)

OTHER PUBLICATIONS

Panasonic Color Television Operating Instructions CT-27SX32 (2002).*

(Continued)

*Primary Examiner*—Amare Mengistu
*Assistant Examiner*—Gene W Lee
(74) *Attorney, Agent, or Firm*—Knobbe, Martens, Olson & Bear, LLP

(57) ABSTRACT

In certain embodiments, a mobile video system is provided that includes a first entertainment system mountable in a first headrest of a vehicle. The first entertainment system includes a first input having a structure and a first output having a structure. The mobile video system also includes a second entertainment system mountable in a second headrest of a vehicle. The second entertainment system includes a second input and a second output. The second input has a structure the same as the structure of the first input and the second output has a structure the same as the structure of the first output. The mobile video system also includes an adapter configured to couple the first input with the second output and the second input with the first output.

12 Claims, 28 Drawing Sheets

U.S. PATENT DOCUMENTS

| | | | |
|---|---|---|---|
| D264,969 S | 6/1982 | McGourty | |
| 4,352,200 A | 9/1982 | Oxman | |
| 4,394,055 A | 7/1983 | Smith | |
| 4,440,443 A | 4/1984 | Nordskog | |
| D280,312 S | 8/1985 | Simeri et al. | |
| D282,251 S | 1/1986 | Isham et al. | |
| D282,733 S | 2/1986 | Giavazzi et al. | |
| 4,584,603 A | 4/1986 | Harrison | |
| D284,280 S | 6/1986 | Mack, Jr. et al. | |
| D285,684 S | 9/1986 | Akita et al. | |
| 4,630,821 A | 12/1986 | Greenwald | |
| 4,635,110 A | 1/1987 | Weinblatt | |
| 4,647,980 A | 3/1987 | Steventon et al. | |
| 4,669,694 A | 6/1987 | Malick | |
| 4,681,366 A | 7/1987 | Lobanoff | |
| 4,756,528 A | 7/1988 | Umashankar | |
| 4,758,047 A | 7/1988 | Hennington | |
| 4,792,183 A | 12/1988 | Townsend, III | |
| 4,797,934 A | 1/1989 | Hufnagel | |
| 4,818,010 A | 4/1989 | Dillon | |
| 4,824,159 A | 4/1989 | Fluharty et al. | |
| 4,833,727 A | 5/1989 | Calvet et al. | |
| 4,843,477 A | 6/1989 | Mizutani et al. | |
| 4,867,498 A | 9/1989 | Delphia et al. | |
| 4,870,676 A | 9/1989 | Lewo | |
| 4,950,842 A | 8/1990 | Menninga | |
| RE33,423 E | 11/1990 | Labanoff | |
| 4,982,996 A | 1/1991 | Vottero-Fin et al. | |
| 4,983,951 A | 1/1991 | Igarashi et al. | |
| 5,040,990 A | 8/1991 | Suman et al. | |
| D320,587 S | 10/1991 | Kapp et al. | |
| 5,061,996 A | 10/1991 | Schiffman | |
| D323,929 S | 2/1992 | Hodson | |
| 5,096,271 A | 3/1992 | Portman | |
| 5,109,572 A | 5/1992 | Park | |
| 5,145,128 A | 9/1992 | Umeda | |
| 5,163,870 A | 11/1992 | Cooper | |
| 5,177,616 A | 1/1993 | Riday | |
| 5,188,421 A | 2/1993 | Arseneault | |
| 5,192,301 A | 3/1993 | Kamiya et al. | |
| 5,214,514 A | 5/1993 | Haberkern | |
| D338,003 S | 8/1993 | Nakayama | |
| D340,016 S | 10/1993 | Falcoff | |
| 5,255,214 A | 10/1993 | Ma | |
| 5,267,775 A | 12/1993 | Nguyen | |
| 5,303,970 A | 4/1994 | Young et al. | |
| 5,311,302 A | 5/1994 | Berry et al. | |
| D349,893 S | 8/1994 | Bennett | |
| 5,338,081 A | 8/1994 | Young et al. | |
| 5,359,349 A | 10/1994 | Jambor et al. | |
| 5,396,340 A | 3/1995 | Ishii et al. | |
| 5,397,160 A | 3/1995 | Landry | |
| 5,410,447 A | 4/1995 | Miyagawa et al. | |
| 5,467,106 A | 11/1995 | Salomon | |
| 5,469,298 A | 11/1995 | Suman et al. | |
| 5,507,556 A | 4/1996 | Dixon | |
| 5,522,638 A | 6/1996 | Falcoff et al. | |
| 5,529,265 A | 6/1996 | Sakurai | |
| D371,357 S | 7/1996 | Nakamura | |
| 5,547,248 A | 8/1996 | Marechal | |
| 5,555,466 A | 9/1996 | Scribner et al. | |
| 5,583,735 A | 12/1996 | Pease et al. | |
| 5,636,891 A | 6/1997 | Van Order et al. | |
| 5,696,861 A * | 12/1997 | Schimmeyer et al. | 385/75 |
| D389,818 S | 1/1998 | Smith | |
| 5,705,860 A | 1/1998 | Ninh et al. | |
| 5,709,360 A | 1/1998 | Rosen | |
| D390,219 S | 2/1998 | Rosen | |
| 5,713,633 A | 2/1998 | Lu | |
| 5,394,432 A | 5/1998 | Rosen | |
| 5,775,762 A | 7/1998 | Vitito | |
| 5,811,791 A | 9/1998 | Portman | |
| D399,200 S | 10/1998 | Rosen | |
| 5,822,023 A | 10/1998 | Suman et al. | |
| 5,823,599 A | 10/1998 | Gray | |
| 5,831,811 A | 11/1998 | Van Horn | |
| 5,842,715 A | 12/1998 | Jones | |
| 5,847,685 A | 12/1998 | Otsuki | |
| D410,458 S | 6/1999 | Rosen | |
| D410,464 S | 6/1999 | Hakoda | |
| 5,910,882 A | 6/1999 | Burrell | |
| 5,927,784 A | 7/1999 | Vitito | |
| 5,940,120 A | 8/1999 | Frankhouse et al. | |
| 5,946,055 A | 8/1999 | Rosen | |
| D413,856 S | 9/1999 | Scribner | |
| D413,937 S | 9/1999 | Smith | |
| 5,949,345 A | 9/1999 | Beckert et al. | |
| D414,856 S | 10/1999 | Zuege | |
| D416,015 S | 11/1999 | Mitchell | |
| 5,982,429 A | 11/1999 | Kamamoto et al. | |
| 5,984,347 A | 11/1999 | Blanc-Rosset | |
| 5,996,954 A | 12/1999 | Rosen et al. | |
| 5,997,091 A | 12/1999 | Rech et al. | |
| 6,007,036 A | 12/1999 | Rosen | |
| 6,045,181 A | 4/2000 | Ikeda et al. | |
| 6,055,478 A | 4/2000 | Heron | |
| 6,056,248 A | 5/2000 | Ma | |
| 6,059,255 A | 5/2000 | Rosen et al. | |
| 6,081,420 A | 6/2000 | Kim et al. | |
| 6,092,705 A | 7/2000 | Meritt | |
| 6,097,448 A | 8/2000 | Perkins | |
| 6,102,476 A | 8/2000 | May et al. | |
| 6,115,086 A | 9/2000 | Rosen | |
| 6,124,902 A | 9/2000 | Rosen | |
| 6,125,030 A | 9/2000 | Mola et al. | |
| D432,586 S | 10/2000 | Galli-Zugaro et al. | |
| D434,400 S | 11/2000 | Rosen | |
| D434,749 S | 12/2000 | Ito et al. | |
| 6,157,418 A | 12/2000 | Rosen | |
| 6,179,263 B1 | 1/2001 | Rosen et al. | |
| 6,181,387 B1 | 1/2001 | Rosen | |
| D437,837 S | 2/2001 | Harrison et al. | |
| 6,186,459 B1 | 2/2001 | Ma | |
| 6,195,438 B1 | 2/2001 | Yumoto et al. | |
| D438,853 S | 3/2001 | Lino | |
| 6,199,810 B1 | 3/2001 | Wu et al. | |
| 6,216,927 B1 | 4/2001 | Meritt | |
| 6,219,927 B1 | 4/2001 | Westermaier | |
| 6,246,449 B1 | 6/2001 | Rosen | |
| 6,250,967 B1 | 6/2001 | Chu | |
| 6,256,837 B1 | 7/2001 | Lan et al. | |
| 6,266,236 B1 | 7/2001 | Ku et al. | |
| 6,267,428 B1 | 7/2001 | Baldas et al. | |
| D446,507 S | 8/2001 | Rosen et al. | |
| D448,009 S | 9/2001 | Lavelle et al. | |
| 6,292,236 B1 | 9/2001 | Rosen | |
| 6,304,173 B2 | 10/2001 | Pala et al. | |
| D450,667 S | 11/2001 | Scribner | |
| 6,339,455 B1 | 1/2002 | Allan et al. | |
| 6,339,696 B1 | 1/2002 | Chan et al. | |
| D454,121 S | 3/2002 | Lavelle et al. | |
| 6,361,012 B1 | 3/2002 | Chang | |
| 6,363,204 B1 | 3/2002 | Johnson et al. | |
| D456,371 S | 4/2002 | Lavelle et al. | |
| 6,364,390 B1 | 4/2002 | Finneman | |
| 6,380,978 B1 | 4/2002 | Adams | |
| D456,789 S | 5/2002 | Snyker | |
| D457,506 S | 5/2002 | Scribner | |
| 6,394,551 B1 | 5/2002 | Beukema | |
| 6,409,242 B1 | 6/2002 | Chang | |
| 6,412,848 B1 | 7/2002 | Ceccanese et al. | |
| D461,850 S | 8/2002 | Hussaini et al. | |
| D462,670 S | 9/2002 | Kasuga et al. | |
| 6,446,925 B1 | 9/2002 | Wada | |

| | | | | | |
|---|---|---|---|---|---|
| 6,466,278 B1 | 10/2002 | Harrison et al. | 2002/0186531 A1 | 12/2002 | Pokharna et al. |
| D465,492 S | 11/2002 | Scribner | 2003/0020840 A1 | 1/2003 | Hays et al. |
| D466,107 S | 11/2002 | Lum | 2003/0021086 A1 | 1/2003 | Landry et al. |
| D467,234 S | 12/2002 | Scribner | 2003/0036357 A1 | 2/2003 | McGowan |
| D467,562 S | 12/2002 | Chang | 2003/0128183 A1 | 7/2003 | Chang |
| 6,493,546 B2 | 12/2002 | Patsiokas | 2003/0137584 A1 | 7/2003 | Norvell et al. |
| 6,510,049 B2 | 1/2003 | Rosen | 2003/0140352 A1 | 7/2003 | Kim |
| D470,828 S | 2/2003 | Solland | 2003/0184137 A1 | 10/2003 | Jost |
| 6,522,368 B1 | 2/2003 | Tuccinardi et al. | 2003/0198008 A1 | 10/2003 | Leapman et al. |
| 6,532,592 B1 | 3/2003 | Shintani et al. | 2003/0202005 A1 | 10/2003 | Sadahiro |
| 6,557,812 B2 | 5/2003 | Kutzehr et al. | 2004/0007906 A1 | 1/2004 | Park et al. |
| 6,619,605 B2 | 9/2003 | Lambert | 2004/0032543 A1 | 2/2004 | Chang |
| 6,668,407 B1 | 12/2003 | Reitzel | 2004/0080213 A1 | 4/2004 | Chang |
| 6,669,285 B1 | 12/2003 | Park et al. | 2004/0083491 A1 | 4/2004 | Chang |
| D485,812 S | 1/2004 | Park | 2004/0085337 A1 | 5/2004 | Barrows |
| 6,678,892 B1 | 1/2004 | Lavelle et al. | 2004/0085485 A1 | 5/2004 | Schedivy |
| 6,688,407 B2 | 2/2004 | Etter et al. | 2004/0085718 A1 | 5/2004 | Imsand |
| 6,695,376 B1 | 2/2004 | Hirano | 2004/0086259 A1 | 5/2004 | Schedivy |
| 6,719,343 B2 | 4/2004 | Emerling et al. | 2004/0125549 A1 | 7/2004 | Iredale |
| 6,724,317 B1 | 4/2004 | Kitano et al. | 2004/0130616 A1 | 7/2004 | Tseng |
| D489,416 S | 5/2004 | Chao | 2004/0212745 A1 | 10/2004 | Chang |
| 6,739,654 B1 | 5/2004 | Shen et al. | 2004/0212957 A1 | 10/2004 | Schedivy |
| D492,944 S | 7/2004 | Drakoulis et al. | 2004/0227372 A1 | 11/2004 | Lavelle et al. |
| D502,152 S | 2/2005 | Peng | 2004/0227695 A1 | 11/2004 | Schedivy |
| 6,871,356 B2 | 3/2005 | Chang | 2004/0227696 A1 | 11/2004 | Schedivy |
| 6,883,870 B2 | 4/2005 | Jost | 2004/0227861 A1 | 11/2004 | Schedivy |
| 6,899,365 B2 | 5/2005 | Lavelle et al. | 2004/0228622 A1 | 11/2004 | Schedivy |
| D508,900 S | 8/2005 | Kawan et al. | 2005/0005298 A1 | 1/2005 | Tranchina |
| 6,928,654 B2 | 8/2005 | Tranchina et al. | 2005/0020320 A1 | 1/2005 | Lavelle et al. |
| D510,329 S | 10/2005 | Vitito | 2005/0024356 A1 | 2/2005 | Lavelle et al. |
| D510,330 S | 10/2005 | Peng | 2005/0046756 A1 | 3/2005 | Chang |
| D511,332 S | 11/2005 | Vitito | 2005/0052046 A1 | 3/2005 | Lavelle et al. |
| 6,961,239 B2 | 11/2005 | Schedivy | 2005/0066369 A1 | 3/2005 | Chang |
| D512,973 S | 12/2005 | Schedivy | 2005/0098593 A1 | 5/2005 | Schedivy |
| 6,975,806 B1 | 12/2005 | Lavelle et al. | 2005/0099042 A1 | 5/2005 | Vitito |
| D515,522 S | 2/2006 | Vitito | 2005/0099495 A1 | 5/2005 | Vitito |
| 7,019,794 B2 | 3/2006 | Norvell et al. | 2005/0099547 A1 | 5/2005 | Vitito |
| D521,524 S | 5/2006 | Chang | 2005/0099548 A1 | 5/2005 | Vitito |
| 7,036,879 B2 | 5/2006 | Chang | 2005/0102697 A1 | 5/2005 | Vitito |
| 7,040,697 B1 | 5/2006 | Tuccinardi et al. | 2005/0110313 A1 | 5/2005 | Vitito |
| 7,040,698 B2 | 5/2006 | Park | 2005/0110913 A1 | 5/2005 | Vitito |
| 7,044,546 B2 | 5/2006 | Chang | 2005/0122670 A1 | 6/2005 | Oh |
| 7,050,124 B2 | 5/2006 | Schedivy | 2005/0132407 A1 | 6/2005 | Boyer, Jr. et al. |
| 7,066,544 B2 | 6/2006 | Tseng | 2005/0155068 A1 | 7/2005 | Chang |
| 7,084,932 B1 | 8/2006 | Mathias et al. | 2005/0166238 A1 | 7/2005 | Vitito |
| 7,095,608 B2 | 8/2006 | Simmons et al. | 2005/0174498 A1 | 8/2005 | Wu |
| 7,149,078 B2 | 12/2006 | Schedivy | 2005/0200697 A1 | 9/2005 | Schedivy |
| 7,184,259 B2 | 2/2007 | Marler | 2005/0223406 A1 | 10/2005 | Vitito |
| 7,201,354 B1 | 4/2007 | Lee | 2005/0232585 A1 | 10/2005 | Lavelle et al. |
| 7,201,356 B2 | 4/2007 | Huang | 2005/0235326 A1 | 10/2005 | Vitito |
| 7,218,360 B2 | 5/2007 | Schedivy | 2005/0235327 A1 | 10/2005 | Vitito |
| 7,219,942 B2 | 5/2007 | Schedivy | 2005/0242636 A1 | 11/2005 | Vitito |
| 7,245,274 B2 | 7/2007 | Schedivy | 2005/0242637 A1 | 11/2005 | Vitito |
| 7,267,402 B2 | 9/2007 | Chang | 2005/0242638 A1 | 11/2005 | Vitito |
| 7,315,729 B2 | 1/2008 | Schedevy | 2005/0249357 A1 | 11/2005 | Schedivy |
| 7,327,225 B2 | 2/2008 | Nicholas et al. | 2005/0251833 A1 | 11/2005 | Schedivy |
| 7,333,009 B2 | 2/2008 | Schedivy | 2006/0023412 A1 | 2/2006 | Schedivy |
| 7,334,243 B2 | 2/2008 | Chengalva et al. | 2006/0034040 A1 | 2/2006 | Simmons et al. |
| D564,974 S | 3/2008 | Berg et al. | 2006/0047426 A1 | 3/2006 | Vitito |
| 7,352,355 B2 | 4/2008 | Troxell et al. | 2006/0070102 A1 | 3/2006 | Vitito |
| 7,354,091 B2 | 4/2008 | Lavelle et al. | 2006/0070103 A1 | 3/2006 | Vitito |
| 7,360,833 B2 | 4/2008 | Vitito | 2006/0097537 A1 | 5/2006 | Schedivy |
| 7,379,125 B2 | 5/2008 | Chang | 2006/0112144 A1 | 5/2006 | Ireton |
| 7,440,275 B2 | 10/2008 | Schedivy | 2006/0119151 A1 | 6/2006 | Vitito |
| 7,448,679 B2 | 11/2008 | Chang | 2006/0125295 A1 | 6/2006 | Schedivy |
| 2001/0001083 A1 | 5/2001 | Helot | 2006/0128303 A1 | 6/2006 | Schedivy |
| 2001/0001319 A1 | 5/2001 | Beckert et al. | 2006/0218595 A1 | 9/2006 | Chang |
| 2001/0055071 A1 | 12/2001 | Kawai | 2006/0227212 A1 | 10/2006 | Schedivy |
| 2002/0005917 A1 | 1/2002 | Rosen | 2006/0236345 A1 | 10/2006 | Schedivy |
| 2002/0085129 A1 | 7/2002 | Kitazawa | 2006/0238529 A1 | 10/2006 | Lavelle et al. |
| 2002/0105507 A1 | 8/2002 | Tranchina et al. | 2007/0001492 A1 | 1/2007 | Chang |
| 2002/0113451 A1 | 8/2002 | Chang | 2007/0001493 A1 | 1/2007 | Chang |
| 2002/0149708 A1 | 10/2002 | Nagata et al. | 2007/0008094 A1 | 1/2007 | Schedivy |

| | | | |
|---|---|---|---|
| 2007/0052618 A1 | 3/2007 | Shalam | |
| 2007/0057541 A1 | 3/2007 | Huang | |
| 2007/0070259 A1 | 3/2007 | Schedivy | |
| 2007/0091015 A1 | 4/2007 | Lavelle et al. | |
| 2007/0096517 A1 | 5/2007 | Chang | |
| 2007/0096518 A1 | 5/2007 | Chang | |
| 2007/0097210 A1 | 5/2007 | Chang | |
| 2007/0101372 A1 | 5/2007 | Chang | |
| 2007/0105444 A1* | 5/2007 | Macholz | 439/610 |
| 2007/0108788 A1 | 5/2007 | Shalam et al. | |
| 2007/0164609 A1 | 7/2007 | Shalam et al. | |
| 2008/0067842 A1 | 3/2008 | Chang | |
| 2008/0093956 A1 | 4/2008 | Maxson | |
| 2008/0165293 A1 | 7/2008 | Tranchina | |
| 2008/0191505 A1 | 8/2008 | Schedivy | |
| 2008/0246319 A1 | 10/2008 | Chang | |
| 2008/0246320 A1 | 10/2008 | Chang | |
| 2008/0252118 A1 | 10/2008 | Chang | |
| 2009/0013357 A1 | 1/2009 | Cassellia et al. | |
| 2009/0021036 A1 | 1/2009 | Chang | |

FOREIGN PATENT DOCUMENTS

| | | |
|---|---|---|
| DE | 3316818 | 11/1984 |
| DE | 3721377 A1 | 1/1989 |
| DE | 4118711 A1 | 12/1992 |
| DE | 19943696 A1 | 3/2001 |
| EP | 0 784 400 | 7/1997 |
| FR | 2817812 | 12/2000 |
| FR | 2829980 | 9/2001 |
| GB | 2276059 A | 9/1994 |
| JP | 58-128942 A | 8/1983 |
| JP | 61-161151 U | 10/1986 |
| JP | 1-94048 | 4/1989 |
| JP | 2-17777 U | 2/1990 |
| JP | 2-144242 | 6/1990 |
| JP | 2-158437 | 6/1990 |
| JP | 3-10476 A | 1/1991 |
| JP | 3-8513 Y | 3/1991 |
| JP | 3-189620 | 8/1991 |
| JP | 3-45875 Y | 9/1991 |
| JP | 3-122482 U | 12/1991 |
| JP | 4-5142 | 1/1992 |
| JP | 4-201639 | 7/1992 |
| JP | 5-38981 | 2/1993 |
| JP | 5-50883 | 3/1993 |
| JP | 5-97098 | 4/1993 |
| JP | 6-57251 U | 8/1994 |
| JP | 7-8680 B | 2/1995 |
| JP | 9-224202 | 8/1997 |
| JP | 10-75389 U | 3/1998 |
| JP | 2001-047921 | 2/2001 |
| JP | 2001-256768 A | 9/2001 |
| JP | 2001-354074 | 12/2001 |
| JP | 2001-354074 A | 12/2001 |
| JP | 2004-25949 A | 1/2004 |
| JP | 2004-81385 A | 3/2004 |
| JP | 2004-231158 A | 8/2004 |
| JP | 2004-231159 A | 8/2004 |
| JP | 2004-529688 A | 9/2004 |
| JP | 2005-503904 A | 2/2005 |
| JP | 2005-525856 A | 9/2005 |
| JP | 2005-532224 A | 10/2005 |
| SE | 63872 | 6/1924 |
| SE | 63912 | 6/1999 |
| SE | 63913 | 6/1999 |
| WO | WO 00/38951 | 7/2000 |
| WO | WO 02/074577 | 9/2002 |
| WO | WO 03/029050 A1 | 9/2002 |
| WO | WO 03/001885 | 1/2003 |
| WO | WO 2004/005077 | 1/2004 |
| WO | WO 2005/038628 | 4/2005 |

OTHER PUBLICATIONS

HR7DDPKG Installation Manual, Audiovox Electronics Corp., dated 2004.
HR9000PKG Installation Manual, Audiovox Electronics Corp., dated 2006.
Examiner's Answer during appeal of Reexamination of U.S. Patent No. 6,871,356 dated Nov. 20, 2007.
U.S. Appl. No. 10/985,262, filed Nov. 10, 2004, titled Mobile Video System.
U.S. Appl. No. 95/000,103 of U.S. Patent No. 6,871,356, filed Aug. 1, 2005.
U.S. Appl. No. 95/000,007 of U.S. Patent No. 6,339,455, filed Dec. 16, 2002.
U.S. Appl. No. 12/124,082, filed May 20, 2008, titled Flat Thin Screen TV/Monitor Automotive Roof Mount.
U.S. Appl. No. 12/252,026, filed Oct. 15, 2008, titled Headrest-Mounted Monitor.
U.S. Appl. No. 11/475,735, filed Jun. 26, 2006, titled Headrest Mounted Entertainment System.
U.S. Appl. No. 12/103,618, filed Apr. 15, 2008, titled Headrest-Mounted Entertainment Systems.
U.S. Appl. No. 12/103,638, filed Apr. 15, 2008, titled Headrest-Mounted Entertainment Systems.
U.S. Appl. No. 11/475,729, filed Jun. 26, 2006, titled Headrest Mounted Entertainment System.
U.S. Appl. No. 10/430,713 of U.S. Appl. No. 09/474,582, filed May 5, 2003.
U.S. Appl. No. 12/103,651, filed Apr. 15, 2008, titled Headrest-Mounted Entertainment Systems.
U.S. Appl. No. 11/777,936, filed Jul. 13, 2007, titled Headrest Mounted Monitor.
Request for Reexamination of U.S. Patent No. 6,871,356, dated Jul. 28, 2005.
Order Granting Request for Reexamination of U.S. Patent No. 6,871,356, dated Sep. 29, 2005.
Action Closing Prosecution for Reexamination of U.S. Patent No. 6,871,356, dated Sep. 29, 2005.
Office Action for U.S. Appl. No. 10/361,897, now U.S. Patent No. 6,871,356 mailed Aug. 7, 2003.
Office Action for U.S. Appl. No. 10/361,897, now U.S. Patent No. 6,871,356, mailed Feb. 26, 2004.
Office Action for U.S. Appl. No. 10/361,897, now U.S. Patent No. 6,871,356, mailed Aug. 23, 2004.
Unsolicited letter from Trakker Technologies, Inc., dated Sep. 20, 2005.
"Multimedia halt Einzug im Auto", p. 38-39, *Automotive Electronics 2000*.
U.S. Appl. No. 11/475,735, filed Jun. 26, 2006, titled Headrest Mounted Entertainment System, listing Chung Lung Chang as inventor.
U.S. Appl. No. 11/475,727, filed Jun. 26, 2006, titled Headrest Mounted Entertainment System, listing Chung Lung Chang as inventor.
U.S. Appl. No. 11/475,729, filed Jun. 26, 2006, titled Headrest Mounted Entertainment System, listing Chung Lung Chang as inventor.
Decision on Appeal of Reexamination of U.S. Patent No. 6,871,356 dated June 25, 2009 (U.S. Appl. No. 95/000,103).
U.S. Appl. No. 12/475,332, filed May 29, 2009, titled Headrest Mounted Monitor.

* cited by examiner

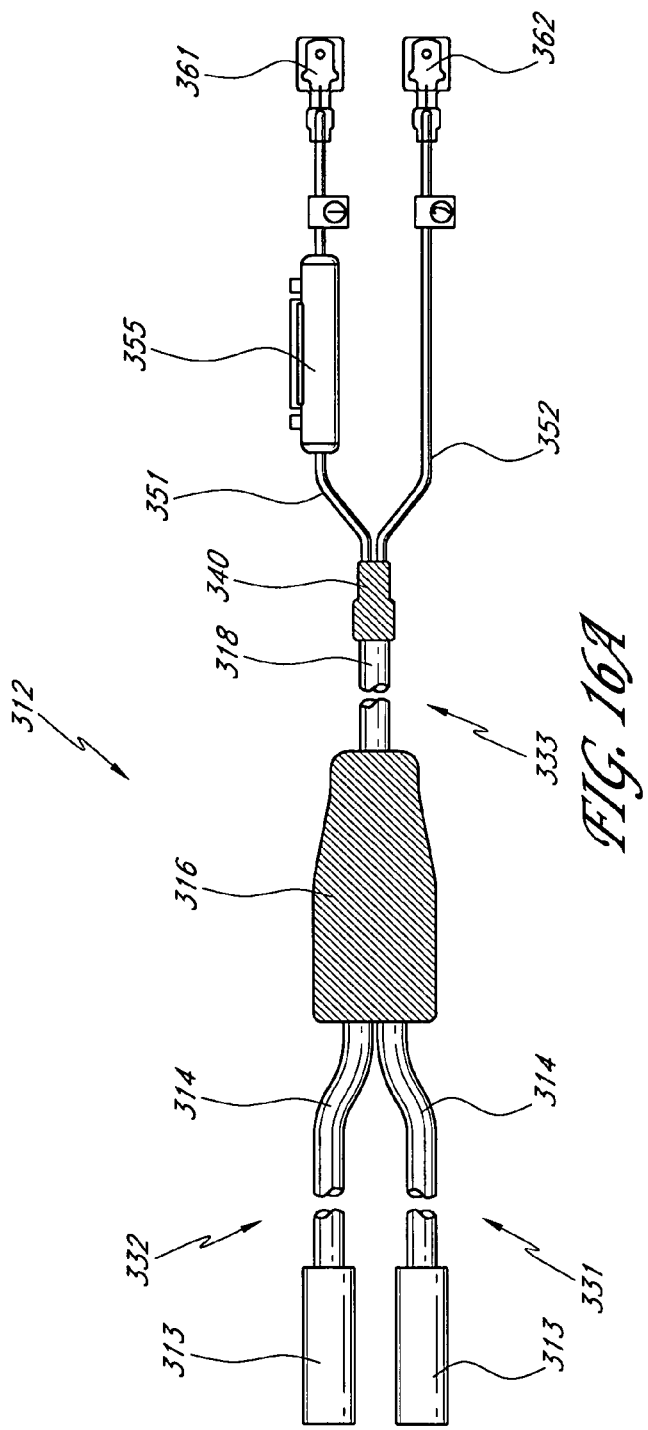
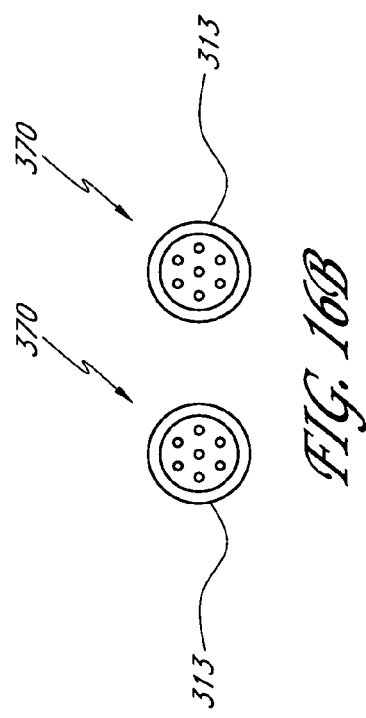
FIG. 16A
FIG. 16B

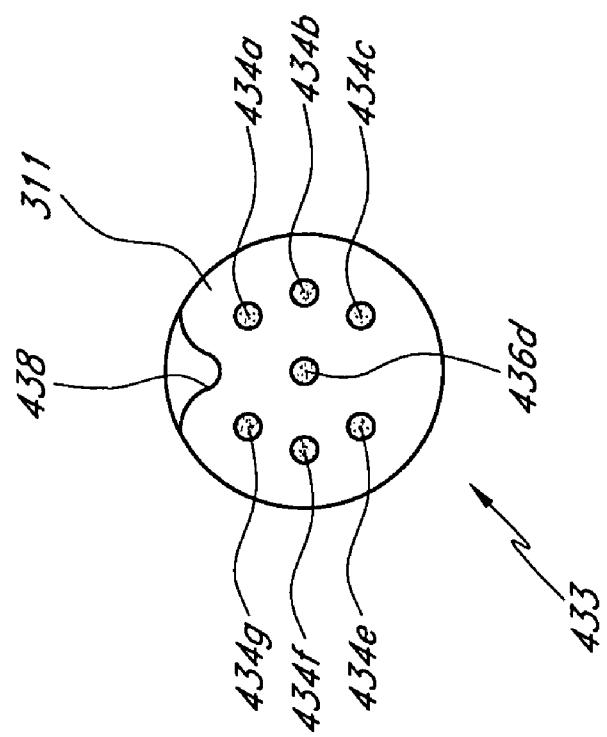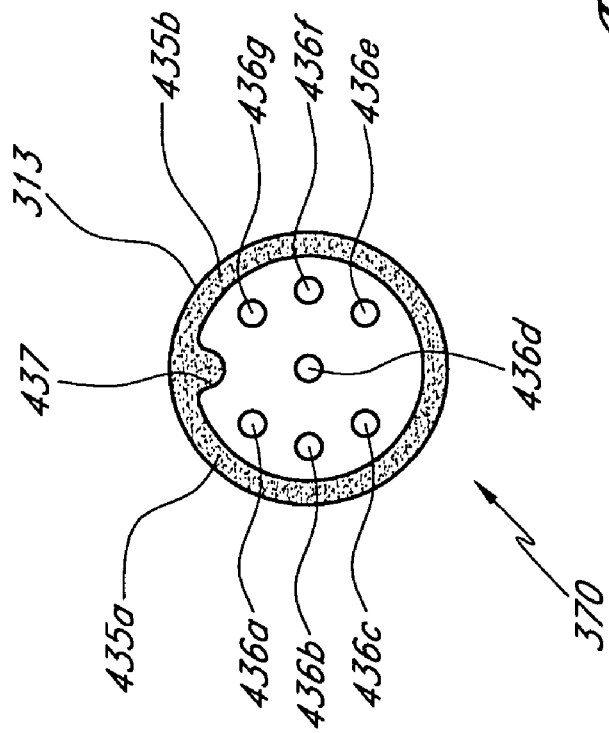
FIG. 18

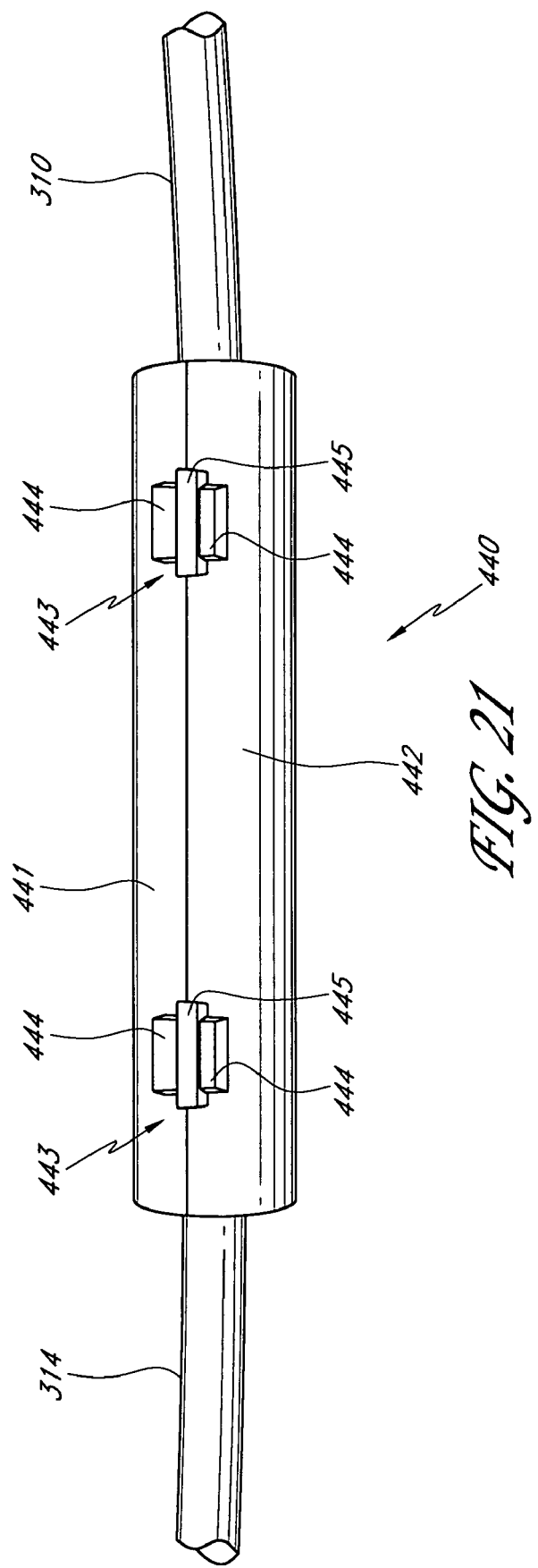

HEADREST MOUNTED ENTERTAINMENT SYSTEM

CROSS-REFERENCE TO RELATED APPLICATIONS

This application claims the benefit under 35 U.S.C. §119 (e) of U.S. Provisional Application No. 60/732,788, filed Nov. 2, 2005, titled HEADREST ENTERTAINMENT SYSTEM, U.S. Provisional Application No. 60/740,540, filed Nov. 29, 2005, titled HEADREST ENTERTAINMENT SYSTEM, and U.S. Provisional Application No. 60/811,879, filed Jun. 7, 2006, titled HEADREST MOUNTED ENTERTAINMENT SYSTEM, the entire contents of each of which are hereby incorporated by reference herein and made a part of this specification.

BACKGROUND OF THE INVENTION

Field of the Invention

This application relates to entertainment systems that can be mounted in a vehicle, such as an automobile, and more particularly relates to headrest-mounted entertainment systems for vehicles.

SUMMARY OF THE INVENTION

In one embodiment, a mobile video system is provided that comprises a first entertainment system mountable in a first headrest of a vehicle. The first entertainment system comprises a first input having a structure and a first output having a structure. The mobile video system further comprises a second entertainment system mountable in a second headrest of a vehicle. The second entertainment system comprises a second input and a second output. The second input has a structure the same as the structure of the first input and the second output has a structure the same as the structure of the first output. The mobile video system further comprises an adapter configured to couple the first input with the second output and the second input with the first output.

In another embodiment, a media system is provided that comprises a first headrest-mountable entertainment system. The first headrest-mountable entertainment system comprises a first connector comprising a first input and a first output. The media system further comprises a second headrest-mountable entertainment system. The second headrest-mountable entertainment system comprises a second connector comprising a second input and a second output. The media system further comprises an adapter. The adapter comprises a third connector configured to couple with either the first or second connector and a fourth connector configured to couple with either the first or second connector. The adapter further comprises a first communication line coupled with the third and fourth connectors such that the first output is able to communicate with the second input or the second output is able to communicate with the first input. The adapter further comprises a second communication line coupled with the third and fourth connectors such that the first output is able to communicate with the second input or the second output is able to communicate with the first input.

In another embodiment, a mobile video system is provided. The system includes a motorized land vehicle and an entertainment system. The motorized land vehicle includes a passenger compartment and a seat that has a headrest. The seat is positioned in the passenger compartment. The entertainment system includes a component mounting frame that is configured to be positioned in the headrest, a signal source, a video monitor, and a cover. The signal source has an access aperture through which a non-volatile storage medium can be inserted. The signal source is capable of generating a signal based on data stored in the non-volatile storage medium. The signal source is coupled with the component mounting frame such that when the component mounting frame is positioned in the headrest, the access aperture is located adjacent an upper surface of the headrest. The video monitor is configured to reproduce at least a portion of the signal. The cover is pivotably mounted to the component mounting frame and has a first position in which the access aperture is exposed such that the non-volatile storage medium can be inserted therethrough and a second position in which the access aperture is blocked.

In another embodiment, a headrest entertainment assembly is provided that comprises a headrest and an entertainment system. The headrest has an upper surface, a lower surface, and a cavity. The entertainment system includes a component mounting frame, a signal source, a monitor, and a cover. The component mounting frame is configured to be positioned within the cavity of the headrest. The signal source has an access aperture through which a non-volatile storage medium can be inserted. The signal source is capable of generating a signal based on data stored in the non-volatile storage medium. The signal source is coupled with the component mounting frame such that the access aperture is adjacent the upper surface of the headrest when the component mounting frame is positioned in the cavity. The monitor is coupled with the component mounting frame and is configured to reproduce at least a portion of the signal. The cover is coupled with the mounting frame and has a first position in which the access aperture is exposed such that the non-volatile storage medium can be inserted through the access aperture and a second position in which the access aperture is blocked.

In another embodiment, a headrest entertainment system is provided that includes a frame, a DVD player, a monitor, and a cover. The frame is configured to be positioned within a vehicle headrest. The DVD player has a slot through which a digital video disc ("DVD") can be inserted. The DVD player is coupled with the frame such that the slot is adjacent an upper surface of the headrest when the frame is positioned within the headrest. The monitor is coupled with the frame and configured to reproduce at least a video portion of the DVD. The cover has a first position in which the access aperture is exposed such that the DVD can be inserted through the slot and a second position in which the slot is blocked.

In another embodiment, a headrest entertainment system is provided that comprises a frame configured to be positioned within a vehicle headrest. The entertainment system further comprises a source coupled with the frame and configured to generate a signal to be reproduced within a vehicle. The signal includes a radio portion. The entertainment system further comprises a monitor coupled with the frame and configured to reproduce at least the video portion of the signal. The entertainment system further comprises a first aperture positioned on a first surface of the headrest and a second aperture positioned on a second surface of the headrest opposite the first surface. The entertainment system further comprises a fan coupled with the frame and positioned adjacent to at least one of the apertures.

In another embodiment, a headrest entertainment system is provided that comprises a vehicle headrest, a frame, a DVD player, a monitor, and a heat management system. The vehicle headrest has a cavity formed therein. The frame is configured to be positioned within the cavity of the vehicle headrest. The DVD player has a slot through which a digital video disc ("DVD") can be inserted. The monitor is coupled with the frame and is configured to reproduce at least a video portion of a signal from the DVD. The heat management system includes a plurality of venting structures and a fan. The venting structures are formed adjacent to an external surface of the headrest. The fan is coupled with the frame and positioned adjacent to at least one of the venting structures.

In another embodiment, a mobile media system is provided that comprises an entertainment system having a first cable coupled with a first plug. The first plug comprises a first interference surface. The mobile media system further comprises a second cable coupled with a second plug. The second plug comprises a second interference surface, and the first and second plugs are configured to couple with each other. The mobile media system further comprises a retention device that includes a body at least partially defining a cavity configured to accept the first and second plugs. The retention device further comprises a third interference surface configured to cooperate with the first interference surface to substantially prevent movement of the first plug relative to the second plug. The retention device further comprises a fourth interference surface configured to cooperate with the second interference surface to substantially prevent movement of the second plug relative to the first plug.

In another embodiment, a media system is provided that comprises an entertainment system configured to be mounted in a headrest of a vehicle. The entertainment system has a first cable coupled with a first connector. The media system further comprises a second cable coupled with a second connector, and the first and second connectors are configured to couple with each other. The media system further comprises a retainer configured to couple with the first and second connectors. The retainer substantially inhibits axial movement between the first and second connectors when coupled therewith.

In another embodiment a media system is provided that comprises an entertainment system configured to be mounted in a headrest of a vehicle. The entertainment system has a first cable coupled with a first connector. The media system further comprises a second cable coupled with a second connector, and the first and second connectors are configured to couple with each other. The media system further comprises a retainer configured to couple with the first and second connectors. The retainer substantially inhibits transverse movement between the first and second connectors when coupled therewith.

In another embodiment, a media system is provided that comprises an entertainment system configured to be mounted in a headrest of a vehicle. The entertainment system comprises a first cable coupled with a first connector. The media system further comprises a second cable coupled with a second connector, and the first and second connectors configured to couple with each other. The media system further comprises a retainer comprising a first interference surface and a second interference surface. The first and second interference surfaces are configured to substantially prevent axial movement of the first and second connectors relative to each other. The retainer further comprises at least a third interference surface configured to substantially prevent radial movement of the first and second connectors relative to each other. The retainer further comprises a fastener configured to permit the retainer to selectively couple with and decouple from the first and second connectors.

BRIEF DESCRIPTION OF THE DRAWINGS

These and other features, aspects and advantages of the present invention will be better understood with reference to preferred embodiments which are illustrated in the accompanying drawings. The illustrated embodiments are not intended to define the outer limits of the scope of the present invention.

FIG. 16A is a front plan view of one embodiment of an adapter for coupling with a first and second entertainment system.

FIG. 16B is a partial top plan view of the adapter of FIG. 16A showing coupler interfaces of two connectors.

FIG. 18 is a top plan view of one embodiment of an entertainment system connector and one embodiment of an adapter connector.

FIG. 21 is a front perspective view of one embodiment of a retention device in a closed configuration and enclosing two coupled connectors.

DETAILED DESCRIPTION OF PREFERRED EMBODIMENTS

Figure 1:
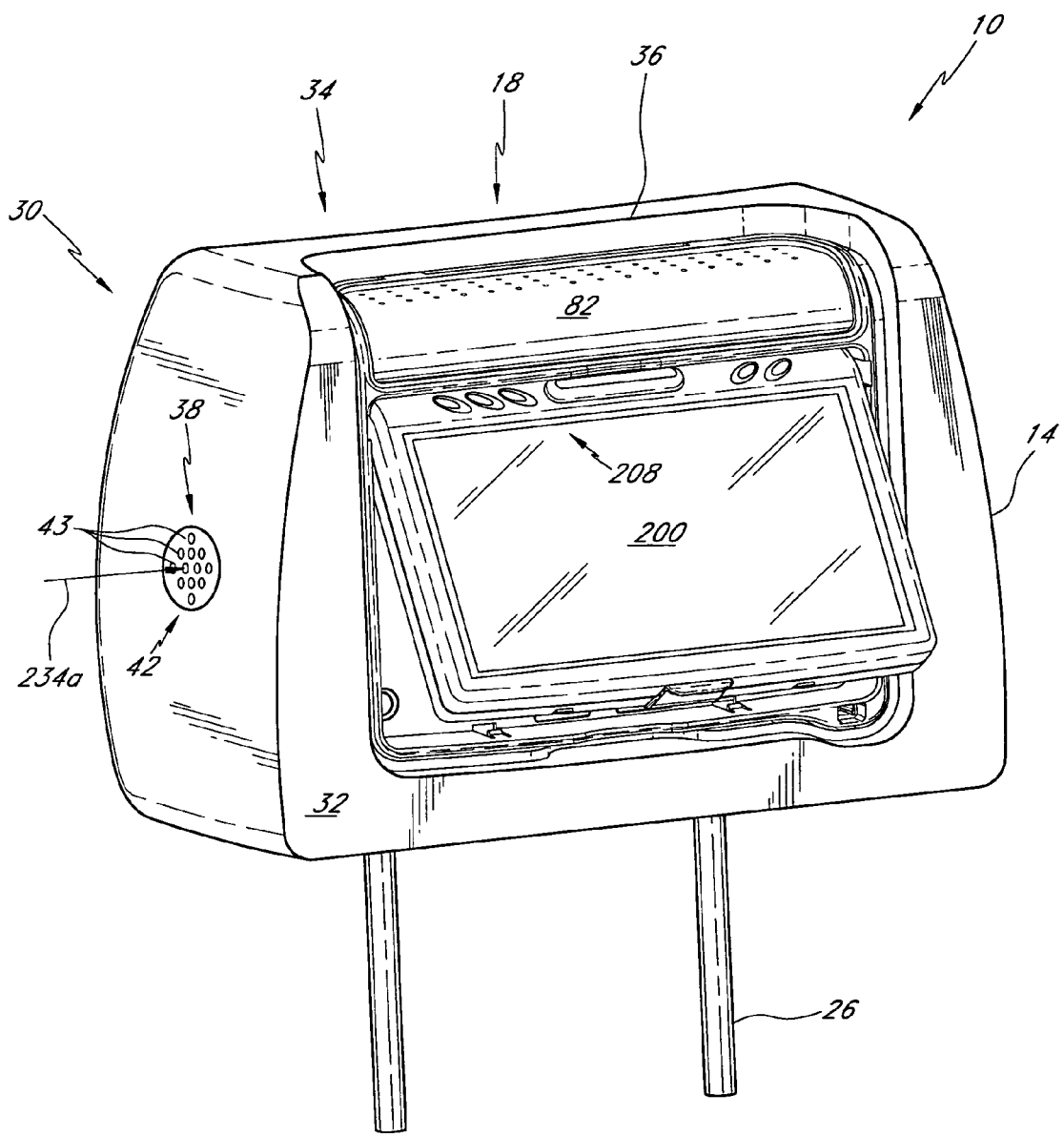
FIG. 1 is a top perspective view of one embodiment of a headrest entertainment assembly that includes an entertainment system mounted in a headrest of a vehicle. Access to at least one component of the entertainment system can be limited by a cover, which is shown in a closed position.

FIG. 1 shows one embodiment of a headrest entertainment assembly 10. The assembly 10 has a number of advantageous features. As discussed further below, the headrest entertainment assembly 10 and some variations thereof include a component cover that provides protection in connection with a signal source. Another feature of the assembly 10 and of some variations is a cooling system that keeps the components thereof from overheating. Further advantages of the assembly 10 and of some variations thereof reside in various inventive techniques for manufacturing the assembly 10, which techniques provide advantages associated with inventory control. Also, some embodiments of the assembly 10 and techniques for producing the assembly result in enhanced safety features for passengers in a vehicle in which the assembly 10 is mounted.

The headrest entertainment assembly 10 includes a vehicle headrest 14 and an entertainment system 18. Preferably the headrest entertainment assembly 10 is mounted in a vehicle, such as a car. As used herein "car" is a broad term and is used in its ordinary sense and refers, without limitation, to any personal land transportation vehicle, e.g., a passenger automobile, a truck, a van, a minivan, a sport-utility vehicle, and similar such vehicles. Certain features, aspects and advantages of the embodiments described herein can be used with other vehicles.

The headrest entertainment assembly 10 can be constructed by various preferred methods, which are discussed below. Broadly, in one method, the headrest 14 is formed about other portions of the headrest entertainment assembly 10 so as to provide an integral unit. In other methods, interchangeability of components is enhanced by making the headrest 14 separable from other components of the headrest entertainment assembly 10.

Features of the vehicle headrest 14 are discussed below in connection with various embodiments. In one variation discussed below, the headrest 14 forms a portion of a seat of a vehicle and can be separately movable or adjustable relative to other portions of the seat. Although the headrest environment is preferred, in other embodiments entertainment systems comprising a sub-combination of the components of the assembly 10 can be deployed in an upper region of a seat, e.g., a seat back. The headrest 14 can take other suitable forms.

The headrest entertainment assembly 10 also includes a mounting system 22. In one variation, the mounting system 22 includes at least one seat post 26 that extends between the headrest 14 and a seat back (not shown) to which the headrest 14 can be coupled. In the illustrated embodiment, the mounting system 22 includes two seat posts 26. The seat posts 26 can be solid or hollow and can be configured to convey signals from or to the headrest entertainment assembly 10. Preferably, where two or more seat posts 26 are provided at least one of the seat posts is hollow, having a passage extending therethrough in which at least a portion of a cable conveying the signal can be located. As discussed further below, in some embodiments the size of the passage can be enlarged by reducing the thickness of a wall of the seat posts 26. As discussed further below, in some embodiments, the headrest entertainment assembly 10 includes a signal source mounted in the headrest 14. In other embodiments, a signal source is not mounted in the headrest 14, but is located elsewhere within the vehicle. In other embodiments, the headrest entertainment assembly 10 includes multiple signal sources, one or more of which can be mounted in the headrest and one or more of which can be located elsewhere in the vehicle. In other embodiments, multiple entertainment systems can be provided in multiple headrests. In other embodiments, multiple entertainment systems and multiple signal sources can be provided such as is described in U.S. Pat. No. 6,871,356, which is hereby expressly incorporated by reference herein.

The seat post 26 arrangement facilitates adjustability of the headrest entertainment assembly 10. This adjustability can be combined with additional modes of adjustability, such as tilting of a monitor or other portion of the headrest entertainment assembly 10, as discussed further below.

Figure 11:
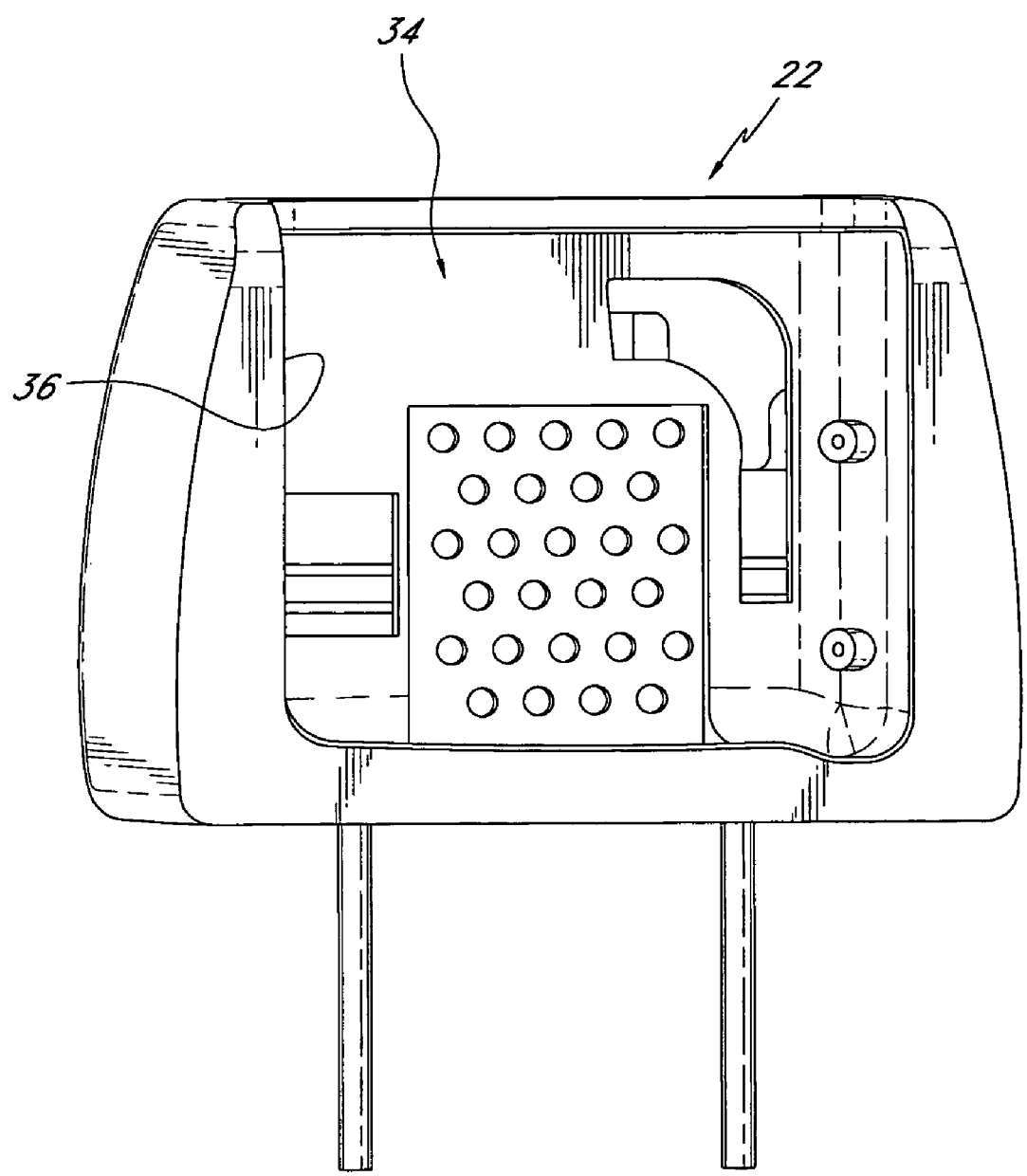
FIG. 11 is a perspective view of one embodiment of a portion of a mounting system.

As discussed further below, the construction of the mounting system 22, e.g., of the posts 26, may be such that cables that interconnect a plurality of entertainment systems can be quickly and efficiently routed therethrough. As discussed further below, one way to facilitate quick routing of a signal cable through the post 26 is by increasing the inner cross-sectional size (e.g., diameter) of a hollow passage extending through the post 26. As discussed further below, the inner cross-sectional size of a passage extending through the posts 26 can be increased by increasing the size (e.g., the inner and outer diameter) of the posts 26. In some applications, the outer size of the posts 26 can not be increased because the size of a corresponding post hole in the seat back in which the post 26 is inserted is selected by car or seat manufacture and cannot easily be increased. In some situations, such as when the outer size of the posts 26 cannot easily be increased, the mounting system 22 can be configured to permit the wall thickness of the posts 26 to be decreased. By providing a fixed outer size and by reducing the thickness of the wall of the post 26, the inner size of the passage in the post can be increased, making routing of signal cables easier. In some arrangements discussed further below, the mounting system 22 is configured to permit the wall thickness of the posts 26 to be decreased by providing a reinforced member that extends between two posts 26. The mounting system 22 is discussed in more detail in connection with FIG. 11.

Figure 13:
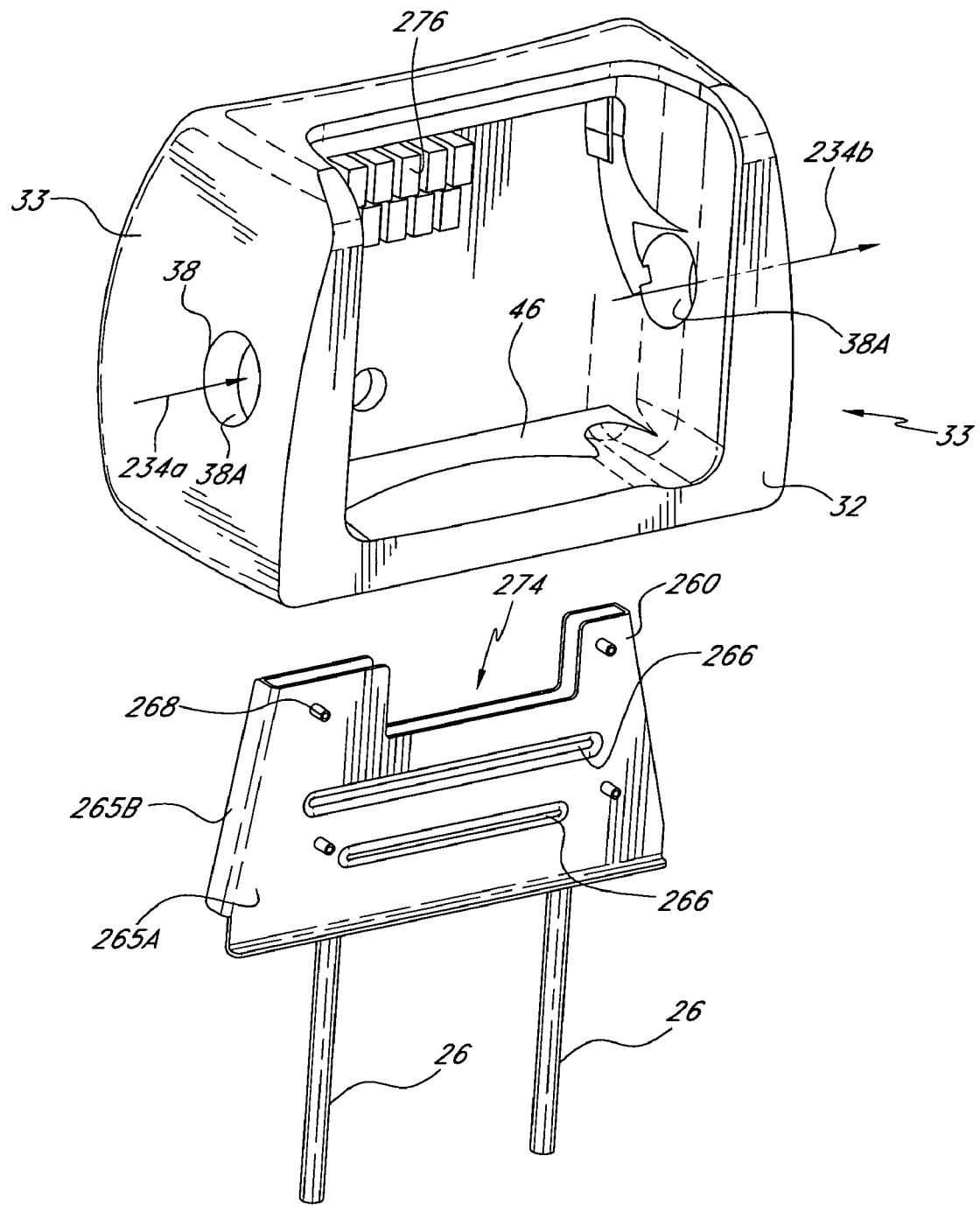
FIG. 13 is a perspective exploded view of one embodiment of a headrest with a portion of one embodiment of a mounting system shown removed therefrom.

In one embodiment, the headrest 14 includes a forward-facing side 28 that includes a pad or a pillow 30 to cushion the head of an occupant in the seat with which the headrest is coupled. The pillow 30 may extend to any of a top, bottom, side-facing side 33, and rear-facing side 32 of the headrest 14, as shown in FIG. 13. Preferably, the pillow 30 is formed by blow-molding a foam material into a mold having a shape and design appropriate for the car in which the headrest 14 is to be used. For example, the headrest 14 can have the same outer shape and design as the factory headrest. The pad 30 can then be wrapped in a suitable material, such as a fabric, e.g., solid or perforated leather, or other suitable material. As discussed further below, in one technique, the pad 30 is blow molded directly onto a portion of the mounting system 22 such that the pad 30 and the mounting system 22 are integrally connected. In another technique, a pad 30 is blow molded as a separate component and is configured to receive at least a portion of the mounting system 22 during assembly such that the pad 30 and the mounting assembly 22 could be disassembled after shipment from the factory.

As discussed above, the pillow 30 provides cushioning for a person seated in the seat with which the headrest 14 is coupled, e.g., to minimize injury in the event of an accident. The headrest 14 preferably also includes a rear-facing side 32. Preferably an entertainment system mounting cavity 34 is formed in the headrest 14. In some embodiments, the entertainment system mounting cavity 34 is accessible from the rear-facing side 32.

Access can be provided to the entertainment system mounting cavity 34 through a mounting cavity aperture 36. Preferably the mounting cavity aperture 36 is shaped to receive the entertainment system 18. In one embodiment, the aperture 36 is at least partially surrounded by a plurality of edges on the rear-facing side 32 of the headrest 14. The aperture 36 can also be partly surrounded by at least one edge on a top surface 37 of the headrest 14. In some arrangements, the headrest 14 includes an intermediate surface that extends between the top surface 37 and the rear-facing surface 32. The intermediate surface can be curved or flat, e.g., radiused or beveled. Accordingly, the mounting cavity aperture 36 can be at least partly surrounded by one or more edges that extend between the top surface 37 and the rear-facing surface 32 of the headrest 14. In other embodiments, the mounting cavity aperture 36 can be at least partially surrounded by one or more edges located on a bottom surface of the headrest 14.

As discussed below, in some embodiments, the entertainment system 18 is configured to be able to move when positioned in the mounting cavity aperture 36. For example, in some embodiments, the entertainment system can pivot at least partially into and out of the entertainment system mounting cavity 34 through the mounting cavity aperture 36.

In some embodiments, the headrest entertainment assembly 10 includes a cooling system to maintain the operating temperature of the components of the headrest entertainment assembly 10 in an acceptable range. Further details of the cooling system are discussed below. In one embodiment, the headrest 14 includes an opening or aperture 38 adjacent which at least a portion of the cooling system can be mounted. The aperture 38 is one configuration of a venting structure that can be incorporated to enhance cooling of the headrest entertainment assembly 10. In some embodiments, at least one of a plurality of apertures 38 and other venting structures adjacent an external surface of the assembly 10 can be provided to enhance cooling. For example, as discussed below, a first aperture 38 can be provided on one surface and a second aperture 38 can be provided on a second surface that is opposite the first surface. This arrangement advantageously increases cross-flow from the first aperture to the second aperture. Cooling of the components of the headrest entertainment assembly 10 can be further enhanced by additional venting structures and by devices, e.g., one or more fans 40, which increase flow across the components thereof. Features of various embodiments of cooling systems will be discussed in greater detail below.

FIG. 13 shows that in some embodiments, a plurality of openings 38 are provided for enhanced cooling of the entertainment system 18. Also, although the openings 38 are located on side surfaces of the headrest 14, these components can be located on other surfaces, such as on one or more of a top surface, a front surface, a rear surface, and a bottom surface. The side surfaces are advantageous locations for the openings 38 because they are exposed in all positions of the headrest 14 and are spaced from the entertainment system 18 and the surface facing the head of the person in the seat. In some arrangements, the top surface of the headrest 14 may be large enough to accommodate openings 38. Wherever positioned, the openings 38 can be any desired shape, e.g., round, elongated. The openings 38 also can be relatively small or relatively large compared to the surface area of the side of the headrest 14 upon which they are located. For example, if a plurality of openings 38 are provided, the openings can be small compared to (in some cases, substantially smaller than) the surface area of the side of the headrest 14 upon which they are located. For example, the openings 38 can be less than about one-half the surface area of the side of the headrest 14 upon which they are located. In other embodiments, the opening(s) 38 can be relatively large, e.g., about one-half or more than, the surface area of the side of the headrest 14 upon which the openings are located. Also, although paired openings 38 are shown as having a similar configuration, e.g., size and shape, multiple openings 38 could be differently configured, e.g., one larger than and one smaller than one-half the surface area of the side upon which they are located.

FIG. 1 shows that an aperture cover 42 extends across the aperture 38 in one embodiment. The aperture cover 42 includes a plurality of discrete openings or venting holes 43 configured to permit air to pass into and out of the entertainment system mounting cavity 34. Such airflow can be used to cool the entertainment system 18 or other components of the headrest entertainment assembly in thermal communication with the system 18.

Figure 1A:
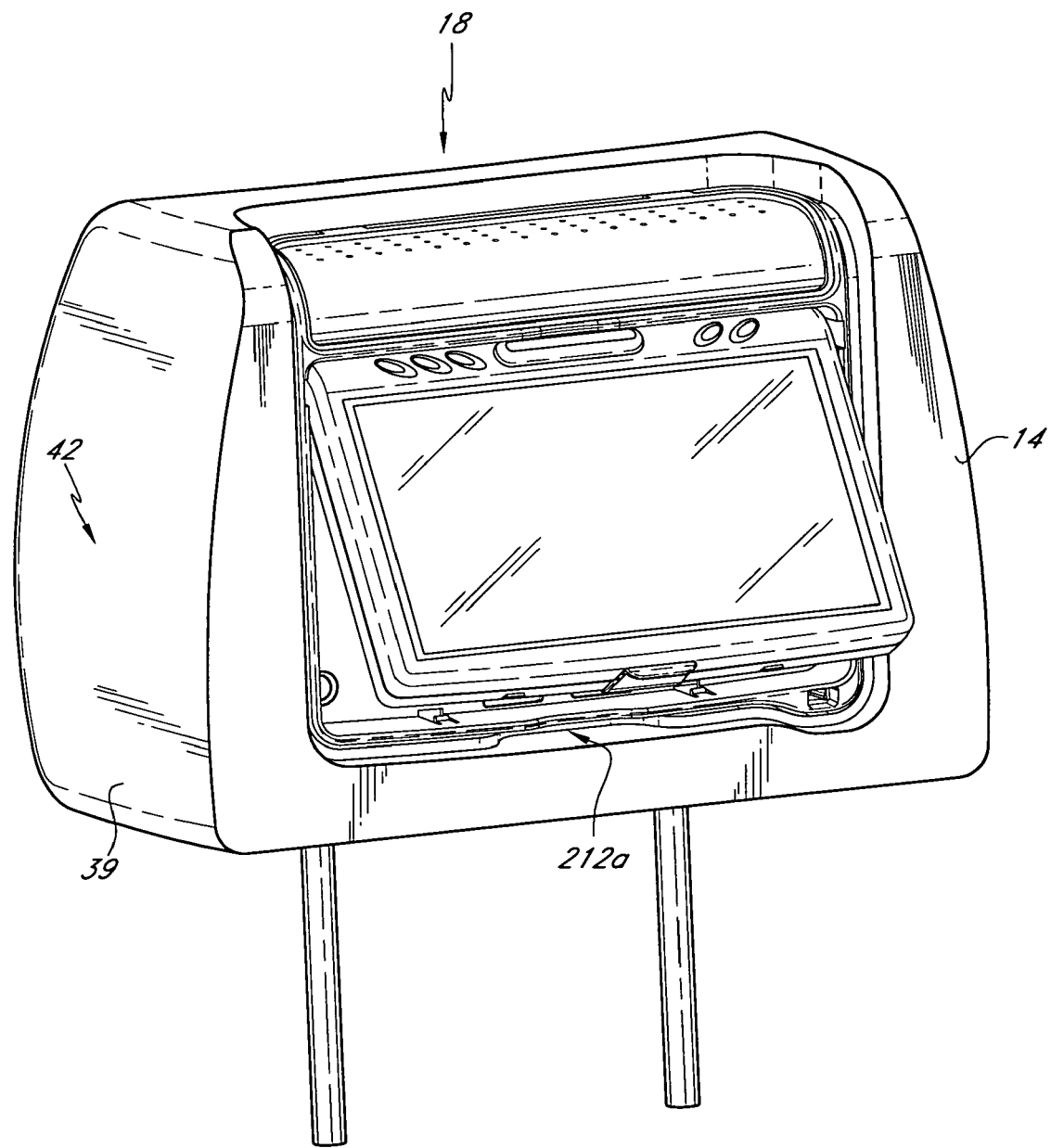
FIG. 1A is similar to FIG. 1 showing another embodiment of a headrest entertainment assembly.

FIG. 1A shows that in some embodiments, visible openings in the aperture cover 42 are not required. This arrangement can be used when other devices are provided to cool the entertainment system 18 such that airflow through the aperture cover 42 is not required. In some arrangements, the aperture cover 42 comprises a porous material membrane that appears solid, but permits airflow therethrough without visible openings. In other arrangements, the aperture cover 42 substantially blocks the aperture 38 where enhanced cooling is not needed, e.g., in entertainment systems that have components that emit low amounts of heat, tolerate greater heat levels, or are disposed in structures not sensitive to heat. In other arrangements, the aperture 38 is not provided. In certain of such arrangements, the material 39 that forms the side surface of the headrest 14 is itself perforated or porous, including structures similar to the venting holes 43 which may or may not be visible.

FIG. 13 shows that the headrest 14 can also include a seat mounting aperture 46 that can be located on a lower or bottom side of the headrest 14. The seat mounting aperture 46 permits at least one component of the mounting system 22 to extend through the bottom side of the headrest 14 to an interior portion thereof. In one embodiment, the entertainment system mounting cavity 34 extends from the rear surface 32 of the headrest 14 to a location vertically above the seat mounting aperture 46. This arrangement permits convenient assembly of the headrest 14 and the entertainment system 18 as discussed below. In some arrangements, a common cavity can be provided in which components of the mounting system 22 and of the entertainment system 18 can be positioned.

FIGS. 2-10 illustrate additional details of various embodiments of the a headrest entertainment assembly 10.

In certain embodiments, the entertainment system 18 includes a signal source 78 and a monitor 200. In other embodiments, the entertainment system 18 also includes a component cover 82. In some embodiments, the entertainment system 18 further includes a monitor assembly 74, which includes the monitor 200 and facilitates mounting of the monitor. As discussed below, the monitor assembly 74 provides one or more advantageous features, such as housing the monitor 200, protecting the monitor from damage, locating associated components nearby, and enabling moving or pivoting of the monitor relative to the headrest 14, as discussed further below.

In some embodiments, the entertainment system 18 also includes a component mounting frame 70 to which at least one of the monitor 200 and the signal source 78 are secured. In some arrangements, the mounting frame 70, together with at least one component, provides a unitary construction. In one embodiment, the mounting frame 70 provides a rigid structure for mounting at least one component. In some arrangements, the mounting frame 70 is configured to be coupled with the monitor assembly 74 and the signal source 78. As discussed further below, the mounting frame 70 also can be configured to be coupled with the cover 82 in some embodiments.

In one embodiment, the monitor assembly 74, the signal source 78, and the cover 82 are all coupled with the mounting frame 70 prior to insertion into the entertainment system mounting cavity 34. Preassembling the monitor assembly 74, the signal source 78, and the cover 82 to the mounting frame 70 together is convenient for installation because an installer does not have to separately assemble these components, which can be easily damaged during the installation process if not handled carefully. Further details of techniques for assembling the headrest entertainment assembly 10 are discussed below.

Figure 6:
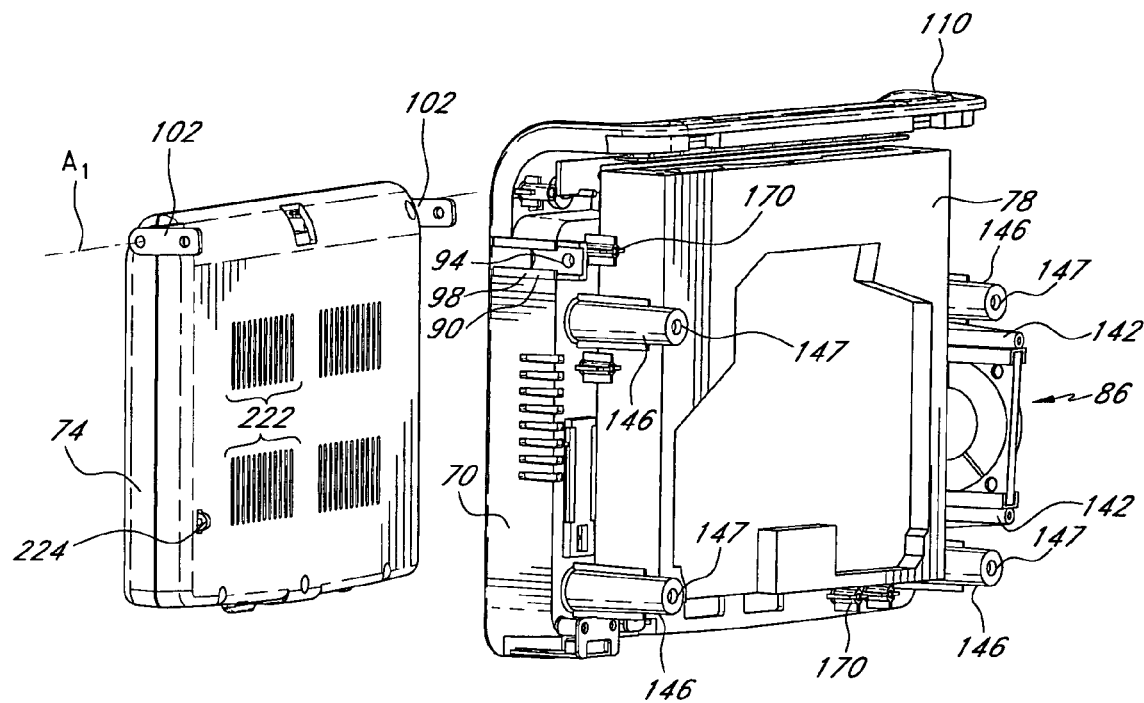
FIG. 6 is a rear perspective exploded view of the entertainment system of FIG. 1 with a monitor assembly removed therefrom.

FIG. 6 shows further details of one embodiment of the component mounting frame 70. The component mounting frame 70 can include a monitor coupling portion 90 to which the monitor assembly 74 can be connected. Preferably, the monitor coupling portion 90 includes one or more hinge mounts 94. Additional structures that can be combined with or incorporated into various embodiments of the assembly 10, including structures for mounting the monitor assembly 74 to the mounting frame 70, are discussed in U.S. Pat. No. 7,044,546, which is hereby expressly incorporated by reference herein. As discussed further below, the monitor coupling portion 90 preferably permits at least a portion of the monitor assembly 74 to move into and out of the entertainment system mounting cavity 34. In one embodiment, the monitor coupling portion 90 enables the monitor assembly 74 to pivot into and out of the entertainment system mounting cavity 34. One arrangement provides a first elongated bracket 98 that includes a hinge mount 94. The hinge mount 94 can include an aperture through which a fastener can be inserted. A second elongated bracket 102 can be coupled with the monitor assembly 74 and can be configured to pivot relative to the monitor assembly 74. Preferably the elongate bracket 102 also includes a hinge mount having a similar configuration to the hinge mount 94.

In one arrangement the monitor assembly 74 is coupled with the frame 70 by a hinge, which may comprise the bracket portions 98, 102.

Coupling of the hinge mounts of the first and second elongate bracket portions 98, 102 can be facilitated by a suitable fastener, for example, a screw or bolt. In other arrangements, a detent arrangement can be relied upon, at least in part, to couple the first and second elongate portions 98, 102. In some embodiments, means for securing the coupling of the first and second elongate portions, or of two portions of the coupling portion 90 can be provided. In one embodiment, the means includes a bonding grease that provides a tighter fit between the first and second elongate portions 98, 102. Where provided, the bonding grease can take any suitable form. Preferably the bonding grease enables movement of the first and second elongate portions 98, 102 relative to each other upon application of a threshold force but prevents such movement upon forces less than the threshold force. Preferably, the securing means, e.g., the bonding grease, prevents the bracket portions 98, 102 from becoming separated from each other due to normal vibration that are induced in the monitor assembly 74 from the vehicle. In other embodiments, the securing means comprises a suitable adhesive which substantially prevents movement due to vibration or any other force.

Figure 5:
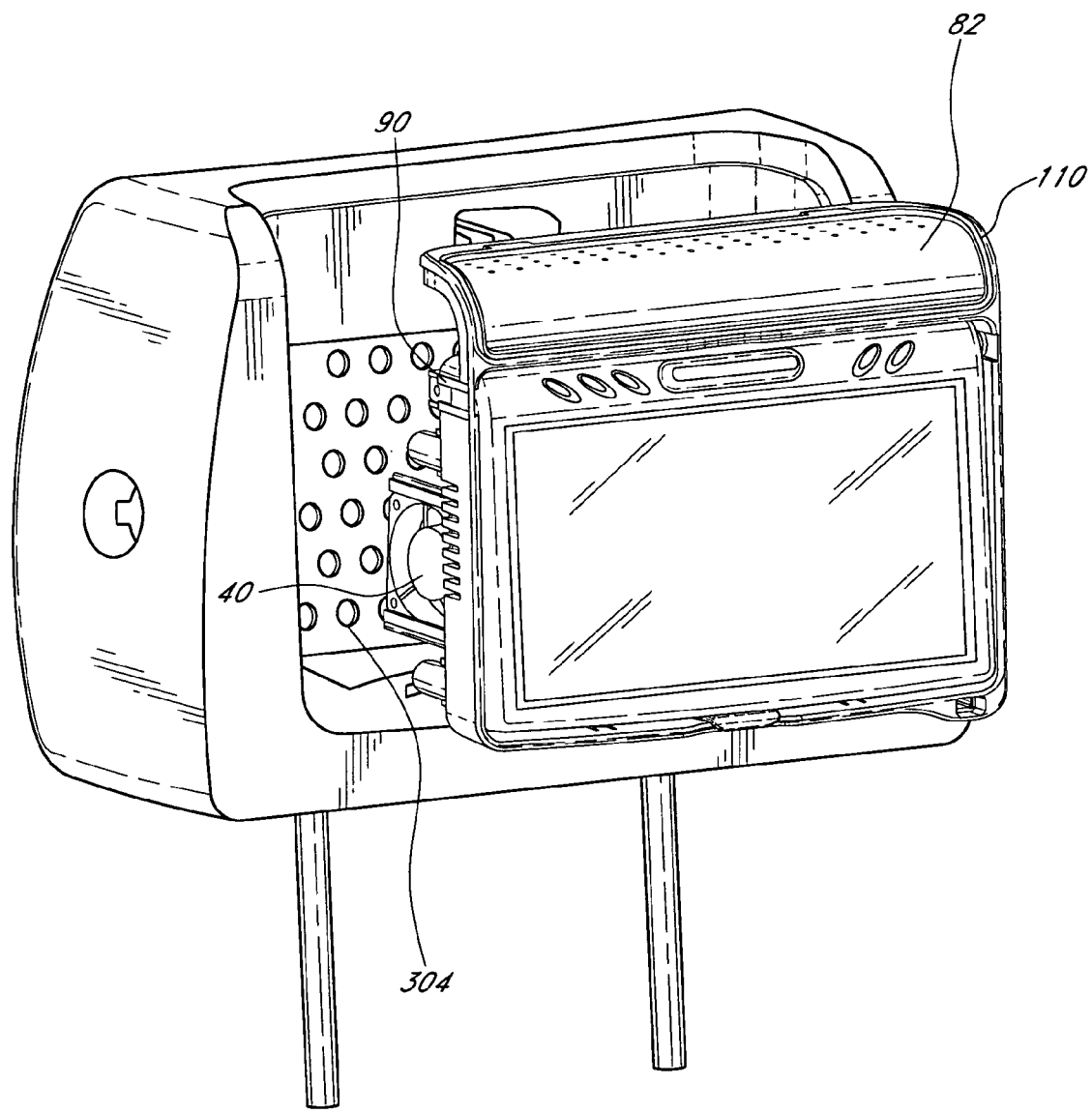
FIG. 5 is a front perspective exploded view of the headrest entertainment assembly of FIG. 1 with the entertainment system removed from the headrest.

When the first and second elongated brackets 98, 102 are coupled at the hinge mounts 94, the monitor assembly 74 is able to pivot relative to the component mounting frame 70. As shown in FIGS. 5 and 6, in one embodiment the component mounting frame 70 includes a plurality (e.g., two) monitor coupling portions 90. FIGS. 5 and 6 also show that in some embodiments a plurality of (e.g., two) hinges can be provided, such as by providing a second elongated bracket 102 on each side of the monitor assembly 74. The illustrated arrangement permits the monitor assembly 74 to pivot about an axis $A_1$ extending through the second elongated brackets 102. In particular, the monitor assembly 74 pivots about the axis $A_1$ at an end of the second elongated bracket 102 opposite an end that is coupled with the first elongate mounting bracket 98 in one embodiment.

As discussed further below, the pivoting of the monitor assembly 74 about the axis $A_1$ serves multiple functions. For example, pivoting enables the monitor 200 to be positioned in an orientation that is most comfortable for the user to view the video signal visible thereon. Pivoting also can enable convenient assembly, by providing an installation position in which the monitor assembly 74 is spaced from the frame 70 sufficiently to expose mounting structures, as discussed below.

The component mounting frame 70 preferably also includes a component cover mount portion 110. The component cover mount portion 110 can comprise a bracket. In one embodiment, the component cover mount portion 110 is located behind (e.g., at a location further recessed from the surface 32 in the mounting cavity aperture 36 when the assembly 10 is assembled) the monitor coupling portion 90. Preferably, the component cover mount portion 110 is located behind a front side of the component mounting frame 70. In one embodiment, the component cover mount portion 110 extends to a location vertically above a component mounting area 114. The component mounting area 114 provides a space or volume into which the signal source 78 can be positioned or mounted as discussed below. The component mounting area 114 can be partially or completely enclosed. In some embodiments, the component mounting area 114 is substantially exposed on a plurality of (e.g., on four) sides.

Figure 2:
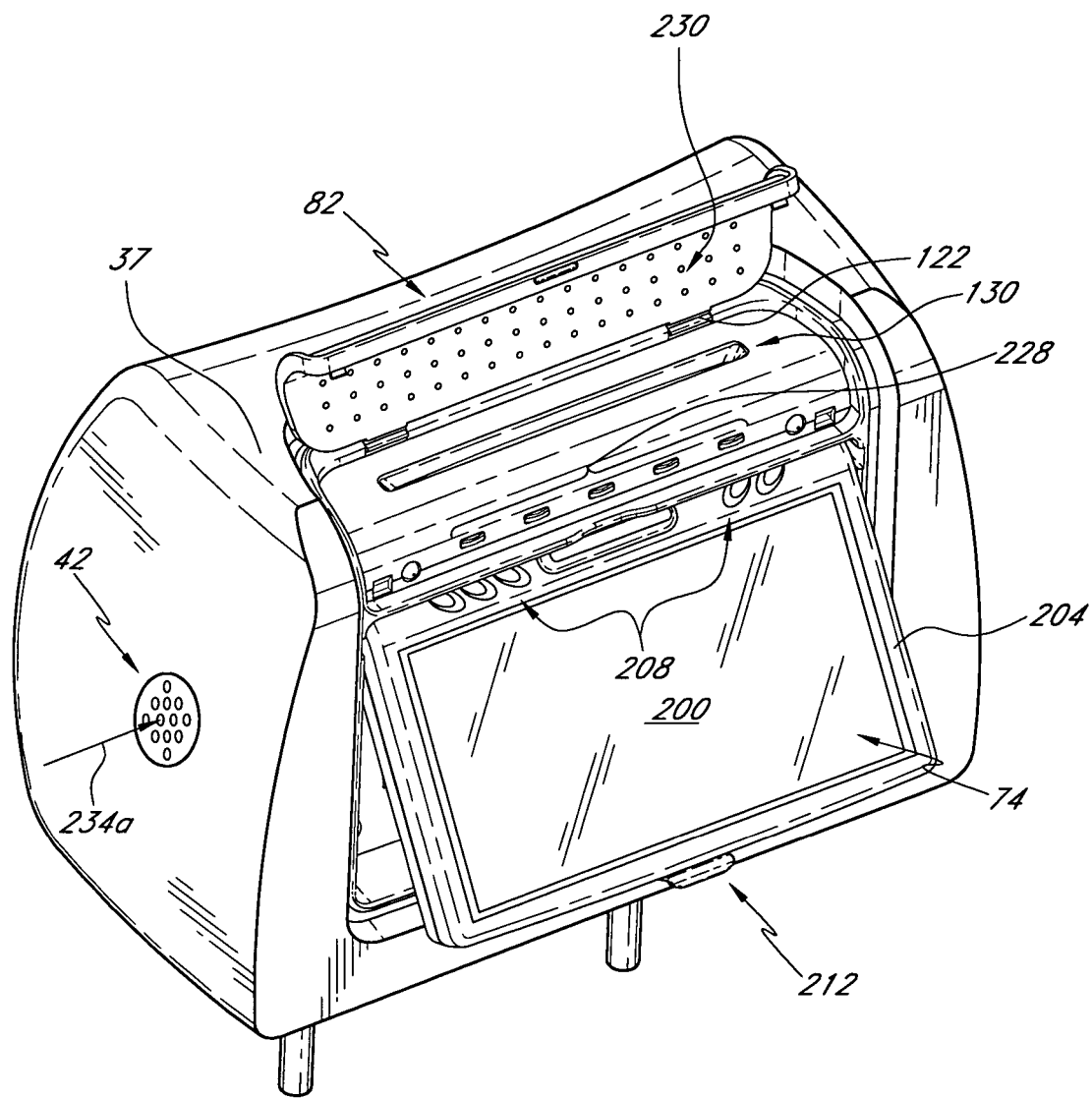
FIG. 2 is a top perspective view of the headrest entertainment assembly of FIG. 1 showing the cover in an open position and showing a monitor of the entertainment system in a tilted position.

FIG. 2 shows that in one embodiment, the component cover mount portion 110 can include a movable mount 122 to which the cover 82 can be coupled. In one form, the movable mount 122 is a hinge. Preferably, the component cover mount portion 110 also includes a component access aperture 130. The access aperture 130 provides access from a location outside the headrest entertainment assembly 10 to the component or signal source 78 located in the component mounting area 114. As discussed further below, the signal source 78 is a DVD player in some embodiments. Accordingly, the component access aperture 130 can be configured as a slot through which a digital video disc ("DVD") can be inserted. In one arrangement, the length of the slot is approximately equal to the width of the monitor 200. In other embodiments, the signal source 78 can be any device that reads a form of media and produces a signal at least partially displayable on the monitor 200. For example, the signal source 78 could also be a photo card reader, a MP3 player, or other similar device.

Figure 7:
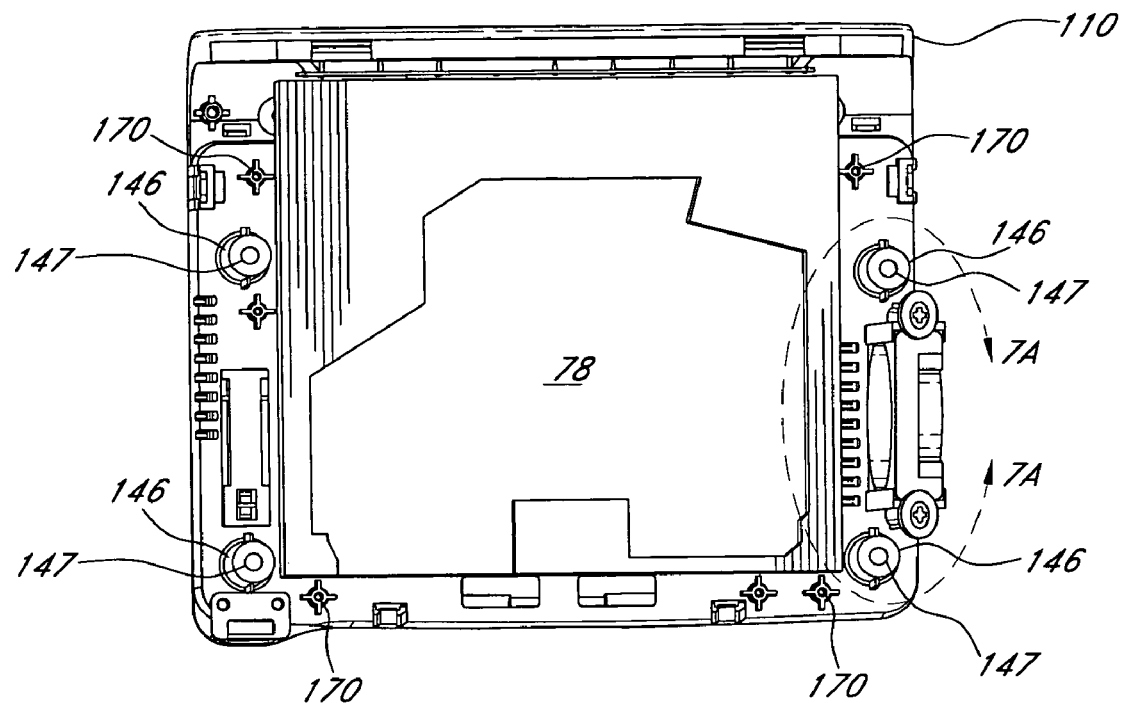
FIG. 7 is a rear plan view of one embodiment of an entertainment system.
Figure 7A:
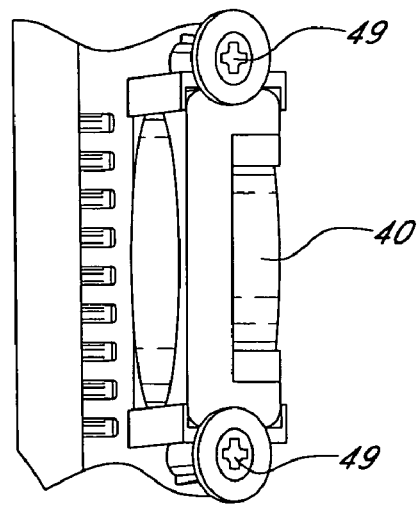
FIG. 7A is an enlarged view of a portion of the entertainment system of FIG. 7.
Figure 8:
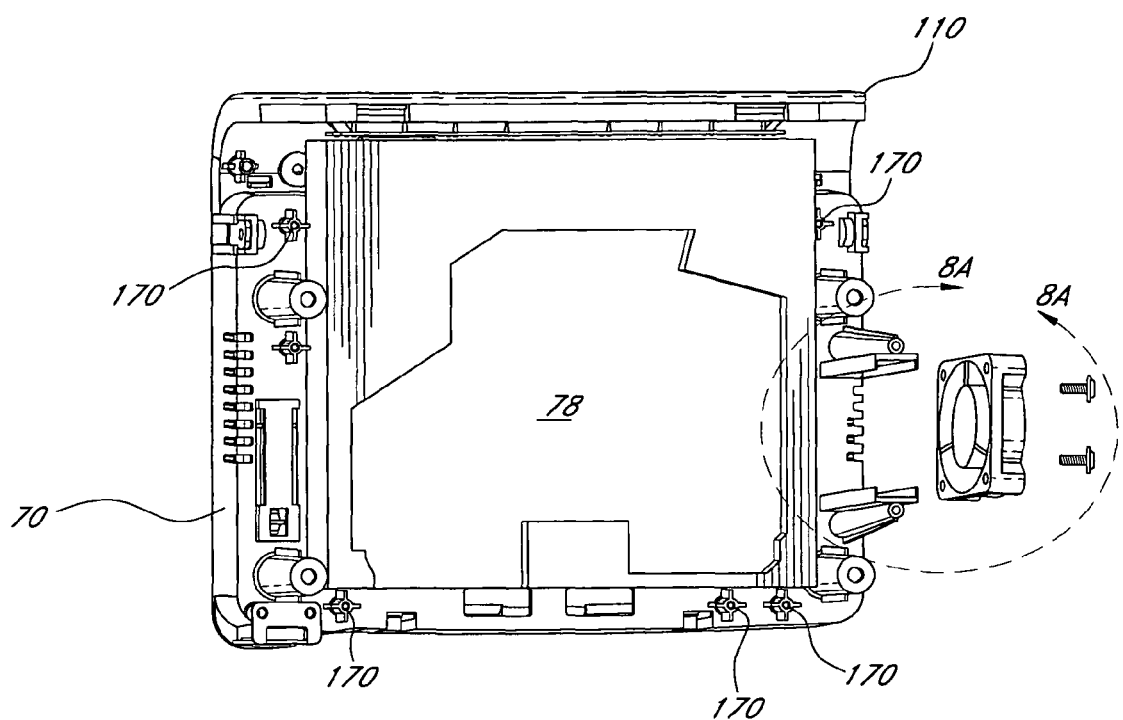
FIG. 8 is a rear perspective exploded view of the entertainment system of FIG. 7 with a portion of a cooling system shown removed therefrom.
Figure 8A:
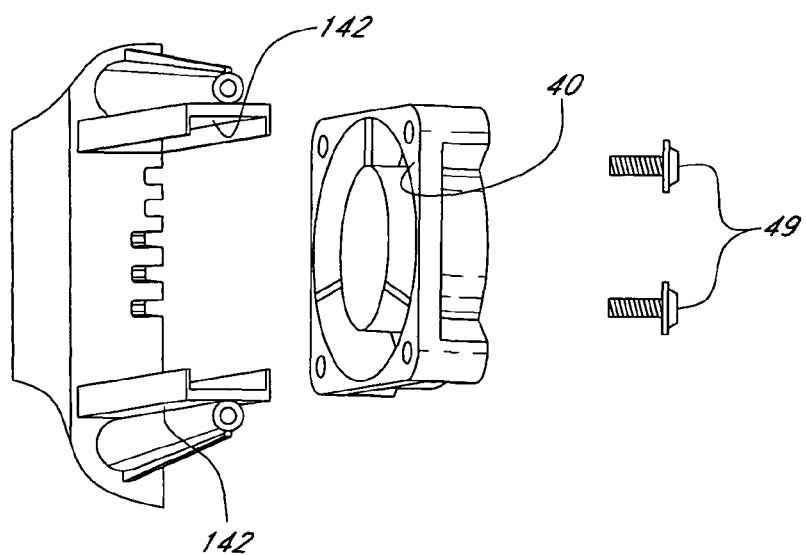
FIG. 8A is an enlarged view of a portion of FIG. 8 showing the removed portion of a cooling system in greater detail.
Figure 9:
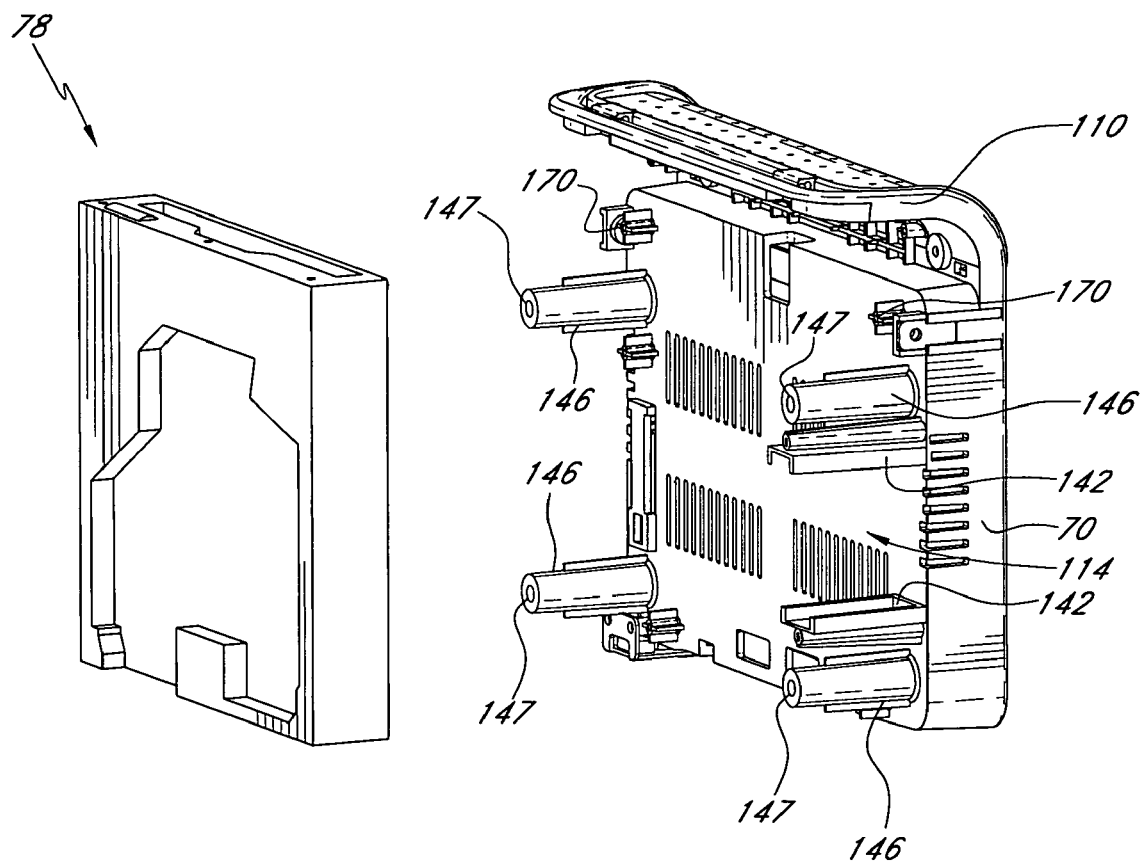
FIG. 9 is a rear perspective exploded view of the entertainment system of FIG. 7 showing a signal source removed therefrom.

The component mounting frame 70 also preferably includes one or more cooling system mounts 142. One embodiment of the mounts 142 is shown in detail in FIG. 9. In one arrangement, the mount 142 comprises a pair of posts, each of which includes an elongated slot into which a component of the cooling system 86 can slide. The slots of the cooling system mounts 142 enable quick assembly of the cooling system 86 and the component mounting frame 70. As shown in FIG. 8, the mounts 142 also can include holes formed at an end thereof spaced from the portion of the frame 70 adjacent the monitor assembly 74. Preferably the holes in the mounts 142 are threaded to engage screws. In one assembly technique, as shown in FIGS. 7A and 8A, a cooling fan 40 is positioned between the cooling system mounts 142. The cooling fan 40 is secured in place with fasteners 49 that are advanced through threaded holes in the mounts 142. In some embodiments, each fastener 49 comprises a flange of sufficient width to contact the cooling fan 40. The flange applies a force to an upper surface of the cooling fan 40 which prevents the fan from sliding out of the mounts. In other embodiments, the fasteners are coupled with washers. In still other embodiments, the fasteners are coupled with a stiff, elongate piece that extends between the mounts 142 and contacts a top surface of the fan 40. Each fastener may be secured to a hole in any suitable fashion, e.g., with threads, or a combination of threads and an adhesives whereby loosening of the fastener is minimized or prevented.

The component mounting frame 70 also preferably includes at least one off-set mount post 146. In one embodiment, a plurality of (e.g., four) off-set mount post 146 is provided. In other embodiments, less than four (e.g., one, two, or three) off-set mount posts are provided adjacent an outer portion of the component mount area 114. The off-set mount posts 146 are configured to couple with the mounting system 22, as discussed further below. The off-set mount posts 146 can be configured as elongated structures enabling the component mounting frame 70 to be connected to or otherwise coupled with the mounting system 22. Preferably, the off-set mount posts 146 are at least as long as, and preferably longer than the height or thickness of the signal source 78. This arrangement provides sufficient clearance between the signal source 78 and the mounting system 22.

The off-set mount posts 146 can be configured as conical structures. In one arrangement, the off-set mount posts 146 are elongated conical structures that have an aperture 147 formed at an end thereof spaced from the portion of the components mount frame 70 adjacent the monitor assembly 74. The aperture 147 in the off-set mount posts 146 preferably is configured for a connecting member (e.g., a screw) to be advanced therethrough to couple with the mounting system 22, as discussed below. In another arrangement, the off-set mount posts 146 are elongated conical structures, with the aperture 147 formed at an end thereof spaced from the component mount frame 70. In another arrangement, the off-set mount posts 146 are hollow with an aperture 148 adjacent the portion of the components mount frame 70 adjacent to the monitor assembly 74. As discussed further below, connecting members can be advanced through at least one of the apertures 147, 148 and received by the mounting system 22 to securely fasten the component mounting frame 70 to the mounting system 22.

In one embodiment, the component mounting frame 70 also includes at least one signal source mounting portion 170. In one embodiment, multiple signal source mounting portions 170 are provided. In one arrangement, four signal source mounting portions 170 are provided. In another arrangement, five signal source mounting portions 170 are provided. Signal source mounting portions 170 can be located adjacent an outer portion of the component mount area 114. The one or more signal source mounting portions 170 are pegs that limit the movement of the signal source but do not coupled with the signal source 78.

In other embodiments, the signal source mounting portions 170 include a bracket through which a fastening member (e.g., a screw or a bolt) can be inserted and to couple the signal source 78 with the component mounting frame 70. In particular, a bracket can extend at least partially around the rear side of the component 78 (e.g., the side farthest from the portion of the component mounting frame adjacent to the monitor assembly 74) and be coupled thereto by at least one fastener (e.g., a screw). Preferably, in this arrangement, the bracket also includes a plurality of flanges that extend out to the signal source mounting post 170. In some arrangements, connecting members can be advanced through these brackets and into threaded holes formed on exposed surfaces of the signal source mounting portions 170.

The component mounting frame 70 is configured to facilitate other aspects and features of the entertainment system 18. For example, the component mounting frame 70 can include a generally planar structure having one or more slots 172 formed therein. The slots 172 can be elongated and positioned close together. Also, a large number of slots 172 can be provided so as to reduce the weight of the component mounting frame 70. In some arrangements, discussed below, the slots 172 function as vents directing heat generated by one or more components away from the entertainment system 18. This feature is discussed more below in connection with an overall discussion of heat dissipation in the headrest entertainment assembly 10.

In one embodiment, a monitor assembly cavity 182 is formed on a forward side of the component mounting frame 70. The cavity 182 permits the monitor assembly 74 to be moved to a fully-closed position, which is a retracted position (shown in FIG. 5). In a retracted position, the monitor assembly 74 may be positioned within the headrest 14, e.g., at a location in front of the rear-facing side 32 thereof.

In one embodiment, the monitor 200 is one component of the monitor assembly 74. The monitor 200 includes a display in one embodiment that can receive video signals from the signal source 78 and display images based on the video signals. In one embodiment, the display or monitor 200 is an active matrix TFT-LCD panel. Preferably, the monitor 200 is relatively thin, enabling the entertainment system 18 to be mounted in a standard headrest 14. In one embodiment, the monitor 200 is a 7-inch TFT-LCD display. The monitor 200 can have a 16:9 widescreen format. The size of the monitor 200 can vary based on the size of the vehicle structure with which it is coupled, e.g., with the size of a headrest, within the scope of this application.

In one embodiment, the monitor 200 is mounted in a monitor housing 204. The housing 204 provides various functions. For example, the monitor housing 204 enables users to handle the monitor assembly 74 without directly touching the monitor 200. Also, the monitor housing 204 is able to absorb some shock to reduce the likelihood that normal interaction with occupants and objects in a vehicle will damage the monitor 200. The monitor housing 204 also can host a plurality of controls 208. The controls 208 can be conventional controls, such as would control the operation of the monitor 200 or an aspect of reproduction of the information from the signal source. In one arrangement, the controls 208 include a feature whereby transmission of a portion of the signal generated by the signal source (e.g., an audio component) is controlled, such as is described in U.S. patent application Ser. No. 10/361,744, filed on Feb. 7, 2003 and published as U.S. Patent Application Publication No. 2004/0080213 A1 on Apr. 29, 2004, the entire contents of which are hereby incorporated by reference herein.

The entertainment system 18 preferably also includes a locking device 212. The locking device 212 can be mounted on the monitor assembly 74, on the components mounting frame 20, or a portion on each of the monitor assembly 74 and the components mounting frame 20. In one embodiment, the locking device 212 includes a catch member 212a and an actuatable latch member 212b. The catch member 212a can be located on the component mounting frame 20, e.g., at least partially within the monitor assembly cavity 182. The actuatable latch member 212b can be located on the monitor housing 204, e.g., adjacent a lower edge thereof. The locking device 212 maintains the monitor 200 in a fully closed position (discussed further below) until the locking device 212 is unlocked, for example by actuating the movable latch 212b. The locking device 212 also can take suitable, conventional forms.

Figure 10:
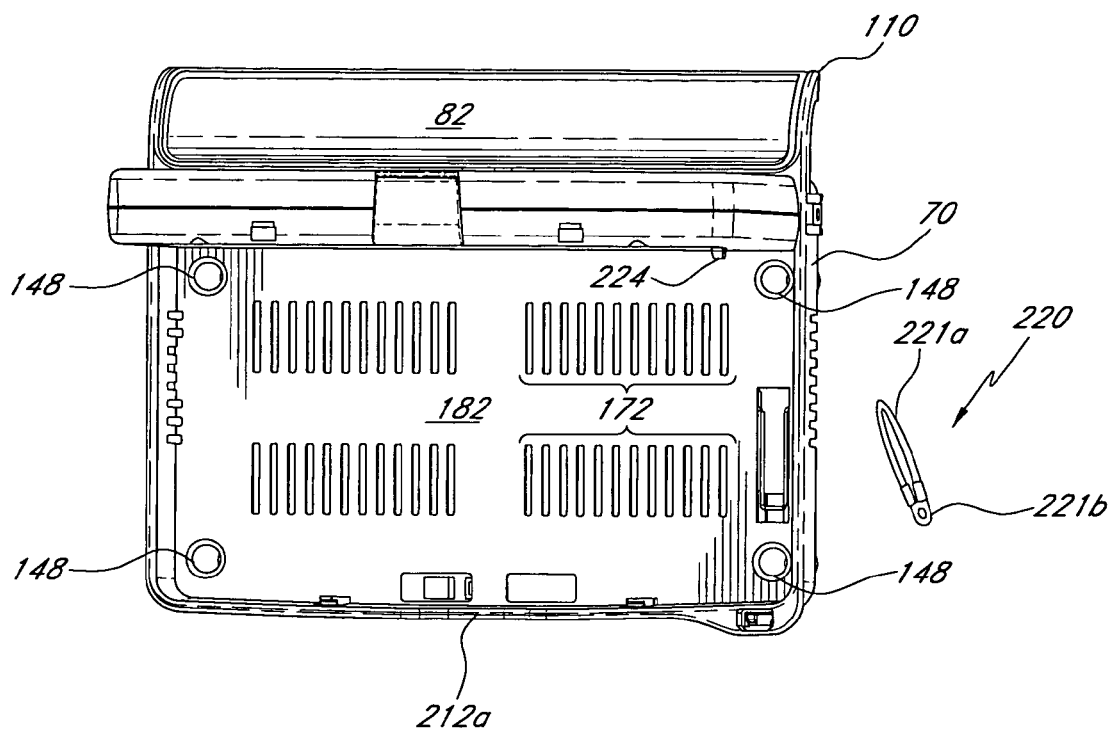
FIG. 10 is a front perspective exploded view of the entertainment system of FIG. 7 showing portion of a monitor assembly in a tilted position.

In one embodiment, the monitor assembly 74 also includes a motion limiter device 220. In one embodiment, the motion limiter device 220 includes a looped portion 221A coupled at both ends with a mount fixture 222B as shown in FIG. 10. The motion limiter device 220 can take other forms, e.g., as an S-hook, a chain, an elastic member, string, or other conventional coupler. The motion limiter device 220 can comprise an elongate member configured to be connected to the component mounting frame 70 at one end and to a mount portion 224 located on the monitor housing 204 at another end. For example, a post or other structure for coupling to one end of the motion limiter device 220 can be formed in the monitor assembly cavity 182. In another arrangement, an aperture (e.g., a threaded hole) can be formed in the monitor assembly cavity 182 and the motion limiter device 220 can be coupled with the component mounting frame 70 via the aperture, e.g., with a fastener, an adhesive, a combination thereof, or other suitable means. In one embodiment, the mount portion 224 comprises a hook or other structure for coupling to an end of the motion limiter device 220.

In one arrangement, the motion limiter 220 can be quickly disengaged to allow the monitor housing 204 to move to an assembly position, discussed below. This is facilitated in one arrangement by permanently affixing one end of the motion limiter 220 in the monitor assembly cavity 182 and looping the other end around a hook formed on the rear side of the monitor housing 204.

Figure 3:
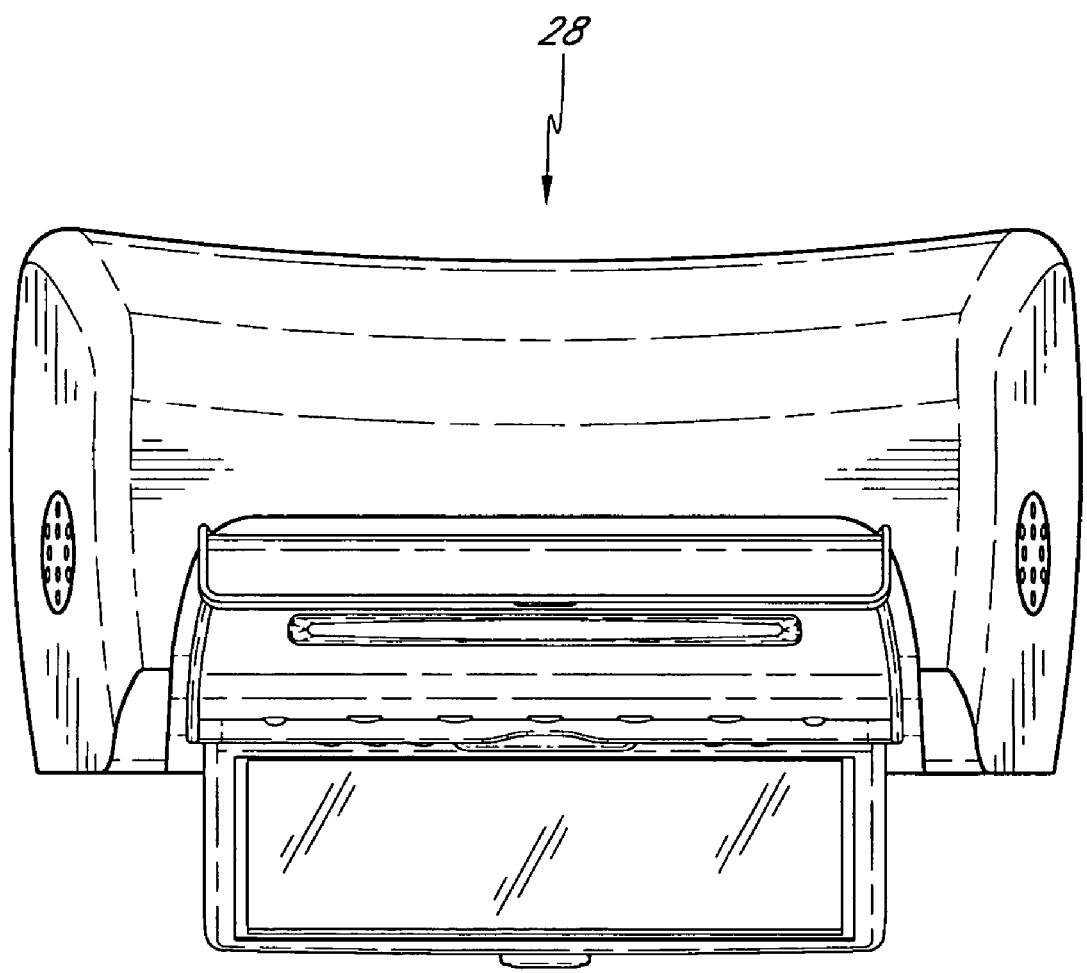
FIG. 3 is a top view of the headrest entertainment system of FIG. 1 with the cover in an open position and the monitor in a tilted position.
Figure 4:
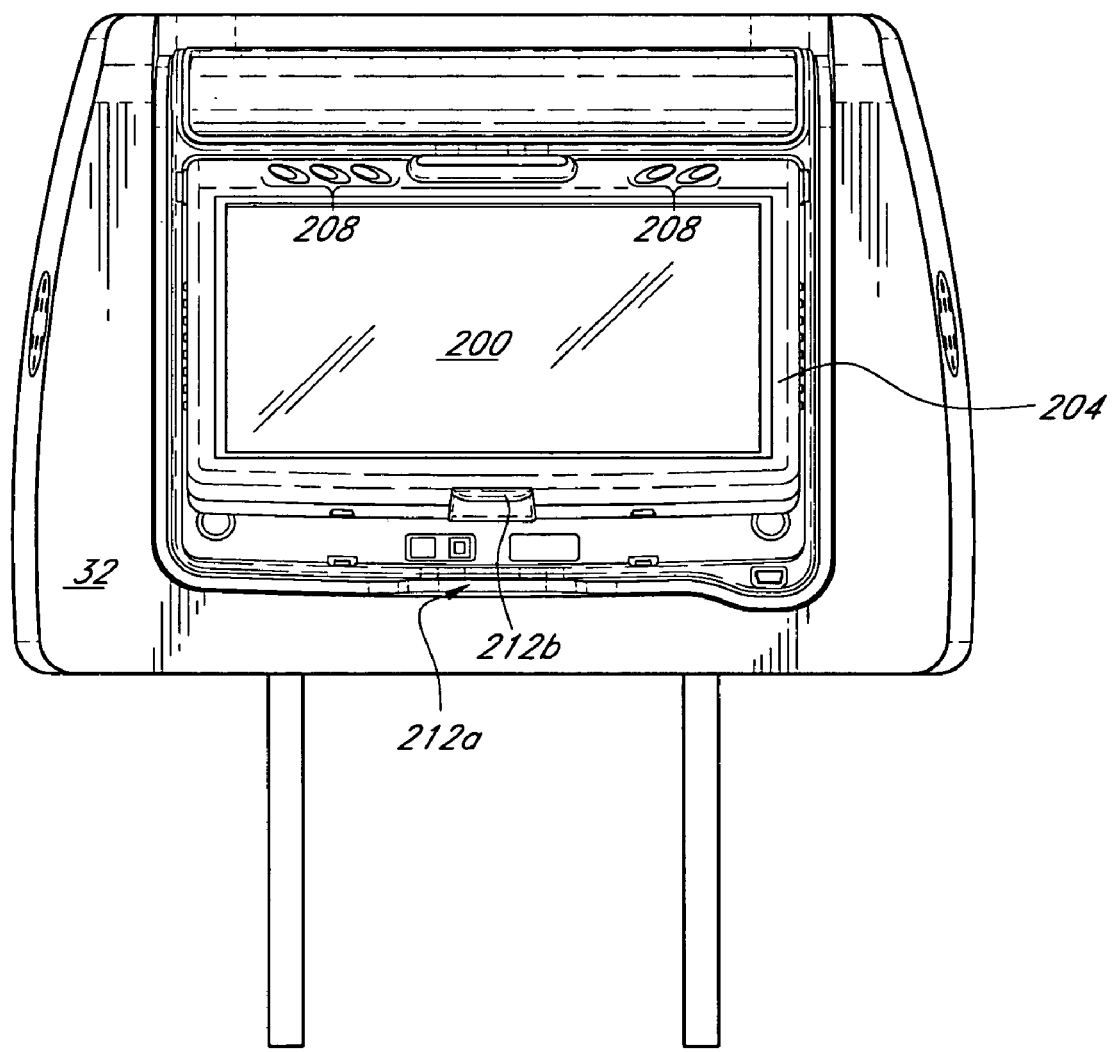
FIG. 4 is a front plan view of the headrest entertainment system of FIG. 1.

As discussed above, the monitor assembly 74 is coupled with the mounting frame 70 in the preferred embodiment. In one arrangement, the monitor assembly 74 is configured to move relative to the component mounting frame 70. Movement of the monitor assembly 74 can alter the orientation of the monitor 200. The arrangement described above enables the monitor 200 of the monitor assembly 74 to move relative to the headrest 14 between a plurality of positions. For example in one embodiment, a fully-closed position is provided in which the monitor 200 is retracted into the monitor assembly cavity 182. The fully-closed position is illustrated in FIGS. 4 and 5. Another position is illustrated in FIGS. 1, 2, and 3, wherein the monitor 200 is tilted out such that a lower end thereof is spaced farther from the monitor assembly cavity 182 than is an upper portion of the monitor 200.

FIG. 10 illustrates a third position in which the monitor 200 is in an installation position. In one embodiment, an installation position orients the monitor 200 at about a 90° angle relative to a plane that includes a base of the monitor assembly cavity 182. This position advantageously provides access to the off-set mount posts 146. For example, where the mounting component frame 70 is coupled with the mounting system 22, discussed below, a fastening device can be inserted through a top portion of off-set mount post 146 (e.g., through the apertures 148). The top portion of the off-set mount post 146 corresponds to the base of the monitor assembly cavity 182 in one embodiment. Fastening devices can further be advanced to the bottom of the off-set mount posts 146 (e.g., through the apertures 147) and coupled with the mounting system 22.

Preferably, the monitor assembly 74 is configured such that when the monitor 200 is positioned in an installation position, such as that shown in FIG. 10, the monitor 200 maintains its orientation relative to the base of the monitor assembly cavity 182. Such an arrangement can be provided by configuring the monitor coupling portion 90 (e.g., the hinge mount(s) 94) such that the monitor 200 locks in place when in the installation position. In one arrangement, the motion limiter 220 can be a bracket or other compression member which holds the monitor 200 in the assembly orientation. One collapsible bracket arrangement is disclosed in U.S. Pat. No. 7,044,546, which is incorporated by reference above.

Preferably, the monitor assembly 74 also includes a plurality of apertures 222 formed in a rear surface thereof. The apertures in the rear surface of the monitor assembly 74 enable heat generated by the monitor 200 to be removed from the monitor assembly 74. As discussed above, the component mounting frame 70 is configured to transfer such heat through apertures formed therein. The apertures 222 can be similar to the apertures 172. In some embodiments, the configuration and position of the apertures 222 and the apertures 172 are the same so that heat can be efficiently vented from the monitor 200 and from the monitor assembly cavity 182. Such heat can further be removed by way of a cooling system 86, discussed below.

FIGS. 1 and 2 illustrate additional aspects of the cover 82, described above. Preferably the cover 82 is configured to move relative to the component cover mount portion 110. As discussed above, the movement can be by way of a movable mount 122 (e.g., a hinge). Preferably the cover 82 is configured to extend from the mount 122 to a location vertically over the component access aperture 130. In one embodiment, the cover 82 extends from the mount 122 to a location vertically over the component access aperture 130 and over one or more control buttons 228 formed on or located adjacent the component cover mount portion 110. The control buttons 228 can be associated with one or more components of the entertainment system 18, e.g., one or more of the signal source 78 and the monitor 200. For example, the control buttons 228 can control at least one aspect of at least one of an audio and a video component of a signal from the signal source 78. In one embodiment, the cover 82 is configured to conform to a portion of the component cover mount portion 110 that is substantially parallel to a top surface of the headrest 14. In another embodiment, the cover 82 is configured to conform to a portion of the component cover mount portion 110 that is substantially parallel to a transitional surface that extends between the top surface and the rear-facing surface 32 of the headrest 14. The component cover 82 can be curved between a top and a transitional surface. Preferably the component cover 82 conforms to an outer surface of the headrest 14.

FIG. 2 shows another feature of the cover 82, which is provided in some embodiments. As discussed further below, the headrest entertainment assembly 10 includes a cooling system configured to efficiently extract heat generated by the components thereof from the headrest 14. To this end, a cover 82 can be provided with one or more venting structures 230. The venting structures 230 are configured to permit heat generated within the headrest, e.g., in the entertainment system mounting cavity 34, to flow out to the outside of the headrest. In one embodiment, the venting structure 230 is provided with the plurality of perforations, which can be formed as an array of small holes. A substantial number of the holes in the array extend at least partially between a lower surface and an upper surface of the cover 82. Accordingly, warm air adjacent the lower surface of the cover 82 can be more quickly transferred to the upper surface of the cover 82 and out of the headrest 14. Although the venting structure 230 is shown in FIG. 2 as a regular array of visible holes, the venting structure can be an irregular array, e.g., concentrated in a portion of the cover over a component that generates more heat.

The venting structure 230 can be configured to be substantially invisible to the naked eye of passengers in some arrangements. In one embodiment, the cover 82 is formed of a permeable material lacking visible holes but through which warm air can be quickly conveyed. Also, a cover 82 may include different numbers of holes in different regions based upon where greater heat is expected to be found. The function of the venting structures in combination with a cooling system will be discussed in greater detail below.

The cover 82 preferably has at least two positions. In a first position, the cover 82 is moved to conform to an upper surface 73 of the component mounting frame 70. For example, the cover 82 can be moved to conform to, or to extend over or otherwise cover, the component cover mount portion 110. In one embodiment, the cover 82 is moved to extend over the component access aperture 130, which is a position sometimes referred to herein as the "closed position" of the cover 82. The closed position advantageously limits access to the component access aperture 130. In some arrangements, the top of the cover 82 is at an elevation below the top of the headrest 14. In other arrangements, the top of the cover 82 is substantially flush with a top surface of the headrest 14, which provides a sleek, continuous appearance as viewed from the front of the headrest 14.

The cover 82 advantageously prevents foreign objects from extending or falling into the access aperture 130 when in the closed position. This feature can prevent such objects from becoming lodged in the signal source 78. For example, a passengers sitting in the seat with which the headrest 14 is coupled may have long hair. Without the cover 82 in the closed position, the person's long hair could slip through the component access aperture 130 and into the signal source 78. If the signal source 78 has moving parts and is operating, the person's hair might become wound around the moving parts. This could harm the person, the signal source, or both.

FIG. 2 shows that the cover 82 has at least one other position. In the second position, the cover 82 is moved away from the access aperture 130. In this position, access is provided to the component access aperture 130 such that media (e.g., a DVD disc, photo card, data card, etc.) can be inserted therethrough into the signal source 78. The second position is sometimes referred to as an "open" position. The open position also is shown in more detail in the top view of FIG. 3. As shown in FIG. 3, the open position provides relatively unrestricted access to the component access aperture 130.

As discussed above, in some embodiments the headrest entertainment assembly 10 is configured to efficiently remove heat from the entertainment system mounting cavity 34 of the headrest. The heat to be removed can be generated by components mounted therein, e.g., the monitor 200 and the signal source 78. In one form, the headrest entertainment assembly 10 is configured for efficient removal of heat by including one or more openings 38 that provide fluid communication between the cavity 34 and the exterior of the headrest 14.

Figure 12:
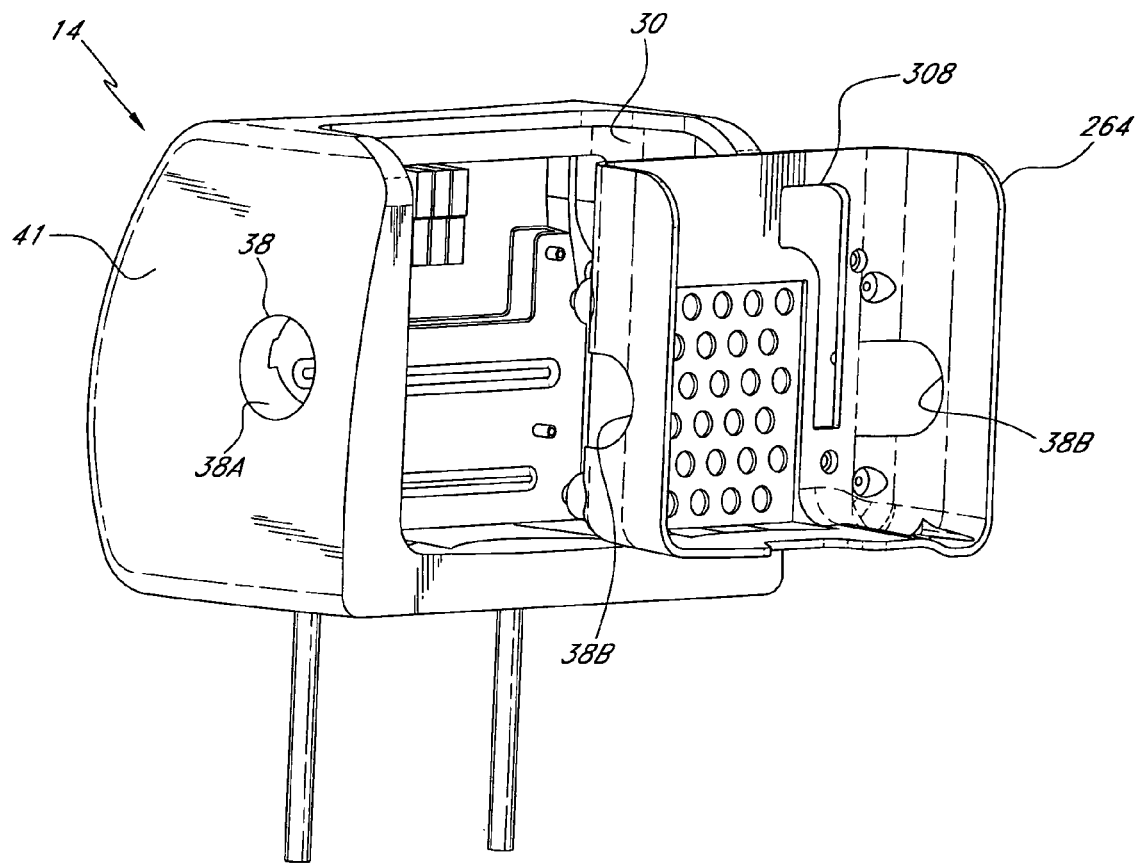
FIG. 12 is a front perspective exploded view of one embodiment of a headrest entertainment system with one embodiment of a component mounting frame shown removed therefrom.

In some embodiments, an airflow path is defined between a first aperture 38 that extends through an outer cover 41 of the headrest 14, a second aperture 38A that extends through the pillow 30, and a third aperture 38B that extends through an entertainment system mounting bracket 264, as shown in FIG. 12. Further enhanced cooling can be provided by including the first, second, and third apertures 38, 38A, and 38B on both sides of the headrest entertainment assembly 10. The outer cover 41 may comprise fabric, such as solid or perforated leather, or other suitable material. In some embodiments, the aperture cover 42 extends across the aperture 38, as discussed above. The aperture cover 42 may be attached to the outer cover 41 by any suitable means, such as, for example, by stitching. In some arrangements, the aperture cover 42 and outer cover 41 form one unitary piece of material.

In certain embodiments, an opening in the pillow 30 aligns with the opening in the outer cover 41. The opening in the pillow 30 may be formed by removing a portion of the pillow, such as by cutting out or punching out the portion. In some embodiments, the opening is formed during fabrication of the pillow. For example, the mold of a blow-molded pillow 30 may be shaped to provide for an opening in the pillow once the mold is removed.

In certain embodiments, an opening in the entertainment system mounting bracket 264 is aligned with the openings in the outer cover 41 and the pillow 30. As discussed above, the off-set mounting posts 146 may be longer than the height or thickness of the signal source 78. In such arrangements, when the mounting posts 146 are fastened to the entertainment system mounting bracket, a cavity is formed between the signal source 78 and the entertainment system mounting bracket 264. In some embodiments, this cavity is in fluid communication with the airflow path defined through the apertures 38, 38A, and 38B, allowing heated air to escape from the cavity through the aperture.

In some embodiments, the openings in the entertainment system mounting bracket 264, the outer cover 41, and the pillow 30 may be offset from each other. In further embodiments, the airflow path is defined within a conduit, e.g., a tube, extending through the openings.

In various embodiments, as discussed above, a plurality of apertures 38 are provided to enhance cooling by creating cross-flow past heat-generating or past heat-sensitive components. As shown in FIG. 12, in some configurations, the apertures may extend through opposing sides of the outer cover 41, the pillow 30, and the entertainment system mounting bracket 264 of the headrest 14. In some embodiments, a cavity is formed between the signal source 78 and the entertainment system mounting bracket 264. The cavity may be in fluid communication with the plurality of apertures 38, thereby allowing a cross-flow of air through the headrest 14. While in some cases, a natural cross-flow is sufficient to remove unwanted heat from the headrest 14, various embodiments provide further enhanced cooling by the structures discussed above. For example, in one embodiment, a cooling fan 40 is coupled with the cooling system mounts 142 as described above.

Figure 15:
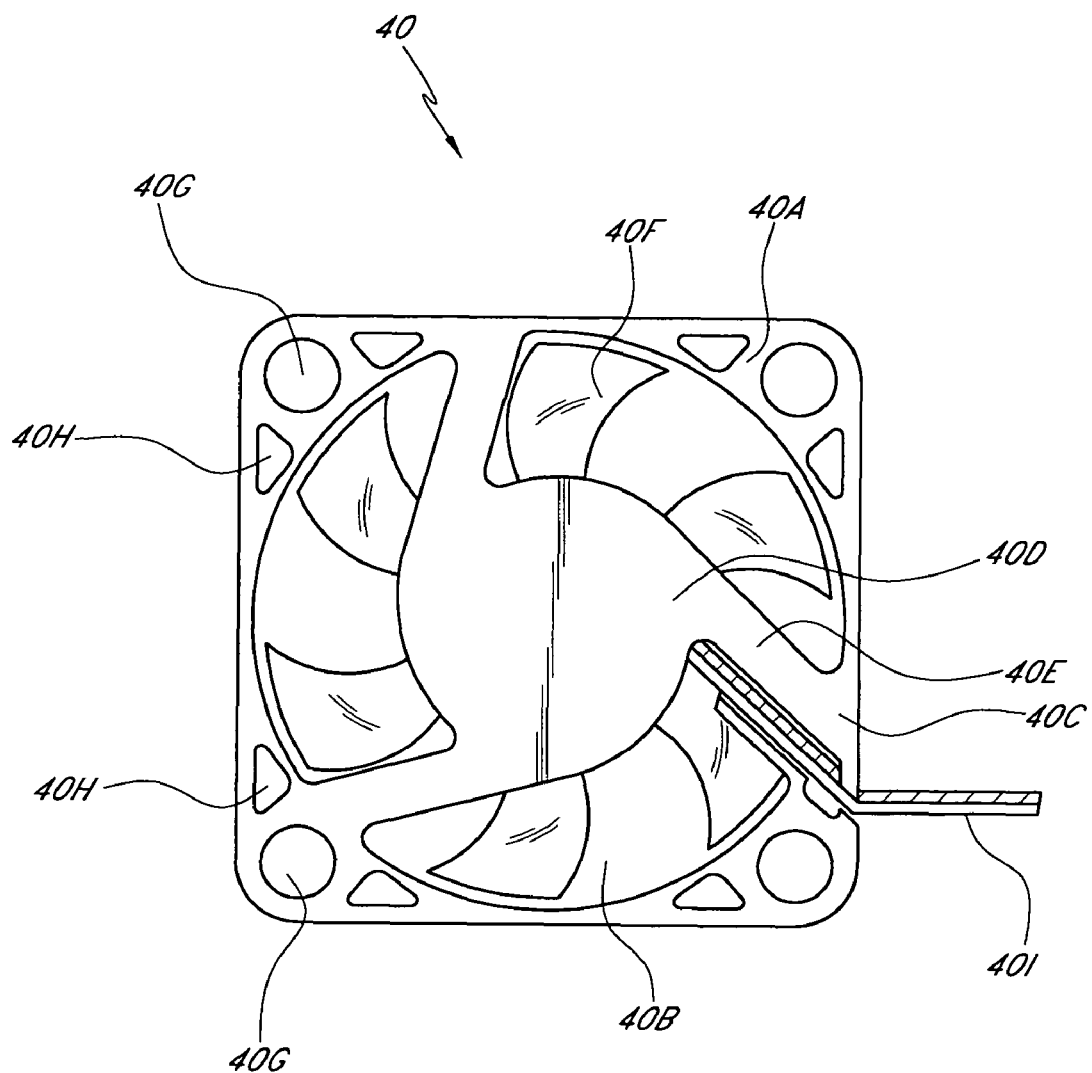
FIG. 15 is a plan view of one embodiment of a cooling fan.

FIG. 15 illustrates one embodiment of a cooling fan 40. The cooling fan 40 comprises a mounting bracket or housing 40A and a plurality of blades 40B. The housing 40A defines a volume within which the plurality of blades 40B can rotate. In certain embodiments, the housing 40A comprises a perimeter portion 40C extending around the periphery of the cooling fan 40 and a central portion 40D that covers a junction (not shown) of the blades 40B. The junction can be a rotatably mounted hub in one embodiment. In some embodiments, the perimeter portion 40C and central portion 40D are connected by one or more support members 40E. The perimeter portion 40C, central portion 40D, and support members 40E can define a plurality of openings 40F through which air can flow.

In certain embodiments, the housing 40A is sized to be inserted between the cooling system mounts 142, as described above with respect to FIGS. 7-9. In some embodiments, the width of the housing 40A is slightly less than the distance between the mounts 142 and the thickness of the housing is slightly less than the width of the elongated slots of the mounts, thereby ensuring a snug fit of the housing within the mounts. In some embodiments, the width of the housing 40A is between about 25 millimeters and about 60 millimeters and the thickness is between about 5 millimeters and 15 millimeters. In one embodiment, the width of the housing 40A is about 40 millimeters and the thickness is about 10.5 millimeters. As shown in FIG. 15, in some embodiments, the housing 40A may be substantially square. In one such embodiment, the width and height of the housing 40A are each about 40 millimeters and the thickness is about 10.5 millimeters.

In some embodiments, the housing 40A comprises a plurality of openings 40G, 40H. The openings 40G may provide an alternative means of mounting the cooling fan 40 to the component mounting frame 70. In some configurations, fasteners are inserted through the openings 40G to secure the housing 40A to a portion of the component mounting frame 70. In some embodiments, the openings 40G, 40H reduce the weight of the housing 40A without compromising the structural integrity of the housing. The openings 40G, 40H may allow venting in addition to that provided by other openings 40F of the housing 40A.

The blades 40B may meet at a common junction (not shown). In some embodiments, the junction is coupled with the central portion 40D of the housing 40A in a manner that allows rotation. In the embodiment depicted in FIG. 15, the axis of rotation is about a line extending perpendicularly through a plane defined by the perimeter portion 40C. In some configurations, the blades 40D rotate clockwise about the axis, and in others, the blades rotate counter-clockwise.

In some configurations, it is desirable that the housing 40A and blades 40B be substantially rigid and lightweight. The housing 40A and the blades 40B may comprise any suitable material, such as plastic.

In certain embodiments, the cooling fan 40 comprises a lead 40I for coupling with a power source (not shown). In some embodiments, the power source operates between about 9.5 Volts and about 15 Volts. The power source provides a direct current in some configurations. The cooling fan 40 can be powered by the car battery. In some embodiments, a battery dedicated to the headrest entertainment assembly 10 powers the cooling fan 40.

The cooling fan 40 can be oriented or configured to force a cooling fluid, e.g., air, into the cavity 34 to enhance convective cooling of heat generating or heat sensitive components located therein. The cooling fan 40 can be oriented or configured to draw a cooling fluid, e.g., air, out of the cavity 34 to enhance convective cooling. Also, a plurality of fans 40 can be used, e.g., one to force air into an aperture 38 and another to draw air out through another opening, enhancing cooling.

The openings 38 can also be used in combination with other venting structures, such as the venting structures 230 discussed above. This arrangement permits cross-flow of air and allows hot air rising within the cavity 32 to escape therefrom. In another embodiment, the openings 38 and the venting structure 230 are combined with one or more fans.

As discussed above, further enhancement of the cooling system can be incorporated into one or more support structures located inside the cavity 34. For example, the slots and apertures 172 and 222 are configured to permit air to move away from components that may be heat generators or heat sensitive, e.g., the monitor 200 or the signal source 78. The slots 172 can be aligned with the apertures 222 to enhance this movement away from such components and into the stream of flow created by the at least one aperture 38.

Additional cooling can be achieved forward of the entertainment system 18. For example, in one embodiment, at least one component of the mounting system 22 includes perforations or a plurality of small holes 304 through which the movement of hot air can be enhanced. This arrangement fosters additional convective cooling on the forward side of the signal source 78 in the illustrated embodiment.

Various structures have been discussed above that facilitate the efficient removal of heat from the headrest entertainment assembly 10. Efficient removal of heat is facilitated in some embodiments by providing enhanced flow within the headrest 14, e.g., in the entertainment system mounting cavity 34. In the figures, structures that enhance cooling, e.g., by heat transfer by convection, are further illustrates with arrows indicating airflow. Although arrowheads generally indicate the direction of airflow (e.g., from the tail of the arrow to the head), some structures permit airflow to be directed toward the head or toward the tail of the arrow shown.

With reference to FIGS. 1, 2, 12, and 13, an arrow 234a indicates airflow through the aperture 38 (or apertures 38, 38A, 38B). In one arrangement, the airflow indicated by the arrow 234a is through the aperture 38 into the cavity 34. In some applications where relatively little heat is generated or the electronics housed in the headrest 14 are resistant to heat-induced failure, such flow may be sufficient to cool the components. In other embodiments, the cooling fan 40 is mounted to the cooling system mounts 142 such that it is adjacent to the aperture 38. In this arrangement, greater amounts of airflow can be directed into the cavity 34, as indicated by the arrow 234a. An arrow 234b indicates that airflow also can escape from or be forced out of the cavity 34 through another aperture 38 (or set of apertures 38B, 38A, 38), which can be located on an opposite side of the headrest 14. This advantageously creates cross-flow, which is a greater amount of airflow than would be provided through the cavity 34 in the absence of the aperture 38 or another venting structure as described herein.

In most embodiments, cross-flow is enhanced by providing a plurality of pathways for airflow into and out of the cavity 34. In the embodiment of FIG. 13, two apertures 38 are provided to enhance cross-flow through the cavity 34. In another embodiment, the venting structures 230 are a second airflow pathway enabling air to escape from the headrest 14, permitting a greater amount of airflow through the headrest. FIGS. 1 and 2 illustrate that cross-flow is a broad term that includes the positioning of multiple venting structure or apertures on sides of the headrest 14 that are not directly across from each other. Cross-flow enhancing arrangements can be provided by providing at least two venting structures on any combination of the side, the top, or the bottom of the headrest 14. In some embodiments, a plurality of venting structure are provided on the same side of the headrest 14, e.g., one adjacent the fan 40 and one spaced therefrom.

As discussed above, the venting structures 230 are particularly beneficial in providing for egress of heat by convection from the cavity 34 because hot air will rise toward the top of the cavity. One system that provides particularly rapid cooling of the cavity 34 incorporates a plurality of apertures formed on surfaces of the headrest 14 and the venting structure 230 on a top surface of the assembly 10, e.g., on the aperture cover 42.

In some applications the assembly 10 includes a heat management system that incorporates external venting structures, e.g., at least one of the aperture(s) 38 and the venting structure 230, and one or more internal structure configured to enhance heat transfer away from at least one heat generating component. For example, as discussed above, the heat management system can include heat transfer enhancing structures formed on electronic components or housings therefore, such as the apertures 222 formed in the monitor assembly 74. The heat management system also can include heat transfer enhancing structures formed on structures that are partly or occasionally exposed to the external ambient, such as the slots 172 formed in the component mounting frame 70. The heat management system also can include heat transfer enhancing structures formed on structures that are enclosed in or at least substantially entirely enclosed in the cavity 34, e.g., the holes 304 formed in the entertainment system mounting bracket 264.

By combining the venting structures and other heat transfer enhancing structures, more electronic devices can be packed into the confined space of the headrest 14, whereby greater functionality and performance is provided to the assembly 10.

The structures discussed herein for efficiently removing heat from the headrest entertainment assembly 10 provide several advantages. For example, by providing sufficient cooling, multiple components can be mounted within the cavity 34 while maintaining levels of heat that are acceptable to the passenger. Also, the level of heat in the cavity 34 is kept at an acceptable level to reduce component failure due to excessive heating. These and other features make the devices disclosed and claimed herein particularly advantageous.

As discussed above, the headrest entertainment assembly 10 also includes a mounting system 22 that facilitates installation of the entertainment system in the entertainment system mounting cavity 34 of the headrest 14.

In one arrangement, the mounting system 22 includes one or more (e.g., two) seat posts 26, a pillow mounting bracket 260, an entertainment system mounting bracket 264, and an entertainment system mounting feature 268. In one arrangement, as discussed above, the entertainment system mounting bracket 264 is perforated, e.g., with the plurality of small holes 304 formed therein.

In one arrangement, the entertainment system mounting feature 268 comprises a plurality of posts, e.g., four posts, which extend through corresponding apertures in the entertainment system mounting bracket 264. The posts 268 can be threaded to facilitate fastening of the perforated entertainment system mounting bracket 264 to the pillow mounting bracket 260. In one arrangement, the pillow mounting bracket 260 includes a recess, which may be a substantially U-shaped recess, formed on an upper side of the pillow mounting bracket. To give the headrest 14 a more solid feel, a spacer member 276 may be positioned between the pillow 30 and the entertainment system mounting bracket 264.

Further features of the pillow mounting bracket 260 increase the strength of the headrest entertainment assembly 10, particularly of the headrest 14. In one embodiment, as shown in FIG. 13, the pillow mounting bracket 260 includes a first plate-like portion 265A and a second plate-like portion 265B. To provide additional strength to the pillow mounting bracket 260, at least one of the plate-like portions 265A, 265B is provided with one or more reinforcing members 266 to increase the strength of the portion of the plate-like portions 265A, 265B that resides between the posts 26. In one arrangement, the reinforcing member 266 comprises an elongated depression or channel formed in at least one of the plate like portions 265A, 265B. The depression or channel increases the resistance of the plate-like portion to bending or creasing along a plane parallel to the posts in the event of a collision. This arrangement provides other advantages. For example, it can permit other components to be less bulky. For example, a thinner-walled post 26 could be used. As discussed below, providing a thinner walled post 26 increases clearance for routing cables, which makes assembly of the headrest entertainment assembly 10 much easier.

Figure 14:
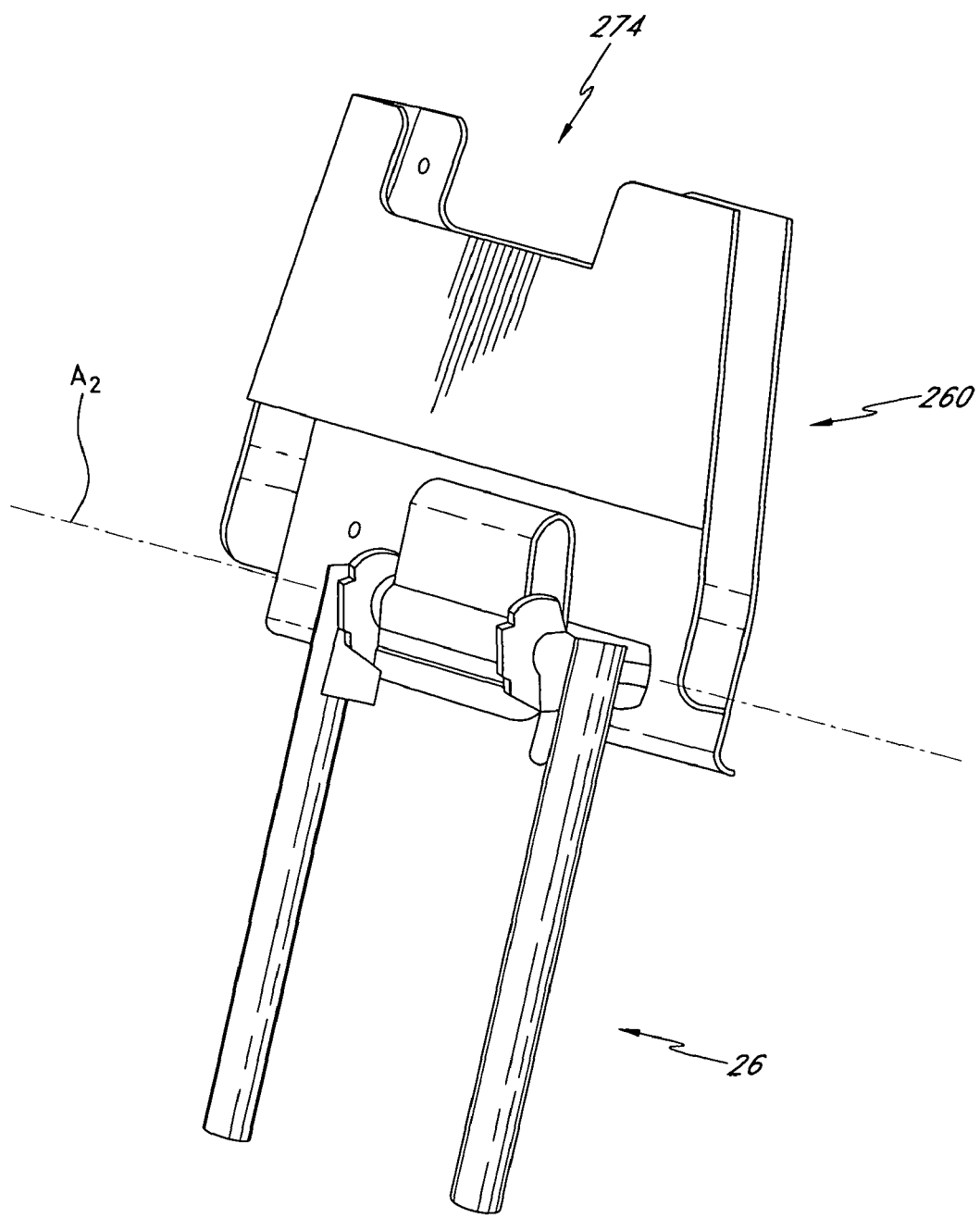
FIG. 14 is a perspective view of one embodiment of a portion of a mounting system.

FIG. 14 shows an axis $A_2$ about which the pillow mounting bracket 260 can be rotated relative to the seat post 26. The headrest 14 can thus be tilted relative to a seat with which it is coupled. In other embodiments, tilting about the axis $A_2$ is not required and is not provided.

FIGS. 12 and 13 illustrate a first stage of one method of assembling the headrest entertainment assembly 10. In the first stage, the pillow 30 and other portions of the headrest 14 generally defining the cavity 34 are provided. The portion of the headrest 14 can be made in any suitable fashion, e.g., by molding. However, as discussed above, this portion of the headrest 14 is a separate, discrete portion of the headrest entertainment assembly 10, e.g., it can be shipped, stored, and inventoried separately from the other components of the assembly 10. As discussed above, this portion of the headrest 14 has a seat mounting aperture 46 through which a pillow mounting bracket 260 can be inserted. FIG. 12 illustrates that in one embodiment, the pillow mounting bracket 260 is inserted through the aperture 46 until the U-shaped portion 274 engages the spacer member 276.

In one technique, thereafter the entertainment system mounting bracket 264 is coupled with the pillow mounting bracket 260 in the cavity 34. FIGS. 5 and 12 illustrate that after the entertainment system mounting bracket 264 is coupled with the pillow mounting bracket 260, the pillow mounting bracket is not able to be separated from the portion of the headrest 14 including the pillow 30. This is one technique for assembling the mounting system 22 to the portion of the headrest 14 including the pillow 30. In one embodiment, the entertainment system mounting bracket 264 includes a passage 308 for routing cables from the entertainment system 18, as discussed below.

In some embodiments, techniques for quickly and efficiently assembling the headrest entertainment assembly 10 involve routing signal cables through the mounting system 22. In particular, one advantageous technique routes signal cables through one or more mount posts 26.

Further techniques for assembling the headrest entertainment assembly 10 are discussed above. In particular, the monitor assembly 74 can be coupled with the frame 70 as discussed above in connection with FIGS. 6-9. Thereafter, the monitor 200 can be tilted to an installation position, such as is shown in FIG. 10. Thereafter fasteners and the motion limiter 220 can be applied to couple the frame 70 to the mounting system 22.

Figure 16:
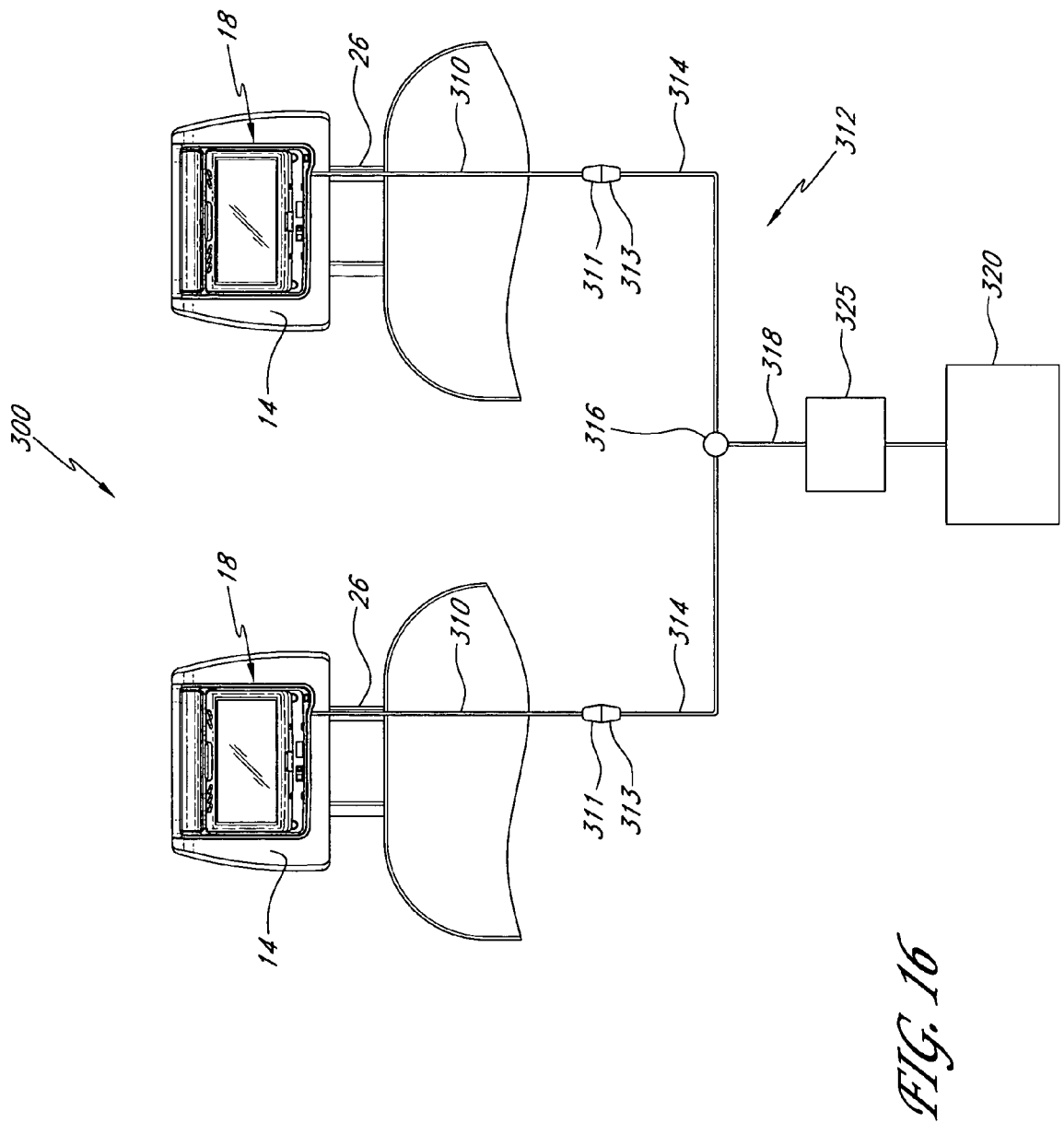
FIG. 16 is a schematic illustration of one embodiment of a mobile video system having an adapter coupled with a first and second entertainment system.

FIG. 16 schematically illustrates one embodiment of a video system 300 comprising multiple entertainment systems 18. In certain embodiments, each entertainment system 18 is mounted in the headrest 14 of a vehicle. Each entertainment system 18 can be coupled with an entertainment system cable 310 capable of extending through the post 26 of the headrest 14. In some embodiments, each entertainment system cable 310 comprises an entertainment system plug or connector 311 sized and configured to extend through the post 26. In certain embodiments, each entertainment system connector 311 can be configured to couple with an adapter 312. In some embodiments, the adapter 312 comprises adapter plugs or connectors 313 configured to couple with the entertainment system connectors 311. The adapter 312 can further comprise one or more primary adapter cables 314 coupled with the adapter connectors 313. In certain configurations, the one or more primary adapter cables 314 and an auxiliary adapter cable 318 extend from a junction 316. In some embodiments, the adapter 312 is coupled with a power source 320. In further embodiments, the adapter 312 is coupled with the power source 320 via a noise suppressor 325.

FIG. 16A illustrates one advantageous embodiment of the adapter 312. In the illustrated embodiment, the adapter 312 comprises a single unit having a first branch 331, a second branch 332, and a third branch 333. Each of the first and second branches 331, 332 includes a primary adapter cable 314 having the junction 316 at one end and an adapter connector 313 at another end. The third branch 333 includes a secondary adapter cable 318 having the junction 316 at one end and a heat shrink tube 340 at another end. As further described below, each of the primary and secondary adapter cables 314, 318 can include one or more branches of communication lines and/or electrical lines. In some embodiments, the junction 316 includes a heat shrink tube that tightly engages the primary and secondary adapter cables 314, 318.

In the illustrated embodiment, one branch of a first electrical line 351 and one branch of a second electrical line 352 extend from the tube 340, which in some embodiments, is a heat shrink tube. In certain embodiments, the first electrical line 351 comprises a fuse 355 and an interlocking connector 361 configured to couple with the noise suppressor 325. In certain embodiments, the second electrical line 352 comprises an interlocking connector 362 configured to couple with the noise suppressor 325. The noise suppressor 325 can be coupled with the power source 320.

With reference to FIG. 16B, in some embodiments, each adapter connector 313 includes a coupling interface 370 for coupling with an entertainment system connector 311. In certain advantageous embodiments, the coupling interface 370 includes any suitable interface, such as a pin/sheath or a plug/socket interface, for creating a mechanical and electrical connection between an adapter connector 313 and an entertainment system connector 311. In the illustrated embodiment, the coupling interface 370 of the adapter connector 313 comprises seven pins for coupling with an entertainment system connector having seven sheaths.

As described in further detail below, in certain embodiments, the adapter 312 allows entertainment systems 18 to be interconnected rapidly and efficiently. In some advantageous embodiments, the adapter 312 couples an output of a first entertainment system 18 with an input of a second entertainment system 18, and couples an output of the second entertainment system 18 with an input of the first entertainment system 18. In many embodiments, the entertainment system connectors 311 of the entertainment systems 18 have the same configuration, and the first branch 331 or the second branch 332 of the adapter 312 can be coupled with either the first or second entertainment system 18. Accordingly, the first and second adapter branches 331, 332 can be interchangeable, which can greatly facilitate installation of multiple entertainment systems 18. Additionally, the adapter can couple multiple entertainment systems 18 with a power source via a single set of electrical lines, which can also facilitate installation.

Figure 17:
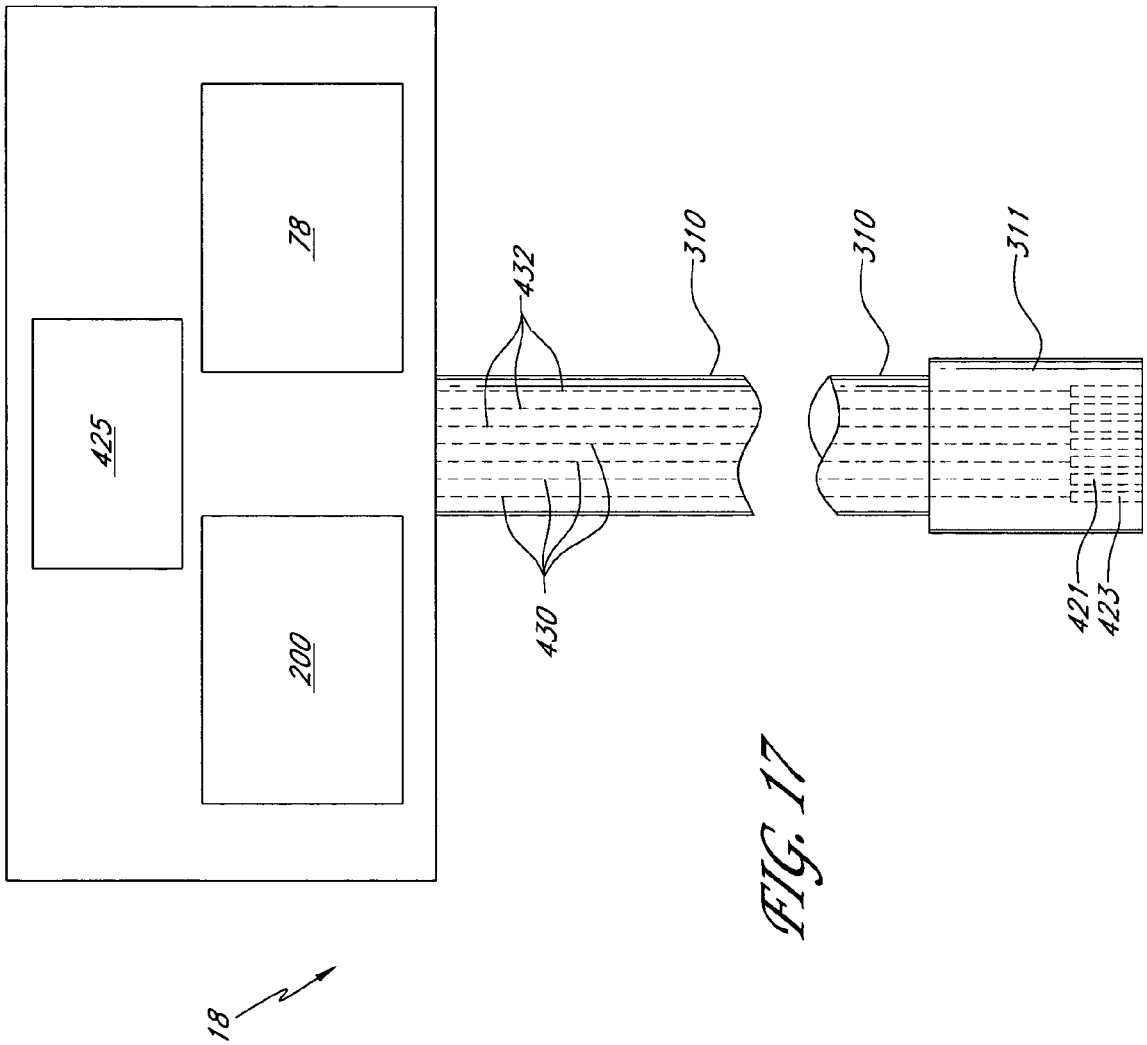
FIG. 17 is a schematic illustration of one embodiment of an entertainment system.

As schematically illustrated in FIG. 17, in certain embodiments, the entertainment system 18 comprises the signal source 78 and the monitor 200. The signal source 78 is capable of producing a signal, at least a portion of which is displayable on the monitor 200. In some embodiments, the signal source 78 is a device that reads a form of media and produces a signal at least partially displayable on the monitor 200. For example, the signal source 78 can be a DVD player, a photo card reader, or an MP3 player.

In some configurations, the entertainment system 18 comprises an output 421 for communicating the signal produced by the signal source 78 to a device other than the monitor 200. For example, via the output 421 of one entertainment system 18, the signal from the signal source 78 can be communicated to a separate entertainment system 18. In some embodiments, the monitor 200 of the entertainment system 18 comprises the output 421. In other embodiments, the signal source 78 of the entertainment system 18 comprises the output 421. In still other embodiments, a pin, plug, or other coupling device of the entertainment system connector 311 comprises the output 421.

In some configurations, the entertainment system 18 comprises an input 423 for receiving a signal. In some arrangements, the signal received via the input 423 of one entertainment system 18 is generated by the signal source 78 of a separate entertainment system 18. In some embodiments, the monitor 200 of the entertainment system 18 comprises the input 423. In other embodiments, the signal source 78 of the entertainment system 18 comprises the input 423. In still other embodiments, a pin, plug, or other coupling device of the entertainment system connector 311 comprises the input 423. Accordingly, in some embodiments, a single connector 311 comprises the input 423 and the output 421 of the entertainment system 18.

In certain embodiments, the monitor 200 of the entertainment system 18 is operable in more than one state. In some embodiments, the monitor 200 displays at least a portion of a signal communicated via the output 421 when in one state, and displays at least a portion of a signal received via the input 423 when in another state. For example, in some preferred embodiments, the video system 300 comprises two entertainment systems 18 generating separate signals. In a first state, the monitor 200 of the first entertainment system 18 displays at least a portion of a first signal generated by the first signal source 78 that is communicated via the output 421, and in a second state, the monitor 200 displays at least a portion of a second signal generated by the second system 18 and obtained via the input 423. In some embodiments, the entertainment system 18 comprises multiple inputs 423 and/or multiple outputs 421. In certain of such embodiments, the monitor 200 can operate in multiple states, displaying the signal associated with each input 423 or output 421 of the entertainment system 18 in at least one separate state.

In some embodiments, the entertainment system 18 comprises one or more transmitters 425 for delivering audio information. In certain preferred embodiments, the transmitter 425 operates at infrared frequencies. In other embodiments, the transmitter 425 operates at radio frequencies. In some embodiments, the video system 300 comprises two entertainment systems 18, each one comprising a transmitter 425. In certain of such embodiments, the first entertainment system 18 is configured to generate a first video signal and a first audio signal, to deliver at least a portion of the first video signal via the first output 421, to deliver at least a portion of the first audio signal via the first transmitter 425, and/or to receive at least a portion of a second video signal via the first input 423. In certain embodiments, the second entertainment system is configured to generate the second video signal and a second audio signal, to deliver at least a portion of the second video signal via the second output 421, to deliver at least a portion of the second audio signal via the second transmitter 425 (preferably at a frequency different from that employed by the first transmitter 425), and/or to receive at least a portion of the first video signal via the second input 423. By selecting among operating states, a user can access the first or second video signal via the monitor 200 of either system 18. The user can also select the first or second audio signal via a receiver, such as a radio within the vehicle or a personal headset, by tuning to the transmitted frequency.

In certain embodiments, signals are communicated from and/or delivered to the entertainment system 18 via the entertainment system cable 310. The entertainment system cable 310 can comprise one or more communication lines 430, such as, for example, electrical wires, optical fibers, and/or any other suitable lines for communicating information. In certain embodiments, the input 423 and the output 421 of the entertainment system 18 are each coupled with a separate communication line 430. Accordingly, in some embodiments the entertainment system cable 310 comprises one communication line 430 dedicated to the input 423 and another communication line 430 dedicated to the output 421 of the entertainment system 18. In other embodiments, the entertainment system cable 310 comprises a separate communication line 430 for each of multiple inputs 423 and multiple outputs of the entertainment system 18.

In some embodiments, the entertainment system cable 310 comprises one or more electrical lines 432 for delivering power to the entertainment system 18. The electrical lines 432 can comprise electrical wires or any other suitable lines for transmitting power. The entertainment system cable 310 can also include one or more electrical lines 432 for electrically grounding the entertainment system 18. For example, in some configurations, the entertainment system cable 310 comprises one electrical line 432 for coupling the system 18 with a ground of the power source 320 and comprises another electrical line 432 providing a common reference or common ground for the entertainment systems 18.

As illustrated in FIG. 18, in certain embodiments, the entertainment system connector 311 comprises a coupling interface 433. The coupling interface 433 can include any suitable interface, such as a pin/sheath or a plug/socket interface, for creating a connection with a coupling interface 370 of an adapter connector 313. The connection can be a mechanical connection, a friction fit, or some other suitable connection. In some embodiments, the coupling interface 433 comprises a plurality of couplers 434, which are sheaths in the illustrated embodiment. In certain arrangements, a separate coupler or sheath 434 is coupled with each communication line 430 or electrical line 432 of the entertainment system cable 310. For example, in the illustrated embodiment, one sheath 434a is coupled with a communication line 430 dedicated to the output 421 of the entertainment system 18, and another sheath 434b is coupled with a communication line 430 dedicated to the input 423 of the embodiment system 18. In some preferred configurations, each sheath 434 is sized to contact an outer surface of a pin, as described below.

In certain embodiments, the entertainment system connector 311 is sized and configured to extend through the post 26 of the headrest 14. As described above, the inner cross-sectional size (e.g., diameter) of a hollow passage extending through the post 26 can be increased to allow the passage therethrough of a larger entertainment system connector 311 comprising a greater number of sheaths 434. In some situations, this can be accomplished by increasing the size (e.g., the inner and outer diameter) of the posts 26. In other situations, the wall thickness of the posts 26 can be decreased. In the embodiment illustrated in FIG. 18, the entertainment system connector 311 comprises seven sheaths 434. Other embodiments can comprise more or fewer sheaths 434.

With continued reference to FIG. 18, in certain embodiments, an adapter connector 313 comprises a coupling interface 370 having a plurality of couplers 436, which are pins in the illustrated embodiment, that are configured to cooperate with the sheaths 434. As noted above, arrangements other than pin/sheath or plug/socket interfaces are possible for the coupling interfaces 370, 433. In the illustrated embodiment, each of the couplers or pins 436a-g is sized and dimensioned to fit snugly within a corresponding sheath 434a-g. In preferred embodiments, at least a portion of each pin 436 and each sheath 434 is capable of conducting electrical signals. The conducting portions of the pins 436 and sheaths 434 preferably contact one another when the entertainment system connector 311 and adapter connector 313 are coupled.

In other embodiments, the entertainment system connector 311 comprises pins 436 and the adapter connector comprises sheaths 434. In still other embodiments, each connector 311, 313 comprises a combination of pins 436 and sheaths 434. In some configurations, the connectors 311, 313 comprise complementary connection interface members configured to transmit optical signals, rather than electrical signals.

In certain embodiments, the connector 313 comprises a sleeve 435a. In some embodiments, the pins 436 are housed within the sleeve 435a and do not extend beyond a rim 435b (also shown in FIG. 19) of the sleeve 435a. Accordingly, in some embodiments, the sleeve 435a can protect the pins 436 from being bent or otherwise damaged prior to coupling with the sheaths 434 of the connector 311. In many embodiments, the connector 311 is sized and configured to fit snugly within the sleeve 435a when coupled with the connector 313.

Figure 19:
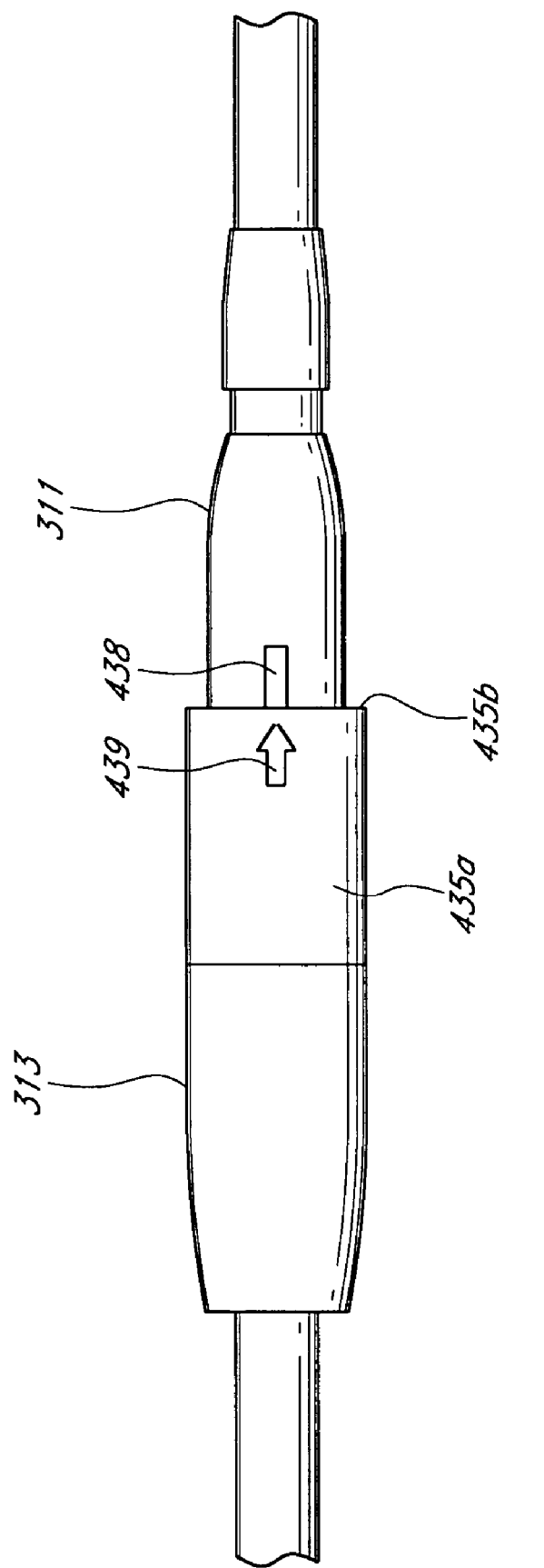
FIG. 19 is a front plan view of one embodiment of an entertainment system connector coupled with an adapter connector.

In certain embodiments, the entertainment system connector 311 and adapter connecter 313 can be joined only when the sheaths 434 and the pins 436 are properly aligned. As shown in the illustrated embodiment, the adapter connector 313 can comprise a ridge 437 that extends inwardly from the sleeve 435a of the connector 313. In certain embodiments, the ridge 437 is sized and shaped to fit in a channel 438 of the entertainment system connector 311. As illustrated in FIG. 19, the adapter connector 313 can comprise an indicator 439, such as an imprinted or painted arrow, on an outer surface thereof for demonstrating the location of the ridge 437 on an inner surface thereof. In many embodiments, the indicator 439 permits proper connection of the entertainment system connector 311 and the adapter connector 313 without inspection of the inner surface of the adapter connector 313, thereby facilitating the connection process.

Figure 20:
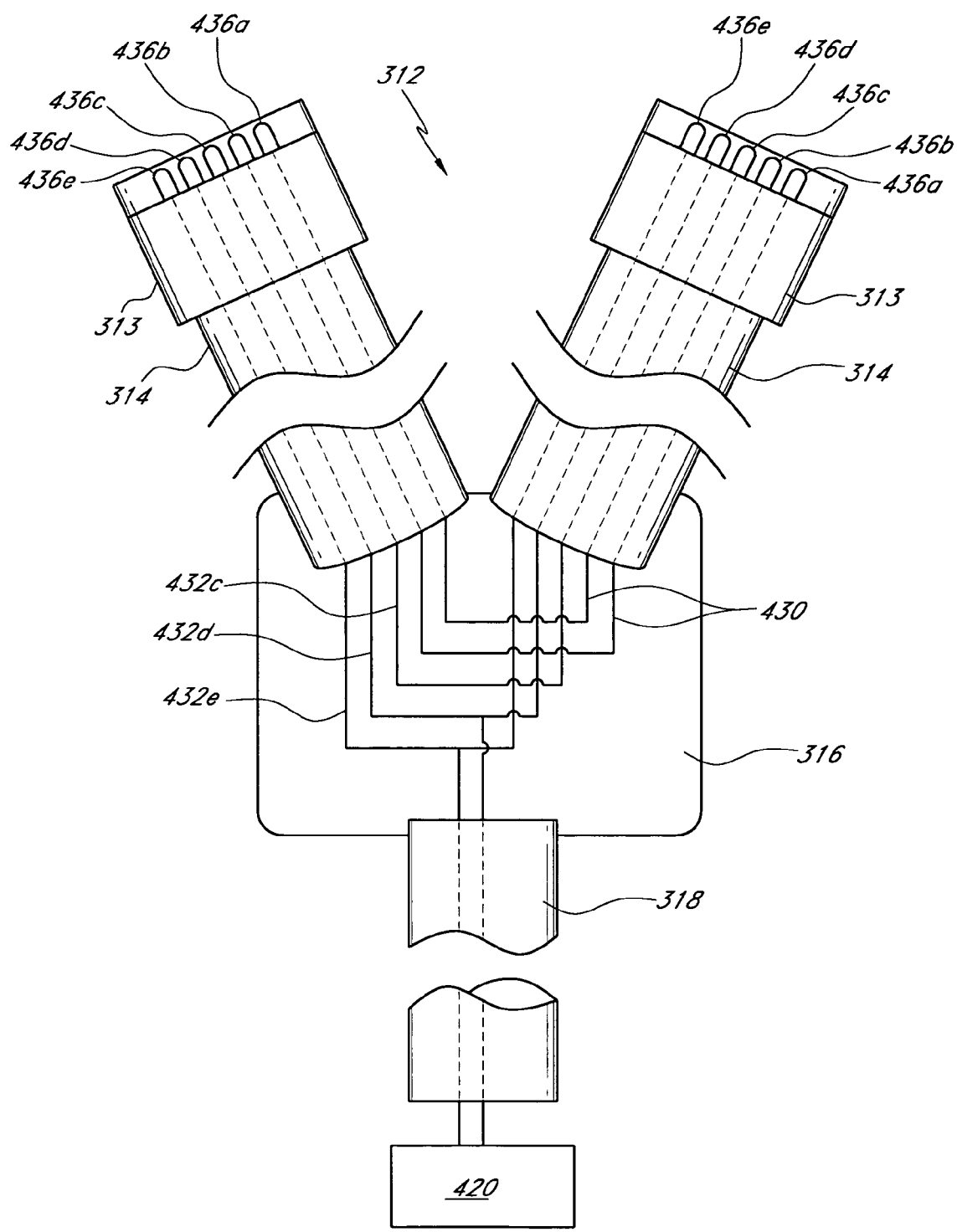
FIG. 20 is a schematic illustration of one embodiment of an adapter coupled with a power source.

As schematically illustrated in FIG. 20, in certain embodiments, the adapter connectors 313 are coupled with one or more primary adapter cables 314. The primary adapter cables 314 can comprise communication lines 430, electrical lines 432, and/or branches thereof. As discussed below, in some embodiments, one end of one branch of a communication line 430 is coupled with one pin 436 of an adapter connector 313 and one end of another branch of the communication line 430 is coupled with one pin 436 of another adapter connector 313. Similarly, one end of one branch of an electrical line 432 can be coupled with one pin 436 of an adapter connector 313 and one end of another branch of the electrical line 432 can be coupled with one pin 436 of another adapter connector 313.

In certain preferred embodiments, the adapter 312 comprises two adapter connectors 313. In some configurations, each adapter connector 313 comprises five or more pins 436. In preferred embodiments, each adapter connector 313 comprises the same configuration of pins 436. In the illustrated embodiment, one end of one branch of an electrical line 432c is coupled with the pin 436c of a first adapter connector 313, and one end of another branch of the electrical line 432c is coupled with the pin 436c of a second adapter connector 313. The electrical line 432c thereby couples both pins 436c. Similarly, an electrical line 432d couples both pins 436d, and another electrical line 432e couples both pins 436e. Accordingly, the two adapter connectors 313 are interchangeable with respect to the pins 436c-e of each connector. As used herein the term interchangeable is a broad term used in its ordinary sense and includes, without limitation, the ability to use one connector in place of another connector.

In the illustrated embodiment, one communication line 430 couples the pin 436a of the first adapter connector 313 with the pin 436b of the second adapter connector 313. Similarly, a second communication line 430 couples the pin 436b of the first adapter connector 313 with the pin 436a of the second adapter connector 313. Accordingly, the two adapter connectors 313 are interchangeable with respect to the pins 436a and 436b.

Advantageously, the inverted configuration of the pins 436a,b of the adapters facilitates the coupling of inputs 423 and outputs 421 of entertainment systems 18. In certain embodiments, the video system 300 comprises two entertainment systems 18 having substantially similar entertainment system connectors 311. Each entertainment system connector 311 has the same configuration of sheaths 434, i.e., for each connector 311, the sheath 434a is coupled with the output 421 of the entertainment system 18 and the sheath 434b is coupled with the input 423 of the entertainment system 18, (see, e.g., FIGS. 17 and 18). Direct electrical connection of the adapter 312 with the two entertainment system connectors 311 effectively couples the input 423 of one entertainment system 18 with the output 421 of the other entertainment system 18, and vice versa.

In some embodiments, the adapter 312 comprises adapter connectors 313 each having seven pins 436. In certain of such embodiments, the adapter connectors 313 are interchangeable. Certain of such embodiments resemble the illustrated five-pin adapter described above, but comprise two additional communication lines 430 running between the adapter connectors 313. In certain embodiments, the seven-pin adapter 312 is used in a video system 300 comprising two entertainment systems 18, each having two inputs 423 and two outputs 421. The additional communication lines 430 can allow coupling of a second output 421 of the first entertainment system 18 with a second input 423 of the second entertainment system 18, and allow coupling of a second input 423 of the first entertainment system with a second output 421 of the second entertainment system 18.

The interchangeable nature of the adapter connectors 313 can advantageously reduce the time required to install video systems 300, as no time is lost identifying which adapter connector 313 corresponds with the entertainment system connector 311 of a given entertainment system 18. Furthermore, interchangeable adapter connectors 313 can reduce the risk of improper installation which, in addition to increasing the overall installation time of a video system 300, could ultimately damage the video system 300. Additionally, the adapter connectors 313 can allow interoperability among monitors 200 of different makes and models by providing a standard interface for coupling with the input 423 and output 421 of any monitor 200.

The use of switchless adapters 312 to route signals from one entertainment system 18 to another can also provide advantages over the use of a separate signal source selection unit, such as a device that accepts signals from entertainment systems 18, DVD players, video game consoles, and/or other signal sources, and can allow a user to select among the various signals received by the unit. Signal source selection units can be expensive. Furthermore, such units can be costly to install, especially in the aftermarket where vehicles may not be configured to house signal source selection units. Additionally, some vehicles lack the required space for signal source selection units, or the units take up more space than desired by vehicle owners. The installation of such units can also be time-consuming. The use of adapters 312 can reduce or eliminate each of these problems.

With continued reference to FIG. 20, in certain embodiments, the secondary adapter cable 318 comprises an additional branch of the electrical line 432d and an additional branch of the electrical line 432e. In some embodiments, the electrical lines 432d and 432e are coupled with the power source 320. The power source 320 can be an alternating current or direct current source. In some embodiments, the power source 320 comprises the power source of a vehicle. In other embodiments, the power source 320 is dedicated to the video system 300. In some embodiments, the electrical line 432d is connected to the ground of the power source 320. In other embodiments, the electrical line 432d is connected to some other suitable ground.

Figure 20A:
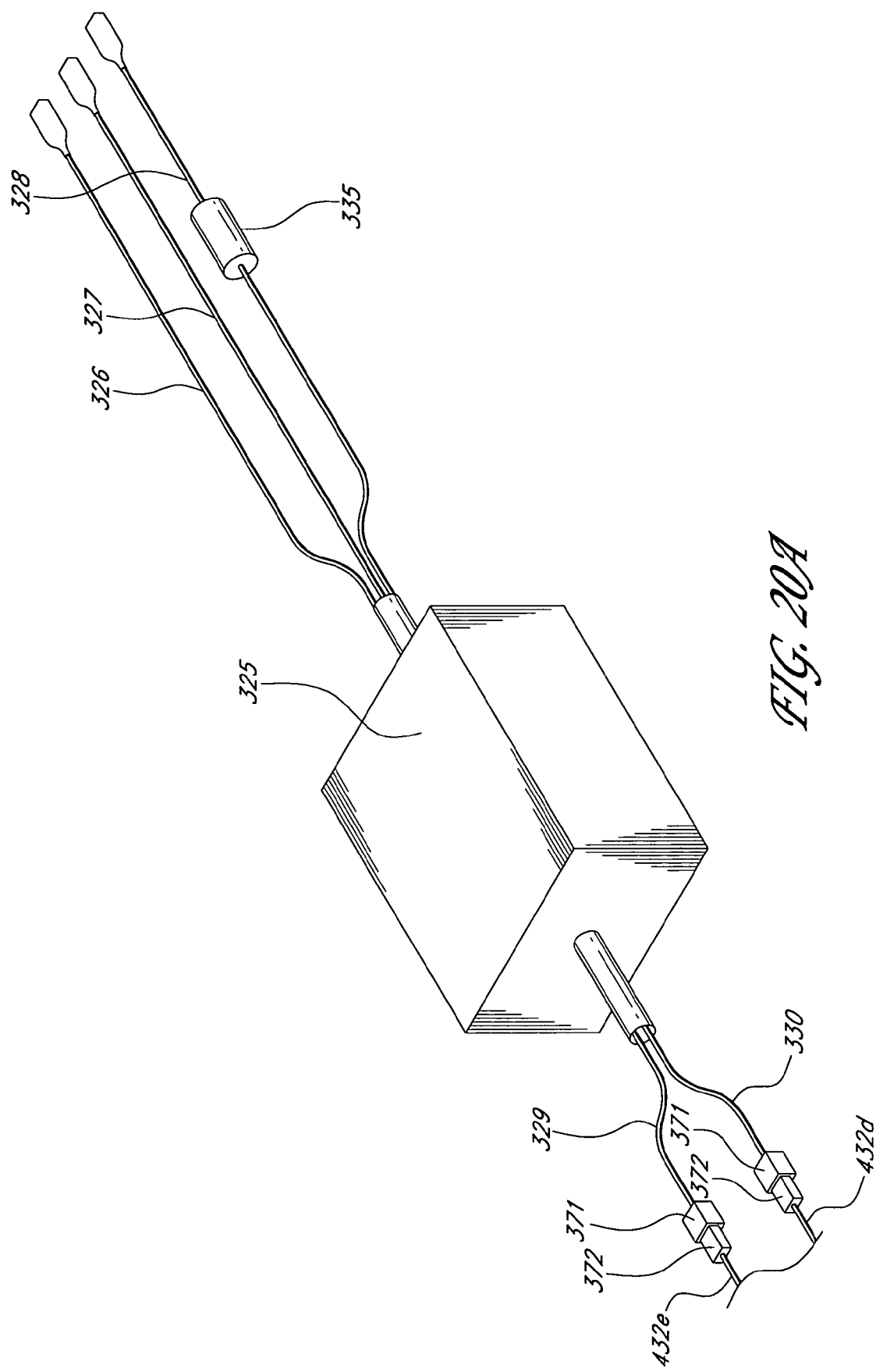
FIG. 20A is a partial perspective view of one embodiment of a noise suppressor coupled with electrical lines of an adapter.

As illustrated in FIG. 20A, in certain embodiments, the electrical lines 432d and 432e are coupled with the noise suppressor 325. In some embodiments, the noise suppressor 325 comprises an input power lead 326, an input ground lead 327, an input accessory lead 328, an output power lead 329 and an output ground lead 330. In some embodiments, the electrical line 432e is coupled with the output power lead 329 and the electrical line 432d is coupled with the output ground lead 330. In some embodiments, the each of the leads 329, 330 comprises a first interlocking connector 371 and each of the lines 432d, 432e comprises a second interlocking connector 372. The first and second interlocking connectors 371, 372 can be configured to engage one another by friction fit or by some other suitable method. In some embodiments, the interlocking connectors 371, 372 are coupled via a fastener, such as a clip or a screw.

In some embodiments, the noise suppressor 325 is coupled with the power source of a vehicle. The input power lead 326 can be coupled with a power line of the vehicle, the input ground lead 327 can be grounded in a suitable manner, and the input accessory lead 328 can be coupled with the accessory power line of the vehicle. In many embodiments, the noise suppressor filters and/or reduces hum from the engine power line, thereby providing a smoother waveform to the output power lead 329 than is received from the input power lead 326.

The input accessory lead 328 can serve a variety of functions. In one preferred embodiment, the input accessory lead 328 signals that a vehicle is being shut off, tripping circuitry within the noise suppressor 325 to reduce power output to the entertainment systems 18. In some embodiments, the reduced power output causes one or more DVD players of the entertainment systems 18 to store playback information to memory prior to shutting down. In some embodiments, the input accessory lead 328 comprises a fuse 335.

With reference again to FIG. 20, in some embodiments, the electrical line 432c couples pins 436c of the adapter 312. Accordingly, in some preferred embodiments, the electrical line 432c provides a common ground among entertainment systems 18 coupled to the adapter 312. In other embodiments, each entertainment system 18 is grounded separately.

In some embodiments, one or more secondary adapter cables 318 can comprise one or more branches of communication lines 430. The communication lines 430 thus can be coupled at one end with a signal source, such as, for example, a signal source selection unit, a DVD player, a television tuner, etc. Branches of the one or more communication lines 430 can be routed through the primary adapter cables 314 and coupled with the adapter connectors 313. The entertainment systems 18 can communicate with the communication lines 430, thereby providing additional viewing and/or listening options to users of the systems 18.

In certain embodiments, the junction 316 comprises a seal for joining the primary adapter cables 314 and the secondary adapter cable 318. In some embodiments, the seal comprises a molded dielectric material, such as polyvinylchloride, that is heat sealed around the primary cables 314 and the secondary cable 318.

As illustrated in FIG. 21, in some embodiments, a retainer or retention device 440 secures the entertainment system connector 311 (see, e.g., FIG. 24) and the adapter connector 313 (see, e.g., FIG. 24) in a coupled configuration. In certain embodiments, the retention device 440 is removable, providing ready access to the connectors 311, 313. In some embodiments, the retention device 440 comprises a first housing member 441 and a second housing member 442 that substantially surround the entertainment system connector 311 and the adapter connector 313 when the connectors 311, 313 are coupled. In some embodiments, the retention device 440 substantially encloses and/or encapsulates the connectors 311, 313. Accordingly, in some instances, the retention device 440 can protect the connectors 311, 313 from, for example, dust accumulation, humidity, and/or spilled liquids.

In some embodiments, as illustrated, an exterior surface of the retention device 440 is generally cylindrical when the device 440 is closed. The exterior surface can assume any shape, although generally cylindrical configurations are preferred for use with circularly symmetric cables 310, 314 and/or circularly symmetric connectors 311, 313. In some embodiments, the retention device 440 comprises a single piece of material, such as molded plastic. In other embodiments, two or more pieces can be joined to form the device 440.

Figure 23A:
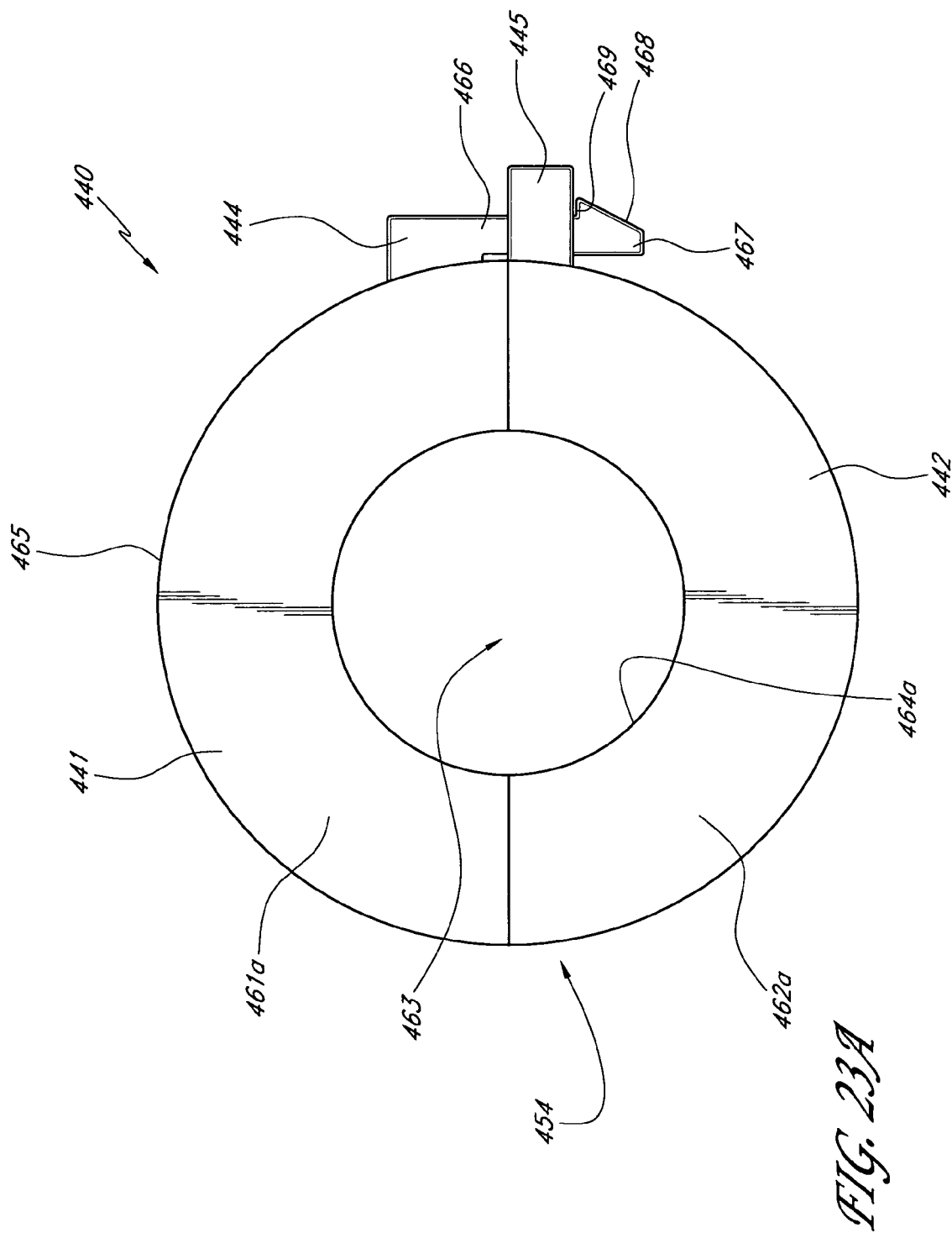
FIG. 23A is a side elevation view of one embodiment of a retention device in a closed configuration.
Figure 23B:
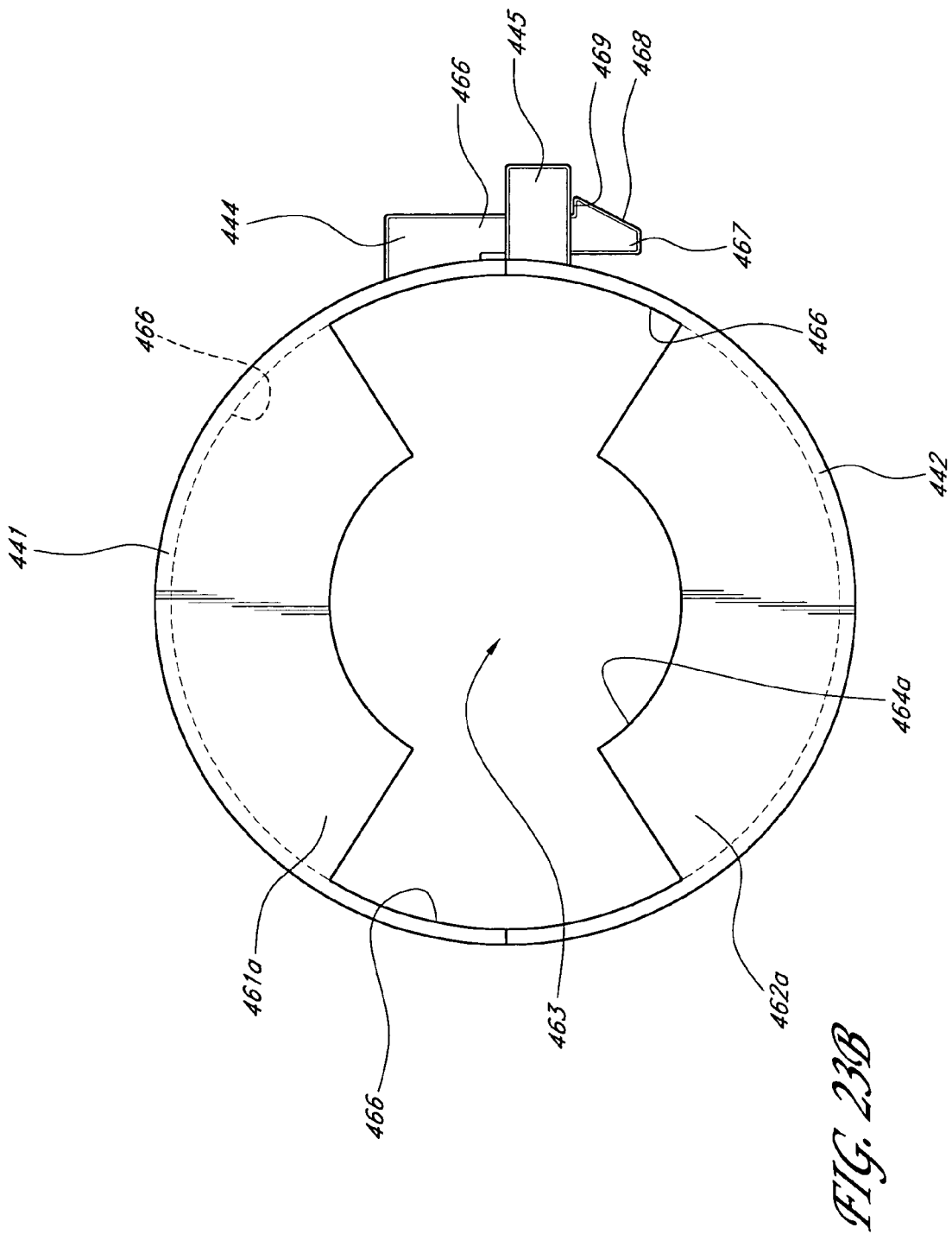
FIG. 23B is a side elevation view of another embodiment of a retention device in a closed configuration.

In certain embodiments, the first and second housing members 441, 442 cooperate to form a cavity 463 (see, e.g., FIGS. 23A and 23B). In many embodiments, the cavity is sized and configured to accept the connectors 311, 313. In some embodiments, the cavity is sized and configured to only accept the connectors 311, 313 when the connectors are coupled with each other. For example, the cavity can comprise an axial length that is substantially equal to the axial length of the connectors 311, 313 in a coupled configuration.

In preferred embodiments, the retention device 440 comprises one or more releasable locks or fasteners 443 that allow the device 440 to be selectively opened and closed. In the illustrated embodiment, the device 440 comprises two fasteners 443. Each fastener 443 comprises a clip extension 444 and a clip aperture 445 that cooperate to allow the selective opening and closing of the device 440, as more fully described below. In various embodiments, the fastener 443 can comprise a clip, clasp, clamp, magnet, hook, hook-and-pile fabric, or other suitable mechanism for maintaining the device 440 in a closed state. In certain embodiments, the fastener 443 is integrally formed with the device 440, and in other embodiments, it is secured to or around the device 440.

Figure 22:
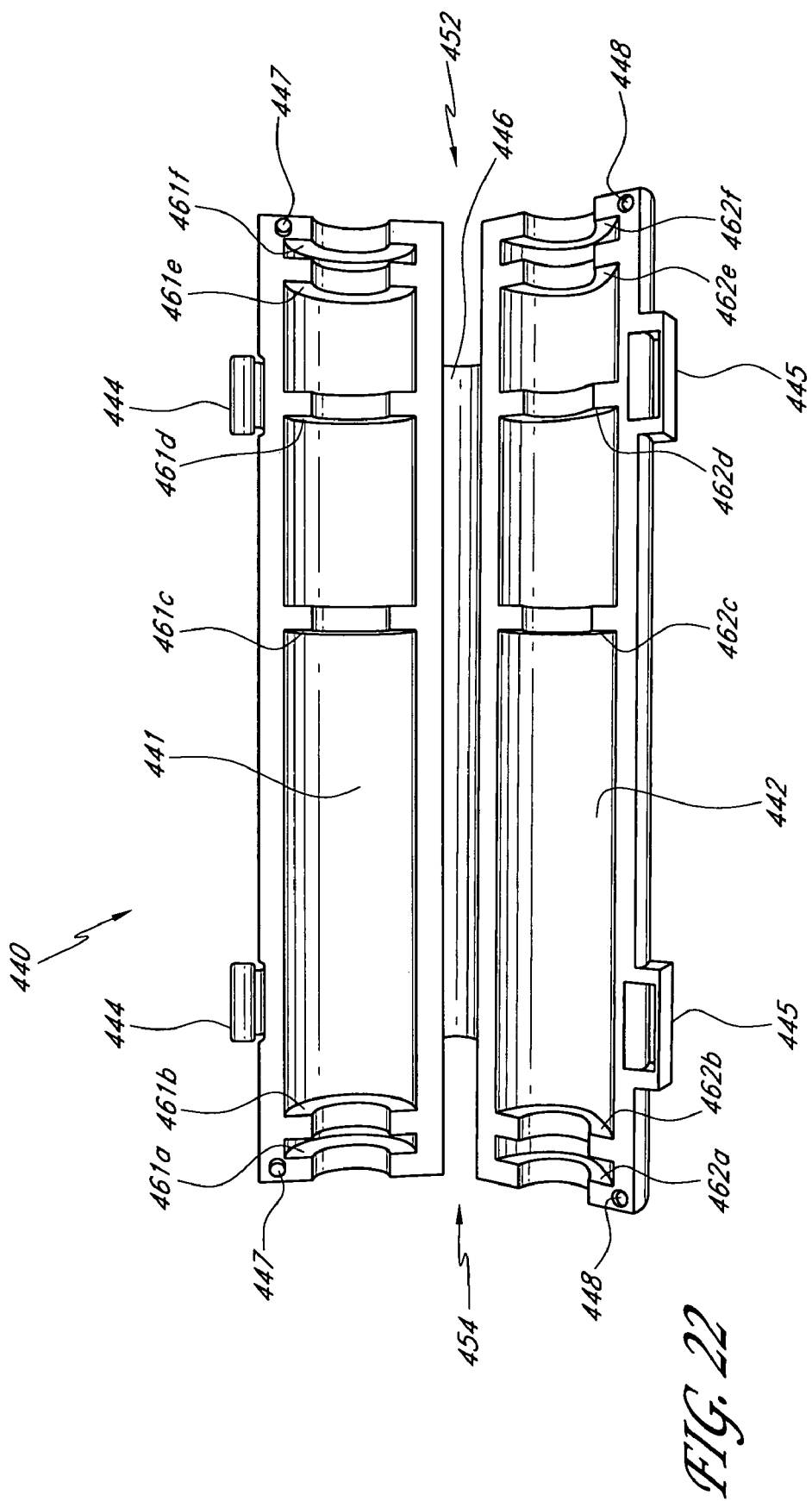
FIG. 22 is a front perspective view of one embodiment of a retention device in an open configuration.

FIG. 22 illustrates one embodiment of the retention device 440 in an open configuration. As shown, the clip extensions 444 are disengaged from the clip apertures 445. In certain preferred embodiments, the retention device 440 comprises a hinge 446 that connects the first and second housing members 441, 442 and allows the housing members 441, 442 to move relative to one another. As illustrated, the hinge 446 can be integrally formed with the first and second housing members 441, 442. In other arrangements, the hinge 446 comprises one or more pieces attached to the first and second housing members 441, 442. In some configurations, one or more fasteners 443 are used in place of a hinge 446.

In some arrangements, the first housing member 441 comprises one or more protrusions 447 and the second housing member 442 comprises one or more recesses 448. The recesses 448 can be configured to accept the protrusions 447 when the device 440 is closed, thereby encouraging alignment of the first and second housing members 441, 442. In the illustrated embodiment, the protrusions 447 are substantially cylindrical with rounded edges. The recesses 448 are also substantially cylindrical, having a diameter slightly larger than that of the protrusions 447. The relative sizes of the protrusions 447 and recesses 448 can be altered to achieve a tighter or looser fit. A wide variety of arrangements are possible for the protrusions 447 and recesses 448.

In the illustrated embodiment, the protrusions 447 and recesses 448 are spaced away from the hinge 446. Additionally, one protrusion 447 and recess 448 pair is located adjacent a proximal end 452 of the device 440, and another protrusion 447 and recess 448 pair is located adjacent a distal end 454 of the device 440. As used herein, the terms proximal and distal refer to spatial orientation with respect to the entertainment system 18. Other arrangements of protrusion 447 and recess 448 pairs are possible.

In some configurations, the first housing member 441 comprises one or more first extensions, inward projections, interference surfaces, or ridges 461 and the second housing member 442 comprises one or more second extensions, inward projections, interference surfaces, or ridges 462. In certain configurations, the first and second ridges 461, 462 extend inward from a surface of the first and second housing members 441, 442, respectively. As illustrated, in some configurations, the first and second ridges 461, 462 extend inward along an entire length of an interior surface of the first and second housing members 441, 442, respectively. In certain configurations, the first and second ridges 461, 462 are substantially C-shaped, as shown. In some embodiments, the first and second ridges 461, 462 are substantially orthogonal to the surfaces of the housing members 441, 442 from which the ridges extend.

FIG. 23A illustrates an end-on view of the distal end 454 of one embodiment of the retention device 440 in a closed configuration. In some embodiments, the first ridge 461a cooperates with the second ridge 462a to define an opening 464a when the device 440 is closed. In certain configurations, the opening 464a is smaller in at least one dimension than a cross-section of the retention device 440. For example, in the illustrated embodiment, the opening 464 is generally circular, and the diameter of the circular opening 464a is smaller than the diameter of the circular cross-section of an exterior surface 465 of the closed device 440. Similarly, the first ridges 461b-f and the corresponding second ridges 462b-f (shown in FIG. 22) of the illustrated embodiment define circular openings 464b-f (not shown) of varying diameters when the device 440 is closed. As described below, the diameter of each circular opening 464 so formed can assume various sizes depending on the purpose of the opening 464.

As illustrated in FIG. 23B, in some embodiments, the cross-section of the opening 464a partially defined by the first and second ridges 461a, 462a is noncircular. For example, in certain cylindrical configurations, the ridges 461a and 462a extend only along a partial length of a surface of the first and second housing members 441, 442, respectively. In certain of such configurations, the opening 464a defined by the ridges 461a and 462a when the device 440 is closed has a measurement in one dimension equal to the diameter of the circular cross-section of an interior surface 466 of the closed device 440, and a measurement in another dimension smaller than the cross-sectional diameter of the interior surface 466. Various other opening configurations can be used, although circular openings are preferred for use with circularly symmetric cables and circularly symmetric connectors.

With continued reference to FIGS. 23A and 23B, in certain embodiments, the clip extension 444 comprises an arm portion 466 and a tip portion 467. The tip portion 467 can comprise a face 468 and a ledge 469. In certain embodiments the face 467 is angled such that when the device 440 is being closed, the clip aperture 445 forces the tip portion 467 inward toward the device 440. As a result, the arm portion 446 is bent, giving rise to a restoring force that eventually seats the ledge 469 under the clip aperture 445 when the device 440 is closed. A top surface of the ledge 469 abuts a bottom surface of the clip aperture 445, thereby retaining the device 440 in a closed position. To open the device 440, the tip portion 467 is depressed toward the device 440 until the top surface of the ledge 469 no longer contacts the bottom surface of the clip aperture 445. In some instances, an upward force is applied to the tip portion 467 to encourage it through the clip aperture 445. In other instances, the device 440 is biased toward opening such that no upward force need be applied to the tip portion 467 to encourage it through the clip aperture 445.

Figure 24:
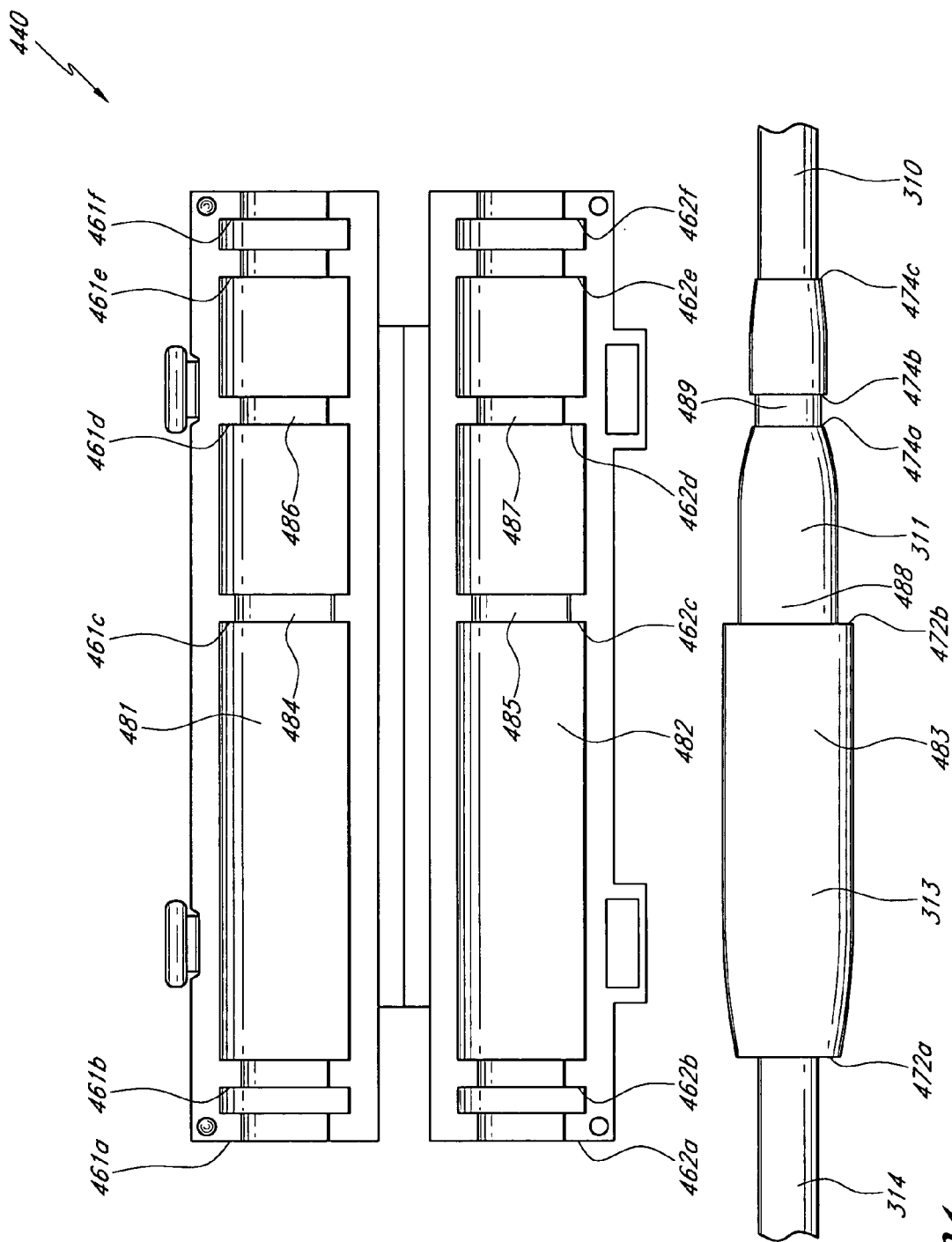
FIG. 24 is a top plan view of one embodiment of a retention device alongside two coupled connectors.

FIG. 24 illustrates one embodiment of a retention device 440 in an open configuration located alongside a coupled adapter connector 313 and entertainment system connector 311. As described above, in certain embodiments, the ridges 461 and 462 cooperate to form openings 464 when the device is closed. In general, the openings 464 can encourage alignment of the connectors 311, 313. In some embodiments, the openings 464 are sized to allow the passage therethrough of a cable (e.g., the cable 310 or the cable 314), but prevent the passage therethrough of a connector (e.g., the entertainment system connector 311 or the adapter connector 313). In other embodiments, the openings 464 are sized to prevent the passage therethrough of the cable as well. For example, the openings 464 can be sized smaller than a thickness of the cable. In certain embodiments, the ridges 461, 462 comprise a material having a high coefficient of friction with respect to a casing of the cable to aid in preventing the movement of the cable. In some embodiments, the casing comprises rubber and the ridges 461, 462 comprise molded plastic. In some embodiments, the ridges 461 and 462 comprise a roughened or etched surface.

In certain embodiments, the adapter connector 313 comprises one or more extensions, projections, or interference surfaces 472 that extend outward from a center of the connector 313. In the illustrated embodiment, the adapter connector 313 comprises two extensions 472a, 472b. The extensions 472a, 472b comprise distal and proximal faces, respectively, of the adapter connector 313. Each extension 472a, 472b extends substantially perpendicularly from an axial center of the connector 313. In certain embodiments, the entertainment system connector comprises one or more extensions 474 that extend outward from a center of the connector 311. In the illustrated embodiment, each extension 474a, 474b, and 474c extends substantially perpendicularly from an axial center of the connector 311.

In some embodiments, the opening 464b formed by the ridges 461b and 462b when the device 440 is closed is smaller in at least one dimension than the extension 472a. In certain of such embodiments, the opening 464d formed by the ridges 461d and 462d is smaller in at least one dimension than the extension 474a, and/or the opening 464e formed by the ridges 461e and 462e is smaller in at least one dimension than the extension 474c. In such configurations, the ridges 461b,d,e and 462b,d,e can operate to prevent the separation of the coupled connectors 311, 313. For example, in certain embodiments, as axial forces are applied to the cables 310, 314 in a manner that would separate the connectors 311, 313, the extension 472a contacts one or more of the ridges 461b and 462b. Similarly, the extension 474c contacts one or more of the ridges 461e and 462e. Accordingly, the ridges 461b,e and 462b,e cooperate with the extensions 472a and 474c to prevent the connectors 311, 313 from moving away from each other, e.g., interference surfaces cooperate to prevent axial movement of the connectors 311, 313 relative to each other. In some embodiments, additional interference surfaces cooperate with each other to prevent relative movement between the connectors 311, 313. For example, in some embodiments, the ridges 461d and 462d cooperate with the extension 474a to prevent the connector 311 from moving axially with respect to the connector 313. In further embodiments, one or more of the openings 464a,b,e,f through which the cables 310, 314 can extend are smaller than the cables 310, 314, which further serves to prevent separation of the connectors 311, 313.

In some embodiments, the retention device 440 comprises one or more surfaces, or interference surfaces, configured to prevent the connectors 311, 313 from moving laterally relative to each other. In the illustrated embodiment, the device 440 comprises interior surfaces 481 and 482. In some embodiments, the interior surfaces 481, 482 comprise one substantially continuous surface when the device 440 is closed. In some embodiments, the interior surfaces 481, 482 contact an exterior surface 483 of the connector 313 when the device is closed 440. In certain of such embodiments, the interior surfaces 481, 482 cooperate with the exterior surface 483 to substantially prevent the connector 313 from moving in a transverse or lateral direction relative to the connector 311. For the illustrated case of a circularly symmetrical connector 313, the transverse or lateral direction can be, for example, any radial direction. In certain embodiments, contact between the interior surfaces 481, 482 and the exterior surface 483 along an axial length of the connector 311 maintains a longitudinal axis of the connector 311 aligned with a longitudinal axis of the device 440 and prevents radial movement of the connector 311 relative to the connector 313. Similarly, in some embodiments, contact between interior surfaces 484, 485 and 486, 487 of the device 440 and exterior surfaces 488, 489 of portions of the connector 313, respectively, maintains a longitudinal axis of the connector 313 aligned with a longitudinal axis of the device 440 and prevents radial movement of the connector 313 relative to the connector 311.

In further embodiments, the retention device 440 can comprise interference surfaces, such as the surfaces 481-484, that prevent rotational movement of the connectors 311, 313 relative to each other, such as by friction (as described below). In many embodiments, some interference surfaces of the device 440 are configured to prevent or inhibit multiple forms of relative movement between the connectors 311, 313.

In some embodiments, an interior surface of the retention device 440 is smaller than an exterior surface of one or more of the connectors 311, 313. In such embodiments, friction can arise between one or more of the connectors 311, 313 and the device 440 when the device 440 is closed, thereby helping to secure or securing the connectors 311, 313 in a coupled configuration. In certain of such embodiments, the interior surface of the device 440 is coated with a high-friction material, is roughened, or is etched, thereby increasing the friction. Furthermore, in such embodiments, the retention device 440 can be placed in tension when the device 440 is closed, thereby creating a bias towards being in an open configuration. As discussed above, such a bias can aid in opening the device 440 when the clip configuration of the illustrated embodiment is employed.

The retention device 440 can provide various advantages over conventional methods, such as the use of electrical tape, for securing connectors to one another. As discussed above, the retention device 440 can apply normal and frictional forces to the connectors 311, 313. These forces can often be stronger than the forces supplied by electrical tape, thereby ensuring a more reliable coupling of the connectors. The use of a retention device 440 also facilitates replacement of an entertainment system 18, if needed. Whereas removing electrical tape can be time consuming, removal of the retention device 440 is relatively quick.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics of any embodiment described above may be combined in any suitable manner, as would be apparent to one of ordinary skill in the art from this disclosure, in one or more embodiments.

Similarly, it should be appreciated that in the above description of embodiments, various features of the inventions are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment. This disclosure includes all permutations of the independent claims with their dependent claims.

What is claimed is:

1. An automotive media system comprising:
    a first headrest-mountable entertainment assembly, comprising a first video source and a first display configured to be mounted in an automotive headrest comprising a first connector, the first connector comprising a first signal input, a first signal output and a first power input;
    a second headrest-mountable entertainment assembly, comprising second video source and a second display configured to be mounted in an automotive headrest comprising a second connector, the second connector comprising a second signal input, a second signal output and a second power input; and
    a switchless adapter comprising a single integral unit:
        a third connector configured to couple with either the first or second connector;
        a fourth connector configured to couple with either the first or second connector;
        a first communication line coupled with the third and fourth connectors such that the first output is able to directly electrically communicate with the second input or the second output is able to communicate with the first input; and
        a second communication line coupled with the third and fourth connectors such that the first output is able to directly electrically communicate with the second input or the second output is able to communicate with the first input; and
        a first electrical line coupled with the third and fourth connectors, the first electrical line configured to be coupled with a power source;
    wherein the first, second, third and fourth connectors each comprise a plurality of interfaces, and wherein the plurality of interfaces of the first connector and the second connector each comprise the same one of a plurality of pins and a plurality of sheaths, and the plurality of interfaces of the third connector and the fourth connector each comprise the other of a plurality of pins and a plurality of sheaths;
    wherein the first connector has a first configuration and the second connector has a second configuration that is the same as the first configuration, and the third connector has a third configuration and the fourth connector has a fourth configuration that is the same as the third configuration, each of the third and fourth configurations being able to cooperate with either of the first and second configurations to form a connection;
    wherein the third configuration and the fourth configuration each comprise the same arrangement of at least a first interface at a first location, a second interface at a second location, and a third interface at a third location; and
    wherein the first communication line directly connects the first interface of the third connector to the second interface of the fourth connector, the second communication line directly connects the second interface of the third connector to the first interface of the fourth connector, and the first electrical line connects the third interface of the third connector to the third interface of the fourth connector such that said third connector can be connected to the first connector and said fourth connector can be connected to said second connector or said third connector can be connected to said second connector and said fourth connector can be connected to said first connector without altering the operation of the system.

2. The media system of claim 1, wherein the first communication line is configured to allow communication between the first output and the second input when the second communication line allows communication between the second output and the first input.

3. The media system of claim 1, wherein the adapter further comprises an electrical line coupled with the third and fourth connectors, the electrical line configured to provide a common ground between the first and second entertainment systems.

4. The media system of claim 1, wherein the adapter further comprises a second electrical line coupled with the third and fourth connectors, the second electrical line configured to be coupled with a ground.

5. The media system of claim 4, wherein the adapter further comprises a third electrical line coupled with the third and fourth connectors, the third electrical line configured to provide electrical communication between the first and second entertainment systems.

6. The media system of claim 1, wherein the plurality of pins comprises at least five pins, and the plurality of sheaths comprises at least five sheaths.

7. The media system of claim 6, wherein the plurality of pins comprises at least seven pins, and the plurality of sheaths comprises at least seven sheaths.

8. An automotive media system comprising:
a first headrest, comprising a first pair of mounting posts,
a first entertainment assembly mounted within said first headrest, said first assembly comprising a first video source, a first video display, a first audio transmitter, and a first connector, the first connector comprising a first signal input, and a first signal output configured as a single integrated unit;
a second headrest comprising a second pair of mounting posts;
a second entertainment assembly mounted within said second headrest, said second entertainment assembly comprising a second video source, a second video display, a second audio transmitter, and a second connector, the second connector comprising a second signal input, and a second signal output configured as a single integrated unit; and
a switchless adapter comprising a single integral unit:
a third connector configured to couple with either the first or second connector;
a fourth connector configured to couple with either the first or second connector;
a first communication line coupled with the third and fourth connectors such that the first output is able to communicate with the second input or the second output is able to communicate with the first input; and
a second communication line coupled with the third and fourth connectors such that the first output is able to communicate with the second input or the second output is able to communicate with the first input; and
wherein the first connector and the second connector both individually define the same one of a plurality of pins and a plurality of sheaths, and the third connector and the fourth connector both individually define the other of a plurality of pins and a plurality of sheaths;
wherein said third connector can be connected to the first connector and said fourth connector can be connected to said second connector or said third connector can be connected to said second connector and said fourth connector can be connected to said first connector without altering the operation of the system; and
wherein said first headrest-mountable entertainment assembly and said second headrest-mountable entertainment assembly are physically placed in electrical communication solely by said first connector, said second connector, and said adaptor extending through only one mounting post of the first pair mounting posts of the first headrest and only one mounting post of the second pair of mounting posts of the second headrest.

9. The media system of claim 8, wherein the adaptor further comprises a power line coupled with the third and fourth connectors such that a power source is able to communicate with the first and second connectors when the power source is connected to the power line.

10. The media system of claim 9, wherein the adapter further comprises a ground line configured to couple a ground with the first and second connectors.

11. The media system of claim 8, wherein the plurality of pins comprises at least five pins, and the plurality of sheaths comprises at least five sheaths.

12. The media system of claim 8, wherein the adapter comprises three branches.

* * * * *

UNITED STATES PATENT AND TRADEMARK OFFICE
CERTIFICATE OF CORRECTION

| | |
|---|---|
| PATENT NO. | : 7,812,784 B2 |
| APPLICATION NO. | : 11/475734 |
| DATED | : October 12, 2010 |
| INVENTOR(S) | : Chung Lung Chang |

It is certified that error appears in the above-identified patent and that said Letters Patent is hereby corrected as shown below:

At column 23, line 65, delete "embodiment" and insert -- entertainment -- therefor.

Signed and Sealed this
Twelfth Day of April, 2011

David J. Kappos
*Director of the United States Patent and Trademark Office*